US012677999B2

(12) United States Patent
Conrad

(10) Patent No.: US 12,677,999 B2
(45) Date of Patent: *\*Jul. 14, 2026

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 77 days.

This patent is subject to a terminal disclaimer.

(21) Appl. No.: 17/880,525

(22) Filed: Aug. 3, 2022

(65) Prior Publication Data

US 2022/0369875 A1 Nov. 24, 2022

Related U.S. Application Data

(63) Continuation of application No. 16/387,014, filed on Apr. 17, 2019, now Pat. No. 11,930,987.

(Continued)

(51) Int. Cl.
*A47L 5/24* (2006.01)
*A47L 9/10* (2006.01)
(Continued)

(52) U.S. Cl.
CPC .................. *A47L 5/24* (2013.01); *A47L 9/102* (2013.01); *A47L 9/1409* (2013.01); *A47L 9/16* (2013.01);
(Continued)

(58) Field of Classification Search
CPC .......... A47L 5/24; A47L 9/102; A47L 9/1409; A47L 9/16; A47L 9/1666; A47L 9/1683;
(Continued)

(56) References Cited

U.S. PATENT DOCUMENTS 1,898,608 A 2/1933 Alexander
2,290,664 A 7/1942 Allardice
(Continued)

FOREIGN PATENT DOCUMENTS

CA 1218962 A1 3/1987
CA 2086374 C 11/1996
(Continued)

OTHER PUBLICATIONS

Npl1, Definitions of "mate" and "join", Merriam Webster, Available Mar. 22, 2016 (Year: 2016).*
(Continued)

*Primary Examiner* — Michael A Gump
(74) *Attorney, Agent, or Firm* — Philip C. Mendes da Costa; SMART & BIGGAR LP

(57) ABSTRACT

A hand vacuum cleaner has an upper end, a lower end, an air flow passage, a main body with a handle, an air treatment chamber and a suction motor. The air treatment chamber has an air outlet, the air outlet comprising a rigid porous member and a filter media that is removably positionable in the rigid porous member. The air treatment chamber is moveable to an open position in which the air treatment chamber is emptyable, and the rigid porous member is moveable within the air treatment chamber to an open position in which the filter media is removable.

14 Claims, 51 Drawing Sheets

Related U.S. Application Data

(60) Provisional application No. 62/660,700, filed on Apr. 20, 2018.

(51) Int. Cl.

| | |
|---|---|
| *A47L 9/14* | (2006.01) |
| *A47L 9/16* | (2006.01) |
| *A47L 9/28* | (2006.01) |
| *A47L 9/32* | (2006.01) |
| *B01D 45/08* | (2006.01) |
| *B01D 45/16* | (2006.01) |
| *B01D 50/20* | (2022.01) |

(52) U.S. Cl.
CPC ........... *A47L 9/1666* (2013.01); *A47L 9/1683* (2013.01); *A47L 9/2884* (2013.01); *A47L 9/322* (2013.01); *B01D 45/08* (2013.01); *B01D 45/16* (2013.01); *B01D 50/20* (2022.01); *A47L 9/2842* (2013.01); *B01D 2279/55* (2013.01)

(58) Field of Classification Search
CPC ...... A47L 9/2884; A47L 9/322; A47L 9/2842; A47L 9/122; A47L 9/127; A47L 7/0019; A47L 7/0038; B01D 50/20; B01D 45/08; B01D 45/16; B01D 2279/55
USPC ........................................................... 15/344
See application file for complete search history.

(56) References Cited

U.S. PATENT DOCUMENTS

| | | | |
|---|---|---|---|
| 2,542,634 A | 2/1951 | Davis et al. | |
| 2,846,024 A | 8/1958 | Bremi | |
| 2,913,111 A | 11/1959 | Rogers | |
| 2,917,131 A | 12/1959 | Evans | |
| 2,937,713 A | 5/1960 | Stephenson et al. | |
| 2,942,691 A | 6/1960 | Dillon | |
| 2,942,692 A | 6/1960 | Benz | |
| 2,946,451 A | 7/1960 | Culleton | |
| 2,952,330 A | 9/1960 | Winslow | |
| 3,085,221 A | 4/1963 | Kelly | |
| 3,130,157 A | 4/1964 | Kelsall et al. | |
| 3,200,568 A | 8/1965 | Mcneil | |
| 3,269,097 A | 8/1966 | German | |
| 3,320,727 A | 5/1967 | Farley et al. | |
| 3,426,513 A | 2/1969 | Kurt | |
| 3,530,649 A | 9/1970 | Porsch et al. | |
| 3,582,616 A | 6/1971 | Wrob | |
| 3,684,093 A | 8/1972 | Kono | |
| 3,822,533 A | 7/1974 | Oranje | |
| 3,898,068 A | 8/1975 | McNeil et al. | |
| 3,988,132 A | 10/1976 | Oranje | |
| 3,988,133 A | 10/1976 | Schady | |
| 4,187,088 A | 2/1980 | Hodgson | |
| 4,236,903 A | 12/1980 | Malmsten | |
| 4,373,228 A | 2/1983 | Dyson | |
| 4,382,804 A | 5/1983 | Mellor | |
| 4,486,207 A | 12/1984 | Baillie | |
| 4,635,315 A | 1/1987 | Kozak | |
| 4,826,515 A | 5/1989 | Dyson | |
| 4,905,342 A | 3/1990 | Ataka | |
| 5,078,761 A | 1/1992 | Dyson | |
| 5,129,125 A | 7/1992 | Gamou et al. | |
| 5,230,722 A | 7/1993 | Yonkers | |
| 5,254,019 A | 10/1993 | Noschese | |
| 5,267,371 A | 12/1993 | Soler et al. | |
| 5,309,600 A | 5/1994 | Weaver et al. | |
| 5,309,601 A | 5/1994 | Hampton et al. | |
| 5,358,290 A | 10/1994 | Fleet et al. | |
| 5,481,780 A | 1/1996 | Daneshvar | |
| 5,524,321 A | 6/1996 | Weaver et al. | |
| 5,715,566 A | 2/1998 | Weaver et al. | |
| 5,742,976 A | 4/1998 | Bensussen et al. | |
| 5,858,038 A | 1/1999 | Dyson et al. | |
| 5,966,774 A * | 10/1999 | Bone ....................... A47L 9/106 |
| | | | 15/352 |
| 5,974,625 A | 11/1999 | Garner | |
| 6,071,321 A | 6/2000 | Trapp et al. | |
| 6,080,022 A | 6/2000 | Shaberman et al. | |
| 6,081,961 A | 7/2000 | Wang | |
| 6,098,244 A | 8/2000 | Conrad et al. | |
| 6,099,661 A | 8/2000 | Conrad | |
| 6,101,672 A | 8/2000 | Conrad et al. | |
| 6,123,779 A | 9/2000 | Conrad et al. | |
| 6,129,775 A | 10/2000 | Conrad et al. | |
| 6,135,708 A | 10/2000 | Conrad et al. | |
| 6,168,716 B1 | 1/2001 | Conrad et al. | |
| 6,170,119 B1 | 1/2001 | Conrad et al. | |
| 6,173,474 B1 | 1/2001 | Conrad | |
| 6,174,127 B1 | 1/2001 | Conrad et al. | |
| 6,183,641 B1 | 2/2001 | Conrad et al. | |
| 6,221,134 B1 | 4/2001 | Conrad et al. | |
| 6,224,325 B1 | 5/2001 | Conrad et al. | |
| 6,228,260 B1 | 5/2001 | Conrad et al. | |
| 6,231,645 B1 | 5/2001 | Conrad et al. | |
| 6,238,177 B1 | 5/2001 | Conrad et al. | |
| 6,243,917 B1 | 6/2001 | Conrad | |
| 6,251,296 B1 | 6/2001 | Conrad et al. | |
| 6,260,234 B1 | 7/2001 | Wright et al. | |
| 6,261,052 B1 | 7/2001 | Conrad et al. | |
| 6,261,379 B1 | 7/2001 | Conrad et al. | |
| 6,277,278 B1 | 8/2001 | Conrad et al. | |
| 6,280,143 B1 | 8/2001 | Parker et al. | |
| 6,307,358 B1 | 10/2001 | Conrad | |
| 6,312,594 B1 | 11/2001 | Conrad et al. | |
| 6,328,527 B1 | 12/2001 | Conrad et al. | |
| 6,332,239 B1 | 12/2001 | Dubos et al. | |
| 6,334,234 B1 | 1/2002 | Conrad et al. | |
| 6,344,064 B1 | 2/2002 | Conrad | |
| 6,406,505 B1 | 6/2002 | Oh et al. | |
| 6,434,785 B1 | 8/2002 | Vandenbelt et al. | |
| 6,440,197 B1 | 8/2002 | Conrad et al. | |
| 6,457,205 B1 | 10/2002 | Conrad | |
| 6,482,252 B1 | 11/2002 | Conrad et al. | |
| 6,502,278 B2 | 1/2003 | Oh et al. | |
| 6,531,066 B1 | 3/2003 | Saunders et al. | |
| 6,533,834 B2 | 3/2003 | Conrad et al. | |
| 6,546,593 B2 | 4/2003 | Oh et al. | |
| 6,553,612 B1 | 4/2003 | Dyson et al. | |
| 6,560,818 B1 | 5/2003 | Hasko | |
| 6,581,239 B1 | 6/2003 | Dyson et al. | |
| 6,596,046 B2 | 7/2003 | Conrad et al. | |
| 6,599,338 B2 | 7/2003 | Oh et al. | |
| 6,599,340 B2 | 7/2003 | Conrad et al. | |
| 6,599,350 B1 | 7/2003 | Rockwell et al. | |
| 6,613,316 B2 | 9/2003 | Sun et al. | |
| 6,623,539 B2 | 9/2003 | Lee et al. | |
| 6,625,845 B2 | 9/2003 | Matsumoto et al. | |
| 6,648,934 B2 | 11/2003 | Choi et al. | |
| 6,746,500 B1 | 6/2004 | Park et al. | |
| 6,782,583 B2 | 8/2004 | Oh | |
| 6,782,585 B1 | 8/2004 | Conrad et al. | |
| 6,811,584 B2 | 11/2004 | Oh | |
| 6,824,580 B2 | 11/2004 | Oh | |
| 6,833,015 B2 | 12/2004 | Oh et al. | |
| 6,840,972 B1 | 1/2005 | Kim | |
| 6,868,578 B1 | 3/2005 | Kasper | |
| 6,874,197 B1 | 4/2005 | Conrad | |
| 6,896,719 B2 | 5/2005 | Coates et al. | |
| 6,901,625 B2 | 6/2005 | Yang et al. | |
| 6,928,692 B2 | 8/2005 | Oh et al. | |
| 6,929,516 B2 | 8/2005 | Brochu et al. | |
| 6,968,596 B2 | 11/2005 | Oh et al. | |
| 6,976,885 B2 | 12/2005 | Lord | |
| 7,070,636 B2 | 7/2006 | McCormick et al. | |
| 7,074,248 B2 | 7/2006 | Jin et al. | |
| 7,113,847 B2 | 9/2006 | Chmura et al. | |
| 7,152,276 B2 | 12/2006 | Jin et al. | |
| 7,152,277 B2 | 12/2006 | Jung et al. | |
| 7,160,346 B2 | 1/2007 | Park | |
| 7,162,770 B2 | 1/2007 | Davidshofer | |
| 7,175,682 B2 | 2/2007 | Nakai et al. | |

(56)          References Cited

U.S. PATENT DOCUMENTS

| | | | |
|---|---|---|---|
| 7,188,388 B2 | 3/2007 | Best et al. | |
| 7,198,656 B2 | 4/2007 | Takemoto et al. | |
| 7,207,083 B2 | 4/2007 | Hayashi | |
| 7,222,393 B2 | 5/2007 | Kaffenberger et al. | |
| 7,278,181 B2 | 10/2007 | Harris et al. | |
| 7,296,322 B2 | 11/2007 | Park | |
| 7,318,249 B2 | 1/2008 | Lin | |
| 7,318,848 B2 | 1/2008 | Lee | |
| 7,329,294 B2 | 2/2008 | Conrad | |
| 7,335,242 B2 | 2/2008 | Oh | |
| 7,351,269 B2 | 4/2008 | Yau | |
| 7,354,468 B2 | 4/2008 | Arnold et al. | |
| 7,370,387 B2 | 5/2008 | Walker et al. | |
| 7,377,953 B2 | 5/2008 | Oh | |
| 7,410,516 B2 | 8/2008 | Ivarsson et al. | |
| 7,412,749 B2 | 8/2008 | Thomas et al. | |
| 7,419,520 B2 | 9/2008 | Lee et al. | |
| 7,448,363 B1 | 11/2008 | Rasmussen et al. | |
| 7,449,040 B2 | 11/2008 | Conrad et al. | |
| 7,488,362 B2 | 2/2009 | Jeong et al. | |
| 7,488,363 B2 | 2/2009 | Jeong et al. | |
| 7,494,520 B2 | 2/2009 | Nam et al. | |
| 7,547,337 B2 | 6/2009 | Oh et al. | |
| 7,547,338 B2 | 6/2009 | Kim et al. | |
| 7,553,347 B2 | 6/2009 | Burnham | |
| 7,597,730 B2 | 10/2009 | Yoo et al. | |
| 7,611,553 B2 | 11/2009 | Hato | |
| 7,645,309 B2 | 1/2010 | Jeong et al. | |
| 7,662,198 B2 | 2/2010 | Jansen et al. | |
| 7,686,861 B2 | 3/2010 | Oh | |
| 7,704,290 B2 | 4/2010 | Oh | |
| 7,736,408 B2 | 6/2010 | Bock | |
| 7,740,675 B2 | 6/2010 | Conrad | |
| 7,740,676 B2 | 6/2010 | Burnham et al. | |
| 7,749,293 B2 | 7/2010 | Conrad | |
| 7,770,256 B1 | 8/2010 | Fester | |
| 7,776,120 B2 | 8/2010 | Conrad | |
| 7,779,505 B2 | 8/2010 | Krebs et al. | |
| 7,779,506 B2 | 8/2010 | Kang et al. | |
| 7,794,515 B2 | 9/2010 | Oh | |
| 7,803,207 B2 | 9/2010 | Conrad | |
| 7,811,345 B2 | 10/2010 | Conrad | |
| 7,867,308 B2 | 1/2011 | Conrad | |
| 7,882,593 B2 | 2/2011 | Beskow et al. | |
| 7,887,612 B2 | 2/2011 | Conrad | |
| 7,938,871 B2 | 5/2011 | Lloyd | |
| 7,941,895 B2 | 5/2011 | Conrad | |
| 7,951,216 B2 | 5/2011 | Ha et al. | |
| 7,996,956 B2 | 8/2011 | Wood et al. | |
| 8,015,659 B2 | 9/2011 | Conrad et al. | |
| 8,021,453 B2 | 9/2011 | Howes | |
| 8,029,590 B2 | 10/2011 | Cheng | |
| 8,034,140 B2 | 10/2011 | Conrad | |
| 8,062,398 B2 | 11/2011 | Uo et al. | |
| 8,100,999 B2 | 1/2012 | Ashbee et al. | |
| 8,117,712 B2 | 2/2012 | Dyson et al. | |
| 8,127,398 B2 | 3/2012 | Conrad | |
| 8,146,201 B2 | 4/2012 | Conrad | |
| 8,151,407 B2 | 4/2012 | Conrad | |
| 8,152,877 B2 | 4/2012 | Greene | |
| 8,176,596 B2 | 5/2012 | Conrad | |
| 8,192,515 B2 | 6/2012 | Conrad | |
| 8,268,029 B2 | 9/2012 | Yoo | |
| 8,292,979 B2 | 10/2012 | Conrad | |
| 8,296,900 B2 | 10/2012 | Conrad | |
| 8,347,455 B2 | 1/2013 | Dyson et al. | |
| 8,349,428 B2 | 1/2013 | Conrad | |
| 8,370,993 B2 | 2/2013 | Conrad | |
| 8,375,508 B2 | 2/2013 | Conrad | |
| 8,402,599 B2 | 3/2013 | Charlton et al. | |
| 8,444,731 B2 | 5/2013 | Gomiciaga-Pereda et al. | |
| 8,448,291 B2 | 5/2013 | Conrad | |
| 8,479,358 B2 | 7/2013 | Conrad | |
| 8,484,799 B2 | 7/2013 | Conrad | |
| 8,486,170 B2 | 7/2013 | Conrad et al. | |
| 8,510,907 B2 | 8/2013 | Conrad | |
| 8,533,904 B2 | 9/2013 | Conrad | |
| 8,549,704 B2 | 10/2013 | Milligan et al. | |
| 8,561,257 B2 | 10/2013 | Conrad | |
| 8,567,005 B2 | 10/2013 | Conrad | |
| 8,578,550 B2 | 11/2013 | Conrad | |
| 8,578,553 B2 | 11/2013 | Conrad | |
| 8,590,102 B2 | 11/2013 | Conrad | |
| 8,591,615 B2 | 11/2013 | Kim et al. | |
| 8,607,407 B2 | 12/2013 | Conrad | |
| 8,621,709 B2 | 1/2014 | Conrad | |
| 8,640,304 B2 | 2/2014 | Conrad | |
| 8,646,147 B2 | 2/2014 | Conrad | |
| 8,659,184 B2 | 2/2014 | Conrad | |
| 8,677,554 B2 | 3/2014 | Conrad | |
| 8,677,558 B2 | 3/2014 | Conrad | |
| 8,713,751 B2 | 5/2014 | Conrad | |
| 8,763,201 B2 | 7/2014 | Kim et al. | |
| 8,813,305 B2 | 8/2014 | Conrad | |
| 8,834,209 B2 | 9/2014 | Conrad | |
| 8,863,352 B2 | 10/2014 | Conrad | |
| 8,869,344 B2 | 10/2014 | Conrad | |
| 8,869,345 B2 | 10/2014 | Conrad | |
| 8,869,348 B2 | 10/2014 | Conrad | |
| 8,870,988 B2 | 10/2014 | Oh et al. | |
| 8,875,340 B2 | 11/2014 | Conrad | |
| 8,875,342 B2 | 11/2014 | Conrad | |
| 8,926,723 B2 | 1/2015 | Kim | |
| 8,951,319 B2 | 2/2015 | Kim et al. | |
| 8,997,309 B2 | 4/2015 | Conrad | |
| 9,027,198 B2 | 5/2015 | Conrad | |
| 9,027,203 B2 | 5/2015 | Conrad et al. | |
| 9,066,642 B2 | 6/2015 | Conrad | |
| 9,119,513 B2 | 9/2015 | Conrad | |
| 9,161,666 B2 | 10/2015 | Conrad | |
| 9,161,669 B2 | 10/2015 | Conrad | |
| 9,167,944 B2 | 10/2015 | Conrad | |
| 9,204,769 B2 | 12/2015 | Conrad | |
| 9,204,773 B2 | 12/2015 | Conrad | |
| 9,215,960 B2 | 12/2015 | Conrad | |
| 9,226,633 B2 | 1/2016 | Conrad et al. | |
| 9,227,151 B2 | 1/2016 | Conrad | |
| 9,227,201 B2 | 1/2016 | Conrad | |
| 9,232,881 B2 | 1/2016 | Conrad | |
| 9,238,235 B2 | 1/2016 | Conrad | |
| 9,295,995 B2 | 3/2016 | Conrad | |
| 9,314,138 B2 | 4/2016 | Conrad | |
| 9,314,139 B2 | 4/2016 | Conrad et al. | |
| 9,320,401 B2 | 4/2016 | Conrad | |
| 9,326,652 B2 | 5/2016 | Conrad | |
| 9,364,127 B2 | 6/2016 | Conrad | |
| 9,427,122 B2 | 8/2016 | Conrad et al. | |
| 9,427,126 B2 | 8/2016 | Conrad | |
| 9,433,332 B2 | 9/2016 | Conrad | |
| 9,451,852 B2 | 9/2016 | Conrad | |
| 9,451,855 B2 | 9/2016 | Conrad | |
| 9,456,721 B2 | 10/2016 | Conrad | |
| 9,492,045 B2 | 11/2016 | Conrad | |
| 9,526,394 B2 | 12/2016 | Conrad | |
| 9,572,463 B2 | 2/2017 | Conrad | |
| 9,591,952 B2 | 3/2017 | Conrad | |
| 9,591,958 B2 | 3/2017 | Conrad | |
| 9,775,484 B2 | 10/2017 | Conrad | |
| 9,801,513 B2 | 10/2017 | Conrad et al. | |
| 9,820,621 B2 | 11/2017 | Conrad et al. | |
| 10,022,027 B2 | 7/2018 | Conrad | |
| 10,076,183 B2 | 9/2018 | Conrad et al. | |
| 10,149,587 B2 | 12/2018 | Conrad et al. | |
| 10,159,393 B2 | 12/2018 | Conrad | |
| 10,165,912 B2 | 1/2019 | Conrad | |
| 10,201,260 B2 | 2/2019 | Conrad et al. | |
| 10,214,349 B2 | 2/2019 | Conrad | |
| 10,251,519 B2 | 4/2019 | Conrad | |
| 10,286,338 B2 | 5/2019 | Levitt | |
| 10,357,136 B2 | 7/2019 | Conrad | |
| 10,537,216 B2 | 1/2020 | Conrad | |
| 10,537,219 B2 | 1/2020 | Conrad et al. | |
| 10,561,290 B2 | 2/2020 | Pi et al. | |
| 10,568,477 B2 | 2/2020 | Conrad | |

(56) References Cited

U.S. PATENT DOCUMENTS

| | | | |
|---|---|---|---|
| 10,575,693 B2 | 3/2020 | Conrad | |
| 10,667,663 B2 | 6/2020 | Conrad | |
| 10,687,679 B2 | 6/2020 | Conrad et al. | |
| 10,729,294 B2 | 8/2020 | Conrad et al. | |
| 10,791,890 B2 | 10/2020 | Conrad | |
| 10,888,205 B2 | 1/2021 | Conrad et al. | |
| 10,959,588 B2 | 3/2021 | Conrad et al. | |
| 11,198,085 B2 | 12/2021 | Conrad et al. | |
| 11,285,495 B2 | 3/2022 | Conrad | |
| 11,478,116 B2 | 10/2022 | Conrad | |
| 11,478,117 B2 | 10/2022 | Conrad et al. | |
| 11,534,041 B2 | 12/2022 | Conrad | |
| 11,534,043 B2 | 12/2022 | Conrad | |
| 11,571,097 B2 | 2/2023 | Conrad | |
| 11,793,374 B2 | 10/2023 | Conrad | |
| 11,857,142 B2 | 1/2024 | Conrad | |
| 11,950,745 B2 | 4/2024 | Conrad et al. | |
| 2001/0027587 A1 | 10/2001 | Conrad et al. | |
| 2002/0011050 A1 | 1/2002 | Hansen et al. | |
| 2002/0011053 A1 | 1/2002 | Oh | |
| 2002/0062531 A1 | 5/2002 | Oh | |
| 2002/0088208 A1 | 7/2002 | Lukac et al. | |
| 2002/0112315 A1 | 8/2002 | Conrad | |
| 2002/0134059 A1 | 9/2002 | Oh | |
| 2002/0134238 A1 | 9/2002 | Conrad et al. | |
| 2002/0162188 A1 | 11/2002 | Harmen | |
| 2002/0178535 A1 | 12/2002 | Oh et al. | |
| 2002/0178698 A1 | 12/2002 | Oh et al. | |
| 2002/0178699 A1 | 12/2002 | Oh | |
| 2003/0046910 A1 | 3/2003 | Lee | |
| 2003/0066273 A1 | 4/2003 | Choi et al. | |
| 2003/0159235 A1 | 8/2003 | Oh | |
| 2003/0159238 A1 | 8/2003 | Oh | |
| 2003/0159411 A1 | 8/2003 | Hansen et al. | |
| 2003/0200736 A1 | 10/2003 | Ni | |
| 2003/0201754 A1 | 10/2003 | Conrad | |
| 2004/0010885 A1 | 1/2004 | Hitzelberger et al. | |
| 2004/0025285 A1 | 2/2004 | McCormick et al. | |
| 2004/0163206 A1 | 8/2004 | Oh | |
| 2004/0216264 A1 | 11/2004 | Shaver et al. | |
| 2004/0216266 A1 | 11/2004 | Conrad | |
| 2005/0081321 A1* | 4/2005 | Milligan | A47L 9/2884 |
| | | | 15/344 |
| 2005/0132528 A1* | 6/2005 | Yau | A47L 9/20 |
| | | | 15/352 |
| 2005/0138763 A1 | 6/2005 | Tanner et al. | |
| 2005/0183406 A1* | 8/2005 | Coburn | A47L 5/24 |
| | | | 55/502 |
| 2005/0198769 A1 | 9/2005 | Lee et al. | |
| 2005/0198770 A1 | 9/2005 | Jung et al. | |
| 2005/0252179 A1 | 11/2005 | Oh et al. | |
| 2006/0037172 A1 | 2/2006 | Choi | |
| 2006/0042206 A1 | 3/2006 | Arnold et al. | |
| 2006/0090290 A1 | 5/2006 | Lau | |
| 2006/0090428 A1 | 5/2006 | Park et al. | |
| 2006/0123590 A1 | 6/2006 | Fester et al. | |
| 2006/0137304 A1 | 6/2006 | Jeong et al. | |
| 2006/0137306 A1 | 6/2006 | Jeong et al. | |
| 2006/0137309 A1 | 6/2006 | Jeong et al. | |
| 2006/0137314 A1 | 6/2006 | Conrad et al. | |
| 2006/0162298 A1 | 7/2006 | Oh et al. | |
| 2006/0162299 A1 | 7/2006 | North | |
| 2006/0168922 A1 | 8/2006 | Oh | |
| 2006/0168923 A1 | 8/2006 | Lee et al. | |
| 2006/0196004 A1 | 9/2006 | Conrad | |
| 2006/0207055 A1 | 9/2006 | Ivarsson et al. | |
| 2006/0207231 A1 | 9/2006 | Arnold | |
| 2006/0230715 A1 | 10/2006 | Oh et al. | |
| 2006/0230723 A1 | 10/2006 | Kim et al. | |
| 2006/0230724 A1 | 10/2006 | Han et al. | |
| 2006/0236663 A1 | 10/2006 | Oh | |
| 2006/0278081 A1 | 12/2006 | Han et al. | |
| 2007/0067944 A1 | 3/2007 | Kitamura | |
| 2007/0077810 A1 | 4/2007 | Gogel | |
| 2007/0079473 A1 | 4/2007 | Min | |
| 2007/0079585 A1 | 4/2007 | Oh et al. | |
| 2007/0084160 A1 | 4/2007 | Kim | |
| 2007/0095028 A1 | 5/2007 | Kim | |
| 2007/0095029 A1 | 5/2007 | Min | |
| 2007/0186372 A1* | 8/2007 | Rowntree | A47L 9/127 |
| | | | 15/319 |
| 2007/0209335 A1 | 9/2007 | Conrad | |
| 2007/0209338 A1 | 9/2007 | Conrad | |
| 2007/0226948 A1 | 10/2007 | Due | |
| 2007/0271724 A1 | 11/2007 | Hakan et al. | |
| 2007/0289089 A1 | 12/2007 | Yacobi | |
| 2007/0289264 A1 | 12/2007 | Oh | |
| 2007/0289266 A1 | 12/2007 | Oh | |
| 2008/0040883 A1* | 2/2008 | Beskow | A47L 9/20 |
| | | | 15/329 |
| 2008/0047091 A1 | 2/2008 | Nguyen | |
| 2008/0134460 A1 | 6/2008 | Conrad | |
| 2008/0134462 A1 | 6/2008 | Jansen et al. | |
| 2008/0172992 A1 | 7/2008 | Conrad | |
| 2008/0178416 A1 | 7/2008 | Conrad | |
| 2008/0178418 A1 | 7/2008 | Conrad | |
| 2008/0178420 A1 | 7/2008 | Conrad | |
| 2008/0179133 A1 | 7/2008 | Conrad | |
| 2008/0190080 A1 | 8/2008 | Oh et al. | |
| 2008/0196194 A1 | 8/2008 | Conrad | |
| 2008/0196366 A1 | 8/2008 | Conrad | |
| 2008/0216281 A1 | 9/2008 | Conrad | |
| 2008/0250601 A1* | 10/2008 | Coburn | A47L 5/24 |
| | | | 15/352 |
| 2008/0295466 A1 | 12/2008 | Cha et al. | |
| 2009/0019663 A1 | 1/2009 | Rowntree | |
| 2009/0113659 A1 | 5/2009 | Jeon | |
| 2009/0113663 A1 | 5/2009 | Follows et al. | |
| 2009/0151306 A1 | 6/2009 | Lin | |
| 2009/0165431 A1 | 7/2009 | Oh | |
| 2009/0183633 A1 | 7/2009 | Schiller et al. | |
| 2009/0205160 A1 | 8/2009 | Conrad | |
| 2009/0205161 A1 | 8/2009 | Conrad | |
| 2009/0205162 A1 | 8/2009 | Oh et al. | |
| 2009/0205298 A1 | 8/2009 | Hyun et al. | |
| 2009/0209666 A1 | 8/2009 | Hellberg et al. | |
| 2009/0223183 A1 | 9/2009 | Lin | |
| 2009/0229074 A1 | 9/2009 | Oh | |
| 2009/0229230 A1 | 9/2009 | Cheng | |
| 2009/0282639 A1 | 11/2009 | Dyson et al. | |
| 2009/0293221 A1 | 12/2009 | Hwang | |
| 2009/0305862 A1 | 12/2009 | Yoo | |
| 2009/0307863 A1 | 12/2009 | Milne et al. | |
| 2009/0307864 A1 | 12/2009 | Dyson | |
| 2010/0024154 A1* | 2/2010 | Beskow | A47L 9/20 |
| | | | 15/344 |
| 2010/0083456 A1 | 4/2010 | Norell et al. | |
| 2010/0083457 A1 | 4/2010 | Norell et al. | |
| 2010/0132316 A1 | 6/2010 | Ni | |
| 2010/0175217 A1 | 7/2010 | Conrad | |
| 2010/0212104 A1 | 8/2010 | Conrad | |
| 2010/0223752 A1 | 9/2010 | Conrad | |
| 2010/0224073 A1 | 9/2010 | Oh et al. | |
| 2010/0229322 A1 | 9/2010 | Conrad | |
| 2010/0229323 A1 | 9/2010 | Conrad | |
| 2010/0229325 A1 | 9/2010 | Conrad | |
| 2010/0229326 A1 | 9/2010 | Conrad | |
| 2010/0229334 A1 | 9/2010 | Conrad | |
| 2010/0229335 A1 | 9/2010 | Conrad | |
| 2010/0242210 A1 | 9/2010 | Conrad | |
| 2010/0243158 A1 | 9/2010 | Conrad | |
| 2010/0251507 A1 | 10/2010 | Conrad | |
| 2010/0293745 A1 | 11/2010 | Coburn | |
| 2010/0299865 A1 | 12/2010 | Conrad | |
| 2010/0299866 A1 | 12/2010 | Conrad | |
| 2011/0146024 A1 | 6/2011 | Conrad | |
| 2011/0219567 A1 | 9/2011 | Conrad | |
| 2011/0219570 A1 | 9/2011 | Conrad | |
| 2011/0219579 A1 | 9/2011 | Conrad | |
| 2011/0219733 A1 | 9/2011 | Greene | |
| 2011/0296648 A1 | 12/2011 | Kah, Jr. | |
| 2012/0047682 A1 | 3/2012 | Makarov et al. | |
| 2012/0159734 A1 | 6/2012 | Fujiwara | |
| 2012/0222245 A1 | 9/2012 | Conrad | |

(56)             References Cited

U.S. PATENT DOCUMENTS

| | | | |
|---|---|---|---|
| 2012/0222248 A1 | 9/2012 | Conrad | |
| 2012/0222249 A1 | 9/2012 | Conrad | |
| 2012/0222259 A1 | 9/2012 | Conrad | |
| 2012/0222262 A1 | 9/2012 | Conrad | |
| 2012/0304417 A1 | 12/2012 | Riley | |
| 2013/0091660 A1 | 4/2013 | Smith | |
| 2013/0091661 A1 | 4/2013 | Smith | |
| 2013/0091812 A1 | 4/2013 | Smith | |
| 2013/0091813 A1 | 4/2013 | Smith | |
| 2013/0255029 A1 | 10/2013 | Wolfe, Jr. et al. | |
| 2014/0237764 A1 | 8/2014 | Conrad | |
| 2014/0237768 A1 | 8/2014 | Conrad | |
| 2016/0015228 A1 | 1/2016 | Conrad et al. | |
| 2016/0174787 A1 | 6/2016 | Conrad | |
| 2017/0079489 A1 | 3/2017 | Dimbylow | |
| 2017/0209011 A1 | 7/2017 | Robinson et al. | |
| 2017/0303754 A1 | 10/2017 | Conrad et al. | |
| 2017/0319033 A1 | 11/2017 | Hyun et al. | |
| 2017/0332855 A1 | 11/2017 | Seo et al. | |
| 2018/0368639 A1 | 12/2018 | Peters et al. | |
| 2019/0008343 A1 | 1/2019 | Conrad et al. | |
| 2019/0200824 A1 | 7/2019 | Campbell-Hill | |
| 2019/0343356 A1 | 11/2019 | Kim et al. | |
| 2020/0214525 A1 | 7/2020 | Lu | |
| 2021/0401246 A1 | 12/2021 | Conrad | |
| 2022/0142440 A1 | 5/2022 | Conrad | |
| 2022/0151446 A1 | 5/2022 | Conrad et al. | |
| 2023/0118892 A1 | 4/2023 | Conrad | |
| 2023/0348169 A1 | 11/2023 | Conrad | |
| 2024/0138634 A1 | 5/2024 | Conrad | |
| 2024/0180373 A1 | 6/2024 | Conrad et al. | |

FOREIGN PATENT DOCUMENTS

| | | | |
|---|---|---|---|
| CA | 2275675 | A1 | 12/1999 |
| CA | 2288544 | A1 | 5/2000 |
| CA | 2289060 | A1 | 5/2000 |
| CA | 2258392 | A1 | 7/2000 |
| CA | 2258416 | A1 | 7/2000 |
| CA | 2258419 | A1 | 7/2000 |
| CA | 2258421 | A1 | 7/2000 |
| CA | 2258422 | A1 | 7/2000 |
| CA | 2258423 | A1 | 7/2000 |
| CA | 2258426 | A1 | 7/2000 |
| CA | 2258428 | A1 | 7/2000 |
| CA | 2330801 | A1 | 7/2001 |
| CA | 2412881 | A1 | 12/2001 |
| CA | 2338193 | A1 | 7/2002 |
| CA | 2339514 | A1 | 9/2002 |
| CA | 2342673 | A1 | 9/2002 |
| CA | 2342993 | A1 | 9/2002 |
| CA | 2658014 | A1 | 9/2010 |
| CA | 2658022 | A1 | 9/2010 |
| CA | 2658160 | A1 | 9/2010 |
| CA | 2658366 | A1 | 9/2010 |
| CA | 2658397 | A1 | 9/2010 |
| CA | 2658497 | A1 | 9/2010 |
| CA | 2658643 | A1 | 9/2010 |
| CA | 2658644 | A1 | 9/2010 |
| CA | 2659212 | A1 | 9/2010 |
| CA | 2754973 | | 10/2010 |
| CN | 1336154 | A | 2/2002 |
| CN | 1434688 | A | 8/2003 |
| CN | 1875846 | A | 12/2006 |
| CN | 1875855 | A | 12/2006 |
| CN | 1969739 | A | 5/2007 |
| CN | 100998484 | A | 7/2007 |
| CN | 101015436 | A | 8/2007 |
| CN | 101061932 | A | 10/2007 |
| CN | 101108106 | A | 1/2008 |
| CN | 101108110 | A | 1/2008 |
| CN | 101108111 | A | 1/2008 |
| CN | 201008534 | Y | 1/2008 |
| CN | 201008537 | Y | 1/2008 |
| CN | 101288574 | A | 10/2008 |

| | | | |
|---|---|---|---|
| CN | 201131706 | Y | 10/2008 |
| CN | 101489453 | A | 7/2009 |
| CN | 101489455 | A | 7/2009 |
| CN | 101489457 | A | 7/2009 |
| CN | 101489461 | A | 7/2009 |
| CN | 101612025 | A | 12/2009 |
| CN | 101657133 | A | 2/2010 |
| CN | 1679439 | B | 5/2010 |
| CN | 201617768 | U | 11/2010 |
| CN | 201719179 | U | 1/2011 |
| CN | 101984910 | A | 3/2011 |
| CN | 201840420 | U | 5/2011 |
| CN | 102125407 | A | 7/2011 |
| CN | 102188208 | A | 9/2011 |
| CN | 202277306 | U | 6/2012 |
| CN | 103040412 | A | 4/2013 |
| CN | 103040413 | A | 4/2013 |
| CN | 103169420 | A | 6/2013 |
| CN | 203400091 | U | 1/2014 |
| CN | 203852305 | U | 10/2014 |
| CN | 106343919 | A | 1/2017 |
| CN | 105078367 | B | 8/2017 |
| CN | 107468159 | A | 12/2017 |
| CN | 107890321 | A | 4/2018 |
| CN | 108567374 | A | 9/2018 |
| DE | 69110424 | T2 | 2/1996 |
| DE | 19704468 | A1 | 8/1998 |
| DE | 20109699 | U1 | 11/2001 |
| DE | 10056935 | C2 | 1/2003 |
| DE | 20311505 | U1 | 10/2003 |
| DE | 10110581 | C2 | 11/2003 |
| DE | 10360002 | A1 | 12/2004 |
| DE | 60116336 | T2 | 8/2006 |
| DE | 102004028678 | B4 | 9/2007 |
| DE | 102007011457 | A1 | 10/2007 |
| DE | 102004055192 | B4 | 11/2007 |
| DE | 102004028677 | A | 1/2008 |
| DE | 102005015004 | B4 | 2/2008 |
| DE | 102005008278 | B4 | 3/2008 |
| DE | 102006055099 | A1 | 5/2008 |
| DE | 102005014541 | B4 | 8/2008 |
| DE | 602006000726 | T2 | 4/2009 |
| DE | 102007059591 | A1 | 6/2009 |
| DE | 112007003039 | T5 | 10/2009 |
| DE | 112007003052 | T5 | 1/2010 |
| DE | 102008055045 | A1 | 6/2010 |
| DE | 102009035602 | A1 | 2/2011 |
| DE | 202011003563 | U1 | 5/2011 |
| DE | 112010001135 | T5 | 8/2012 |
| DE | 202012101457 | U1 | 8/2012 |
| DE | 112011104642 | T5 | 10/2013 |
| DE | 112012000251 | T5 | 10/2013 |
| DE | 102012223983 | A1 | 6/2014 |
| DE | 102013108564 | A1 | 3/2015 |
| EP | 0489468 | A1 | 6/1992 |
| EP | 1361814 | B2 | 10/2007 |
| EP | 1987753 | A2 | 11/2008 |
| EP | 1535564 | B1 | 8/2009 |
| EP | 2140793 | A1 | 1/2010 |
| EP | 1743562 | B1 | 9/2011 |
| EP | 1629758 | B1 | 10/2013 |
| EP | 1959809 | B1 | 5/2014 |
| EP | 2459043 | B1 | 9/2015 |
| EP | 2225993 | B1 | 2/2016 |
| FR | 2812531 | B1 | 11/2004 |
| GB | 1436403 | A | 5/1976 |
| GB | 2163703 | B | 1/1988 |
| GB | 2365324 | B | 7/2002 |
| GB | 2446939 | A | 8/2008 |
| GB | 2449607 | A | 11/2008 |
| GB | 2449484 | B | 4/2009 |
| GB | 2459300 | B | 3/2010 |
| GB | 2487387 | B | 9/2015 |
| JP | 2000140533 | A | 5/2000 |
| JP | 2003038398 | A | 2/2003 |
| JP | 2003245232 | A | 9/2003 |
| JP | 2003339593 | A | 12/2003 |
| JP | 2003339594 | A | 12/2003 |
| JP | 2003339595 | A | 12/2003 |

(56) References Cited

FOREIGN PATENT DOCUMENTS

| | | | |
|---|---|---|---|
| JP | 2003339596 | A | 12/2003 |
| JP | 2004121722 | A | 4/2004 |
| JP | 3656835 | B2 | 6/2005 |
| JP | 2005218512 | A | 8/2005 |
| JP | 3699679 | B2 | 9/2005 |
| JP | 2006272019 | A | 10/2006 |
| JP | 2006340935 | A | 12/2006 |
| JP | 2007089755 | A | 4/2007 |
| JP | 2008035887 | A | 2/2008 |
| JP | 4070638 | B2 | 4/2008 |
| JP | 2008154801 | A | 7/2008 |
| JP | 2008194177 | A | 8/2008 |
| JP | 2008246154 | A | 10/2008 |
| JP | 4208742 | B2 | 1/2009 |
| JP | 4231808 | B2 | 3/2009 |
| JP | 2009261501 | A | 11/2009 |
| JP | 2010081968 | A | 4/2010 |
| JP | 2010227287 | A1 | 10/2010 |
| JP | 1977264 | B2 | 7/2012 |
| JP | 5070322 | B2 | 11/2012 |
| JP | 5177814 | B2 | 4/2013 |
| JP | 5330909 | B2 | 10/2013 |
| JP | 5724218 | B2 | 5/2015 |
| JP | 6072502 | B2 | 2/2017 |
| JP | 6088784 | B2 | 3/2017 |
| KR | 1020010024752 | A | 3/2001 |
| KR | 1020020067489 | A | 8/2002 |
| KR | 1020020076900 | A | 10/2002 |
| KR | 1020020078593 | A | 10/2002 |
| KR | 1020040088978 | A | 10/2004 |
| KR | 1020050091821 | A | 9/2005 |
| KR | 1020050091824 | A | 9/2005 |
| KR | 1020050091826 | A | 9/2005 |
| KR | 1020050091829 | A | 9/2005 |
| KR | 1020050091830 | A | 9/2005 |
| KR | 1020050091833 | A | 9/2005 |
| KR | 1020050091834 | A | 9/2005 |
| KR | 1020050091835 | A | 9/2005 |
| KR | 1020050091836 | A | 9/2005 |
| KR | 1020050091837 | A | 9/2005 |
| KR | 1020050091838 | A | 9/2005 |
| KR | 1020050103343 | A | 10/2005 |
| KR | 1020050104613 | A | 11/2005 |
| KR | 1020050104614 | A | 11/2005 |
| KR | 1020060008365 | A | 1/2006 |
| KR | 1020060018004 | A | 2/2006 |
| KR | 10-572866 | B1 | 4/2006 |
| KR | 10-0572877 | B1 | 4/2006 |
| KR | 10-0634805 | B1 | 10/2006 |
| KR | 1020060112420 | A | 11/2006 |
| KR | 1020060118795 | A | 11/2006 |
| KR | 1020060118800 | A | 11/2006 |
| KR | 1020060118801 | A | 11/2006 |
| KR | 1020060118802 | A | 11/2006 |
| KR | 1020060118803 | A | 11/2006 |
| KR | 1020060119587 | A | 11/2006 |
| KR | 1020060122249 | A | 11/2006 |
| KR | 1020060125952 | A | 12/2006 |
| KR | 1020060125954 | A | 12/2006 |
| KR | 1020080029824 | A | 4/2008 |
| KR | 10-0880492 | B1 | 1/2009 |
| KR | 1020110021554 | A | 3/2011 |
| KR | 10-1134243 | B1 | 3/2012 |
| KR | 10-1306738 | B1 | 9/2013 |
| KR | 10-1770755 | B1 | 8/2017 |
| WO | 0010718 | A1 | 3/2000 |
| WO | 00/78546 | A1 | 12/2000 |
| WO | 2006026414 | A2 | 3/2006 |
| WO | 2008009883 | A1 | 1/2008 |
| WO | 2008009888 | A1 | 1/2008 |
| WO | 2008009890 | A1 | 1/2008 |
| WO | 2008065168 | A1 | 6/2008 |
| WO | 2008/034325 | A1 | 11/2008 |
| WO | 2008135708 | A1 | 11/2008 |
| WO | 2009026709 | A1 | 3/2009 |
| WO | 2010102396 | A1 | 9/2010 |
| WO | 201112476 | A1 | 2/2011 |
| WO | 2011025071 | A1 | 3/2011 |
| WO | 2011054106 | A1 | 5/2011 |
| WO | 2011078758 | A1 | 6/2011 |
| WO | 2012031077 | A1 | 3/2012 |
| WO | 2016206759 | A1 | 12/2016 |
| WO | 2017125706 | A1 | 7/2017 |
| WO | 2020143264 | A1 | 7/2020 |

OTHER PUBLICATIONS

English machine translation of 102004028678, as published on Sep. 6, 2007.
English machine translation of DE102004028677, as published on Jan. 10, 2008.
English machine translation of JP2010227287, as published on Oct. 14, 2010.
English machine translation of JP2010081968, as published on Apr. 15, 2010.
English machine translation of JP2009261501, as published on Nov. 12, 2009.
English machine translation of WO2008/034325, as published on Nov. 13, 2008.
English machine translation of JP2006272019, as published on Oct. 12, 2006.
English machine translation of JP2004121722, as published on Apr. 22, 2004.
English machine translation of JP2003245232, as published on Sep. 2, 2003.
English machine translation of CN203400091, as published on Jan. 22, 2014.
English machine translation of CN202277306, as published on Jun. 20, 2017.
English machine translation of CN201617768, as published on Nov. 3, 2010.
English machine translation of CN201131706, as published on Oct. 15, 2008.
English machine translation of CN201008534, as published on Jan. 23, 2008.
English machine translation of CN103169420, as published on Jun. 26, 2013.
English machine translation of CN103040413, as published on Apr. 17, 2013.
English machine translation of CN103040412, as published on Apr. 17, 2013.
English machine translation of CN102188208, as published on Sep. 21, 2011.
English machine translation of CN101657133, as published on Feb. 24, 2010.
English machine translation of CN101612025, as published on Dec. 30, 2009.
English machine translation of CN101489461, as published on Jul. 22, 2009.
English machine translation of CN101489457, as published on Jul. 22, 2009.
English machine translation of CN101489455, as published on Jul. 22, 2009.
English machine translation of CN101489453, as published on Jul. 22, 2009.
English machine translation of CN101288574, as published on Oct. 22, 2008.
English machine translation of CN101108111, as published on Jan. 23, 2008.
English machine translation of CN101108110, as published on Jan. 23, 2008.
English machine translation of CN101108106, as published on Jan. 23, 2008.
English machine translation of CN101061932, as published on Oct. 31, 2007.
English machine translation of CN101015436, as published on Aug. 15, 2007.

(56) References Cited

OTHER PUBLICATIONS

English machine translation of CN100998484, as published on Jul. 18, 2007.

English machine translation of DE69110424, as published on Feb. 1, 1996.

English machine translation of the Abstract for DE60116336, as published on Aug. 31, 2006.

English machine translation of DE20109699, as published on Nov. 15, 2001.

English machine translation of DE10360002, as published on Dec. 16, 2004.

English machine translation of DE10110581, as published on Nov. 13, 2003.

English machine translation of the Abstract DE10056935, as published on Jan. 16, 2003.

English machine translation of JP3656835, as published on Jun. 8, 2005.

English machine translation of CN1969739, as published on May 30, 2007.

English machine translation of CN1875855, as published on Dec. 13, 2006.

English machine translation of CN1875846, as published on Dec. 13, 2006.

English machine translation of CN1434688, as published on Aug. 6, 2003.

English machine translation of CN1336154, as published on Feb. 20, 2002.

English machine translation of WO201112476 as published on Feb. 3, 2011.

English machine translation of WO2008065168, as published on Jun. 5, 2008.

English machine translation of FR2812531, published on Nov. 5, 2004.

English machine translation of DE102013108564, published on Mar. 5, 2015.

English machine translation of DE102007059591, published on Jun. 18, 2009.

English machine translation of JP2008246154, published on Oct. 16, 2008.

English machine translation of JP2008194177, published on Aug. 28, 2008.

English machine translation of JP2008154801. published on Jul. 10, 2008.

English machine translation of JP2008035887, published on Feb. 21, 2008.

English machine translation of JP2007089755, published on Apr. 12, 2007.

English machine translation of JP2006340935, published on Dec. 21, 2006.

English machine translation of JP2005218512, published on Aug. 18, 2005.

English machine translation of JP2003339596, published on Dec. 2, 2003.

English machine translation of JP2003339595, published on Dec. 2, 2003.

English machine translation of JP2003339594, published on Dec. 2, 2003.

English machine translation of JP2003339593, published on Dec. 2, 2003.

English machine translation of JP2003038398, published on Feb. 12, 2003.

English machine translation of CN203852305, published on Oct. 1, 2014.

English machine translation of CN201840420, published on May 25, 2011.

English machine translation of CN201719179, published on Jan. 26, 2011.

English machine translation of CN107468159, published on Dec. 15, 2017.

English machine translation of CN105078367, published on Aug. 25, 2017.

English machine translation of CN102125407, published on Jul. 20, 2011.

English machine translation of CN101984910, published on Mar. 16, 2011.

English machine translation of DE20311505, published on Oct. 30, 2003.

English machine translation of DE19704468, published on Aug. 13, 1998.

English machine translation of JP6072502, published on Feb. 1, 2017.

English machine translation of EP2459043, published on Sep. 16, 2015.

English machine translation of EP1959809, published on May 21, 2014.

English machine translation of CN1679439, published on May 26, 2010.

English machine translation of EP1535564, published on Aug. 19, 2009.

English machine translation of KR10-0880492, published on Jan. 19, 2009.

English machine translation of KR10-0634805, published on Oct. 10, 2006.

English machine translation of KR10-0572877, published on Apr. 14, 2006.

English machine translation of KR10-572866, published on Apr. 14, 2006.

English machine translation of KR10-1770755, published on Aug. 23, 2017.

English machine translation of KR10-1306738, published on Sep. 4, 2013.

English machine translation of KR10-1134243, published on Mar. 30, 2012.

English machine translation of JP6088784, published on Mar. 1, 2017.

English machine translation of JP5724218, published on May 27, 2015.

English machine translation of JP5330909, published on Oct. 30, 2013.

English machine translation of JP5177814, published on Apr. 10, 2013.

English machine translation of JP5070322, published on Nov. 14, 2012.

English machine translation of JP4977264, published on Jul. 18, 2012.

English machine translation of JP4231808, published on Mar. 4, 2009.

English machine translation of JP4070638, published on Apr. 2, 2008.

English machine translation of JP3699679, published on Sep. 28, 2005.

English machine translation of JP4208742, published on Jan. 14, 2009.

English machine translation of KR1020110021554, as published on Mar. 4, 2011.

English machine translation of KR1020080029824, as published on Apr. 3, 2008.

English machine translation of KR1020060125954, as published on Dec. 7, 2006.

English machine translation of KR1020060125952, as published on Dec. 7, 2006.

English machine translation of KR1020060122249, as published on Nov. 30, 2006.

English machine translation of KR1020060119587, as published on Nov. 24, 2006.

English machine translation of KR1020060118803, as published on Nov. 24, 2006.

English machine translation of KR1020060118802, as published on Nov. 24, 2006.

English machine translation of KR1020060118801, as published on Nov. 24, 20-06.

(56) References Cited

OTHER PUBLICATIONS

English machine translation of KR1020060118800, as published on Nov. 24, 2006.
English machine translation of KR1020060118795, as published on Nov. 24, 2006.
English machine translation of KR1020060112420, as published on Nov. 1, 2006.
English machine translation of KR1020060018004, as published on Feb. 28, 2006.
English machine translation of KR1020060008365, as published on Jan. 26, 2006.
English machine translation of KR1020050104614, as published on Nov. 3, 2005.
English machine translation of KR1020050104613, as published on Nov. 3, 2005.
English machine translation of KR1020050103343, as published on Oct. 31, 2010.
English machine translation of KR1020050091838, as published on Sep. 15, 2005.
English machine translation of KR1020050091837, as published on Sep. 15, 2005.
English machine translation of KR1020050091836, as published on Sep. 15, 2005.
English machine translation of KR1020050091835, as published on Sep. 15, 2005.
English machine translation of KR1020050091834, as published on Sep. 15, 2005.
English machine translation of KR1020050091833, as published on Sep. 15, 2005.
English machine translation of KR1020050091830, as published on Sep. 15, 2005.
English machine translation of KR1020050091829, as published on Sep. 15, 2005.
English machine translation of KR1020050091826, as published on Sep. 15, 2005.
English machine translation of KR1020050091824, as published on Sep. 15, 2005.
English machine translation of KR1020050091821, as published on Sep. 15, 2005.
English machine translation of KR1020040088978, as published on Oct. 20, 2004.

English machine translation of KR1020020078593, as published on Oct. 19, 2002.
English machine translation of KR1020020076900, as published on Oct. 11, 2002.
English machine translation of KR1020020067489, as published on Aug. 22, 2002.
English machine translation of KR1020010024752, as published on Mar. 26, 2001.
English machine translation of DE602006000726, as published on Apr. 16, 2009.
English machine translation of DE202012101457, as published on Aug. 16, 2012.
English machine translation of DE202011003563, as published on May 19, 2011.
English machine translation of DE112012000251, as published on Oct. 17, 2013.
English machine translation of DE112011104642 as published on Oct. 2, 2013.
English machine translation of DE112010001135, as published on Aug. 2, 2012.
English machine translation of DE112007003052, as published on Jan. 14, 2010.
English machine translation of DE112007003039, as published on Oct. 29, 2009.
English machine translation of DE102012223983 as published on Jun. 26, 2014.
English machine translation of DE102009035602, as published on Feb. 10, 2011.
English machine translation of DE102008055045, as published on Jun. 24, 2010.
English machine translation of DE102007011457, as published on Oct. 25, 2007.
English machine translation of DE102006055099, as published on May 29, 2008.
English machine translation of DE102005015004, as published on Feb. 7, 2008.
English machine translation of DE102005014541, as published on Aug. 28, 2008.
English machine translation of DE102005008278, as published on Mar. 27, 2008.
English machine translation of DE102004055192, as published on Nov. 15, 2007.

* cited by examiner

SURFACE CLEANING APPARATUS

CROSS-REFERENCE TO RELATED APPLICATIONS

This application is a continuation of U.S. patent application Ser. No. 16/387,014, filed on Apr. 17, 2019, which itself claims priority to U.S. provisional patent application No. 62/660,700 filed on Apr. 20, 2018, the content of which is incorporated herein by reference.

FIELD

This disclosure relates generally to surface cleaning apparatus and, optionally, a portable surface cleaning apparatus, such as a hand vacuum cleaner. In some embodiments, the surface cleaning apparatus comprises a first stage momentum separator with a downstream air treatment member such as a cyclone. Alternately, or in addition, the surface cleaning apparatus may comprise a momentum separator having a wiper to clean an air exit screen of the momentum separator. Alternately, or in addition, the surface cleaning apparatus may comprise an on board energy storage member positioned in the air flow passage downstream of the pre-motor filter and upstream of the suction motor.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for hand vacuum cleaners, including battery-operated hand vacuum cleaners are known in the art.

SUMMARY

In one aspect, there is provided a hand vacuum cleaner, which has an upstream momentum separator and a downstream cyclone separator wherein both the momentum separator and the cyclone are concurrently openable.

In accordance with this aspect, there is provided a hand vacuum cleaner having a front end, a rear end and a longitudinal axis extending between the front and rear ends, the hand vacuum cleaner comprising:

(a) an air flow passage extending from a dirty air inlet to a clean air outlet;

(b) a first cleaning stage positioned in the air flow passage downstream from the dirty air inlet, the first cleaning stage comprising a momentum separator having a treatment chamber, the treatment chamber having an air inlet, an air outlet, a front end and a rear end;

(c) a second cleaning stage positioned in the air flow passage downstream from the first cleaning stage, the second cleaning stage comprising at least one cyclone, the at least one cyclone having a cyclone chamber;

(d) a front door moveably mounted between a closed position and an open position, wherein, when the front door is moved to the open position, a wall defining part of the treatment chamber and a wall defining part of the cyclone chamber are concurrently opened.

In some embodiments, the air inlet of the treatment chamber may be located at an upper end of the treatment chamber and directs air downwardly into the treatment chamber.

In some embodiments, the air inlet of the treatment chamber may remain in position when the front door is opened.

In some embodiments, the hand vacuum cleaner may have a front wall and the front wall is the front door.

In some embodiments, the rear end of the treatment chamber may extend generally transverse to the longitudinal axis and the air outlet of the treatment chamber may comprise a plurality of openings provided in the rear wall.

In some embodiments, the rear end of the treatment chamber may comprise a rear wall that extends generally transverse to the longitudinal axis and the rear wall may be moved concurrently with the front door.

In some embodiments, the rear end of the treatment chamber may comprise a rear wall that extends generally transverse to the longitudinal axis and the rear wall may comprise a wall of a dirt collection region of the at least one cyclone.

In some embodiments, the second cleaning stage may comprise a dirt collection chamber exterior to cyclone chamber and the dirt collection chamber and the cyclone chamber are opened concurrently.

In some embodiments, an end wall of the cyclone chamber may be attached to the rear wall of the treatment chamber.

In accordance with another aspect, a hand vacuum cleaner may have an air treatment chamber, which may be a momentum separator, wherein a front and rear wall of the air treatment chamber and concurrently moveable.

In accordance with this aspect, there is provided a hand vacuum cleaner having a front end, a rear end and a longitudinal axis extending between the front and rear ends, the hand vacuum cleaner comprising:

(a) an air flow passage extending from a dirty air inlet to a clean air outlet (b) a first cleaning stage positioned in the air flow passage downstream from the dirty air inlet, the first cleaning stage comprising a treatment chamber, the treatment chamber having an air inlet, an air outlet, a front end and a rear end, wherein the rear end of the treatment chamber comprises a rear wall that extends generally transverse to the longitudinal axis; and, (c) a front door moveable mounted between a closed position and an open position, wherein, when the front door is moved to the open position the rear wall of the treatment chamber is moved concurrently with the front door.

In some embodiments, the air inlet of the treatment chamber may be located at an upper end of the treatment chamber and directs air downwardly into the treatment chamber.

In some embodiments, the air inlet of the treatment chamber may remain in position when the front door is opened.

In some embodiments, the hand vacuum cleaner may have a front wall and the front wall is the front door.

In some embodiments, the air outlet of the treatment chamber may comprise a plurality of openings provided in the rear wall of the treatment chamber.

In some embodiments, the rear wall of the treatment chamber may comprise a wall of a dirt collection region of a second downstream cleaning stage.

In some embodiments, the second cleaning stage may comprise a dirt collection chamber exterior to a second stage treatment chamber and the dirt collection chamber and the second stage treatment chamber are opened concurrently.

In some embodiments, the second cleaning stage may comprise a cyclonic cleaning stage. In some embodiments, the cyclonic cleaning stage may comprise a cyclone chamber having an end wall and the end wall of the cyclone chamber is attached to the rear wall of the treatment chamber.

In accordance with another aspect, a hand vacuum cleaner has a first stage, which may be a momentum separator and a porous substrate (e.g., a screen or shroud) wherein the porous substrate is cleanable by a wiper.

In accordance with this aspect, there is provided a hand vacuum cleaner having a front end, a rear end and a longitudinal axis extending between the front and rear ends, the hand vacuum cleaner comprising:

(a) an air flow passage extending from a dirty air inlet to a clean air outlet;

(b) an air treatment member positioned in the air flow passage downstream from the dirty air inlet, the air treatment member comprising a treatment chamber, the treatment chamber having an air inlet, an air outlet, a front end and a rear end, the air outlet comprising an outer porous separating member;

(c) an outer wiper travelling across at least a portion of an outer wall of the porous separating member as the outer wiper moves between a first position and a second position; and, (d) a front door moveably mounted between a closed position and an open position, wherein the front wall is drivingly connected to the outer wiper whereby when the front door moves from the closed position to the open position, the outer wiper travels from the first position to the second position.

In some embodiments, the outer wiper may be mounted in a fixed orientation to the front door.

In some embodiments, the outer wiper may travel in an arcuate path as the front door moves from the closed position to the open position.

In some embodiments, the front door may comprise at least a substantial portion of the front wall of the treatment chamber.

In some embodiments, a porous filter media may be removably mounted downstream of the outer porous separating member and the porous filter media is removable when the front door is in the open position.

In some embodiments, the hand vacuum cleaner further comprises a hand grip attached to the porous filter media and the hand grip may be accessible when the front door is in the open position.

In some embodiments, the outer porous separating member may comprise an outer substrate having openings therein and a porous filter media may be removably positioned interior of the outer porous separating member.

In some embodiments, the outer wall may extend in more than one plane, at least a section of the outer wall that extends in more than one plane has openings therein, and the outer wiper may travel across at least a portion of the section of the outer wall that extends in more than one plane as the outer wiper moves between a first position to a second position.

In some embodiments, the outer wall may comprise first and second laterally spaced apart side walls, each of the first and second lateral side wall may extend generally longitudinally into the treatment chamber from the rear end of the treatment chamber, and the outer wiper may comprise a first lateral side outer wiper that travels across at least a portion of the first lateral side wall as the first lateral side outer wiper moves between the first position to the second position and a second lateral side outer wiper that travels across at least a portion of the second lateral side wall as the second lateral side outer wiper moves between the first position to the second position.

In some embodiments, the hand vacuum cleaner may further comprise an inner substrate having openings therein positioned inside the outer porous separating member and an inner wiper travelling across at least a portion of an outer wall of the inner substrate as the inner wiper moves between a first position to a second position.

In some embodiments, the porous separating member may comprise an outer substrate having openings therein, the outer substrate is moveable to an open position, and the inner wiper travels across at least a portion of the outer wall of the inner substrate when the outer substrate moves to the open position. The outer substrate may move to the open position when the front door moves to the open position.

In some embodiments, the hand vacuum cleaner may further comprise a further porous filter media inside the inner substrate.

In some embodiments, the outer porous separating member may comprise first and second spaced apart dirt separators, each of which is positioned in the treatment chamber.

In some embodiments, the wiper may comprise a first wiper portion that engages an outer surface of the first spaced apart dirt separator and a second wiper portion that engages an outer surface of the second spaced apart dirt separator.

In some embodiments, each of the first and second spaced apart dirt separators may comprise an outer substrate having openings therein and a further porous dirt separator is positioned interior each of the first and second spaced apart dirt separators.

In some embodiments, the hand vacuum cleaner may further comprise a vibrator in contact with the porous separating member.

In some embodiments, the outer wall of the porous separating member may be elastomeric and the hand vacuum cleaner further comprises a deformation actuator connected to the outer wall, the deformation actuator is moveable from a first position to a second position in which the outer wall is stretched compared to a configuration of the outer wall when the deformation actuator is in the first position.

In accordance with this aspect, there is also provided a hand vacuum cleaner having a front end, a rear end and a longitudinal axis extending between the front and rear ends, the hand vacuum cleaner comprising:

(a) an air flow passage extending from a dirty air inlet to a clean air outlet;

(b) an air treatment member positioned in the air flow passage downstream from the dirty air inlet, the air treatment member comprising a treatment chamber, the treatment chamber having an air inlet, an air outlet, a front end and a rear end, the air outlet comprising an outer porous separating member that is positioned in the treatment chamber, the outer porous separating member having an outer wall that extends in more than one plane, wherein at least a section of the outer wall that extends in more than one plane has openings therein;

(c) an outer wiper travelling across at least a portion of the section of the outer wall that extends in more than one plane as the outer wiper moves between a first position and a second position; and, (d) a moveable portion of a wall of the treatment chamber that is drivingly connected to the outer wiper whereby when the moveable portion of the wall moves from a closed position to an open position, the outer wiper travels from the first position to the second position.

In some embodiments, the outer wall may comprise first and second laterally spaced apart side walls, each of the first and second lateral side wall may extend generally longitudinally into the treatment chamber from the rear end of the treatment chamber, and the outer wiper may comprise a first lateral side outer wiper that travels across at least a portion of the first lateral side wall as the first lateral side outer wiper moves between the first position to the second position and a second lateral side outer wiper that travels across at least a portion of the second lateral side wall as the second lateral side outer wiper moves between the first position to the second position.

In some embodiments, the hand vacuum cleaner may further comprise an inner substrate having openings therein positioned inside the outer porous separating member and an inner wiper travelling across at least a portion of an outer wall of the inner substrate as the inner wiper moves between a first position to a second position.

In some embodiments, the outer porous separating member may comprise first and second spaced apart dirt separators, each of which is positioned in the treatment chamber.

In accordance with another aspect, the hand vacuum cleaner may comprise a plurality of nested porous substrates.

In accordance with this aspect, there is provided a hand vacuum cleaner having a front end, a rear end and a longitudinal axis extending between the front and rear ends, the hand vacuum cleaner comprising:

(a) an air flow passage extending from a dirty air inlet to a clean air outlet;

(b) an air treatment member positioned in the air flow passage downstream from the dirty air inlet, the air treatment member comprising a treatment chamber, the treatment chamber having an air inlet, an air outlet, a front end and a rear end, the air outlet comprising an outer substrate having openings therein that is positioned in the treatment chamber;

(c) an inner substrate having openings therein that is positioned interior the outer substrate; and, (d) a moveable portion of a wall of the treatment chamber that is driving connected to the outer substrate whereby when the moveable portion of the wall moves from a closed position to an open position, the outer substrate opens.

In some embodiments, the hand vacuum cleaner may further comprise an outer wiper that travels across at least a portion of the outer substrate as the outer wiper moves between a first position to a second position.

In accordance with another aspect, a hand vacuum cleaner also has a first cleaning stage, which is rotatable to an open position wherein as the first cleaning stage is opened a wiper cleans a porous substrate.

In accordance with this aspect, there is provided a hand vacuum cleaner having a front end, a rear end and a longitudinal axis extending between the front and rear ends, the hand vacuum cleaner comprising:

(a) an air flow passage extending from a dirty air inlet to a clean air outlet;

(b) an openable air treatment chamber positioned in the air flow passage downstream from the dirty air inlet, the air treatment chamber comprising an air treatment chamber air inlet, a porous dirt separator, a front end and a rear end, wherein a porous dirt separator comprises an air outlet of the air treatment chamber; and, (c) the air treatment chamber having a moveable portion rotatably mounted to a main body of the hand vacuum cleaner and a stationary portion, the moveable portion is moveable between a closed position in which the air treatment chamber is closed and an open position in which the air treatment chamber is opened, wherein the porous dirt separator is provided on the stationary portion and a wiper is drivenly connected to the moveable portion, whereby the wiper moves along at least a portion of the porous dirt separator as the moveable portion is rotated to the open position.

In some embodiments, the wiper may be provided on the moveable portion.

In accordance with another aspect, a surface cleaning apparatus such as a hand vacuum cleaner is provided with a cord reel.

In accordance with this aspect, there is provided a surface cleaning apparatus comprising:

(a) an air flow passage extending from a dirty air inlet to a clean air outlet;

(b) an air treatment member and a suction motor provided in the air flow passage;

(c) an on board energy storage member; and, (d) a cord reel connectable to a mains, wherein the cord reel includes an AC to DC power supply.

In some embodiments, the cord reel may be removably attached to the surface cleaning apparatus.

In some embodiments, the AC to DC power supply may be located centrally in the cord reel.

In some embodiments, the cord reel may be located interior the surface cleaning apparatus.

In some embodiments, the surface cleaning apparatus may comprise a hand vacuum cleaner and the cord reel is located interior the surface cleaning apparatus. The hand vacuum cleaner may have a handle and the cord reel is located interior the handle. The handle may have a pistol grip hand grip portion and the cord reel may be located at a lower end of the hand grip portion. Alternately, or in addition, the suction motor may be located at an upper end of the hand grip portion.

In accordance with this aspect, there is also provided a hand vacuum cleaner having an upper end and a lower end, the hand vacuum cleaner comprising (a) an air flow passage extending from a dirty air inlet to a clean air outlet;

(b) an air treatment member and a suction motor provided in the air flow passage;

(c) a handle; and, (d) a cord reel located interior the handle.

In some embodiments, the handle may have a pistol grip hand grip portion and the cord reel is located at a lower end of the hand grip portion.

In some embodiments, the suction motor may be located at an upper end of the hand grip portion.

In some embodiments, the cord reel may include an AC to DC power supply.

In some embodiments, the AC to DC power supply may be located interior of the cord reel.

In accordance with this aspect, there is also provided a hand vacuum cleaner having an upper end and a lower end, the hand vacuum cleaner comprising:

(a) an air flow passage extending from a dirty air inlet to a clean air outlet;

(b) an air treatment member and a suction motor provided in the air flow passage;

(c) a handle;

(d) an energy storage member; and, (e) a cord reel detachably mounted to the hand vacuum cleaner.

In some embodiments, the handle may have a pistol grip hand grip portion and the cord reel is located at a lower end of the hand grip portion.

In some embodiments, the suction motor may be located at an upper end of the hand grip portion.

In some embodiments, the energy storage member may be located in the handle.

In some embodiments, the cord reel may include an AC to DC power supply.

In some embodiments, the AC to DC power supply may be located interior of the cord reel.

In some embodiments, the energy storage member may be located in the handle.

In accordance with another aspect, a vacuum cleaner, such as a hand vacuum cleaner, has dual air treatment chambers, such as cyclone chambers or momentum separators, and a valve that may be used to adjust the air flow into a selected one or both of the air treatment chambers.

In accordance with this aspect, there is provided a surface cleaning apparatus having a front end, a rear end and a longitudinal axis extending between the front and rear ends, the surface cleaning apparatus comprising:

(a) an air flow passage extending from a dirty air inlet to a clean air outlet;

(b) an air treatment member positioned in the air flow passage downstream from the dirty air inlet, the air treatment member comprising first and second treatment chambers in parallel, each treatment chamber having an air inlet, an air outlet, a front end and a rear end; and, (c) an air inlet passage extending from the dirty air inlet to a valve positioned upstream of the air inlet of the first treatment chamber and the second treatment chamber, wherein the valve is adjustable to adjust an amount of air provided to each of the first and second treatment chambers.

In some embodiments, the valve may be adjustable between a first position in which air is provided only to the first treatment chamber and a second position in which air is provided only to the second treatment chamber.

In some embodiments, the valve may be adjustable to a third position in which air is provided to both the first treatment chamber and the second treatment chamber.

In some embodiments, the valve may be user actuatable.

In some embodiments, the valve may be automatically adjusted based on the rate of flow into each of the first and second treatment chambers.

In some embodiments, (a) the air outlet of the first treatment chamber may comprise a first porous dirt separator having a first outer wall that has openings therein, the first treatment chamber further comprises a first wiper that travels across at least a portion of the first outer wall as the first wiper moves between a first position to a second position; and, (b) the air outlet of the second treatment chamber may comprise a second porous dirt separator having a second outer wall that has openings therein, the second treatment chamber further comprises a second wiper that travels across at least a portion of the second outer wall as the second wiper moves between a first position to a second position.

In some embodiments, the valve may be adjustable between a first position in which air is provided only to the first treatment chamber when the second wiper is moved between the first and second positions and a second position in which air is provided only to the second treatment chamber when the first wiper is moved between the first and second positions.

In some embodiments, the second wiper may be moved between the first and second positions when the second treatment chamber is opened for emptying and the first wiper is moved between the first and second positions when the first treatment chamber is opened for emptying.

In some embodiments, each porous dirt separator may comprise an outer substrate having openings therein and a porous filter media is removably positioned interior of the outer porous dirt separator.

In some embodiments, each outer wall may extend in more than one plane, at least a section of the outer wall that extends in more than one plane has openings therein, and the wiper travels across at least a portion of the section of the outer wall that extends in more than one plane as the wiper moves between a first position to a second position.

In some embodiments, each outer wall may comprise first and second laterally spaced apart side walls, each of the first and second lateral side wall may extend generally longitudinally into the treatment chamber from the rear end of the treatment chamber, and the wiper may comprise a first lateral side outer wiper that travels across at least a portion of the first lateral side wall as the first lateral side outer wiper moves between the first position to the second position and a second lateral side outer wiper that travels across at least a portion of the second lateral side wall as the second lateral side outer wiper moves between the first position to the second position.

In some embodiments, the surface cleaning apparatus may further comprise an inner substrate openings therein positioned inside each of the outer substrates and an inner wiper travelling across at least a portion of an outer wall of the inner substrate as the inner wiper moves between a first position to a second position.

In some embodiments, the outer substrate may be moveable to an open position, and the inner wiper travels across at least a portion of the outer wall of the inner substrate when the outer substrate moves to the open position.

In some embodiments, the surface cleaning apparatus may further comprise a suction motor provided in the air flow passage, the suction motor is operable in a low power mode and a high power mode, wherein the valve is adjustable between a first position in which air is provided only to the first treatment chamber when the suction motor is operated in the low power mode and a second position in which air is provided to both the first and second treatment chambers when the suction motor is operated in the high power mode.

In accordance with another aspect, an energy storage member may be positioned in the air flow path through the surface cleaning apparatus at a location upstream of the suction motor whereby the air flow may cool the energy storage member during use of the surface cleaning apparatus.

In accordance with this aspect, there is provided a hand vacuum cleaner having an upper end and a lower end, the hand vacuum cleaner comprising:

(a) an air flow passage extending from a dirty air inlet to a clean air outlet;

(b) a main body having a handle, the handle having a pistol grip hand grip portion, the hand grip portion having an upper end and a lower end (c) an air treatment member provided in the air flow passage;

(d) an on board energy storage member positioned in the air flow passage downstream of the air treatment member, the on board energy storage member is positioned at the upper end of the hand grip portion; and, (e) a suction motor provided in the air flow passage downstream of the energy storage member, the suction motor is positioned below the energy storage member.

In some embodiments, the suction motor may be positioned at the lower end of the hand grip portion.

In some embodiments, the energy storage member may be provided in a housing and, during operation of the hand vacuum cleaner, air passes over an outer surface of a wall of the housing as the air travels from the air treatment member to the suction motor.

In some embodiments, the energy storage member may be provided in a battery pack and, during operation of the hand vacuum cleaner, air passes over an outer surface of the battery pack as the air travels from the air treatment member to the suction motor and the battery pack is removably mounted in the hand vacuum cleaner.

In some embodiments, the energy storage member may be provided in a battery pack and the battery pack is removably mounted in the hand vacuum cleaner.

In some embodiments, during operation of the hand vacuum cleaner, air may pass downwardly through the hand grip portion to the suction motor.

In some embodiments, the hand vacuum cleaner may further comprise a pre-motor filter provided in the air flow passage downstream of the air treatment member and upstream of the energy storage member.

In some embodiments, the air treatment member may comprise a treatment chamber and a pre-motor filter is provided in the air flow passage downstream of the treatment chamber and upstream of the on board energy storage member.

In accordance with this aspect, there is also provided a hand vacuum cleaner having an upper end and a lower end, the hand vacuum cleaner comprising:

(a) an air flow passage extending from a dirty air inlet to a clean air outlet;

(b) an air treatment member and a suction motor provided in the air flow passage;

(c) a pre-motor filter positioned in the air flow passage downstream from the air treatment member;

(d) an on board energy storage member positioned in the air flow passage downstream of the pre-motor filter and upstream of the suction motor; and, (e) a handle.

In some embodiments, the air treatment member may comprise a treatment chamber.

In some embodiments, the air treatment chamber may comprise a momentum separator chamber.

In some embodiments, the air treatment chamber may comprise a cyclone chamber.

In some embodiments, the handle may have a hand grip portion having an upper end and a lower end, and the suction motor may be positioned at the lower end of the hand grip portion.

In some embodiments, during operation of the hand vacuum cleaner, air may pass downwardly through the hand grip portion to the suction motor.

In some embodiments, the energy storage member may be positioned at the upper end of the hand grip portion.

In some embodiments, the energy storage member may be provided in a housing and, during operation of the hand vacuum cleaner, air may pass over an outer surface of a wall of the housing as the air travels from the air treatment member to the suction motor.

In some embodiments, the energy storage member may be provided in a battery pack and, during operation of the hand vacuum cleaner, air may pass over an outer surface of the battery pack as the air travels from the air treatment member to the suction motor and the battery pack is removably mounted in the hand vacuum cleaner.

In some embodiments, the energy storage member may be provided in a battery pack and the battery pack is removably mounted in the hand vacuum cleaner.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

General Description of a Vacuum Cleaner

Figure 1:
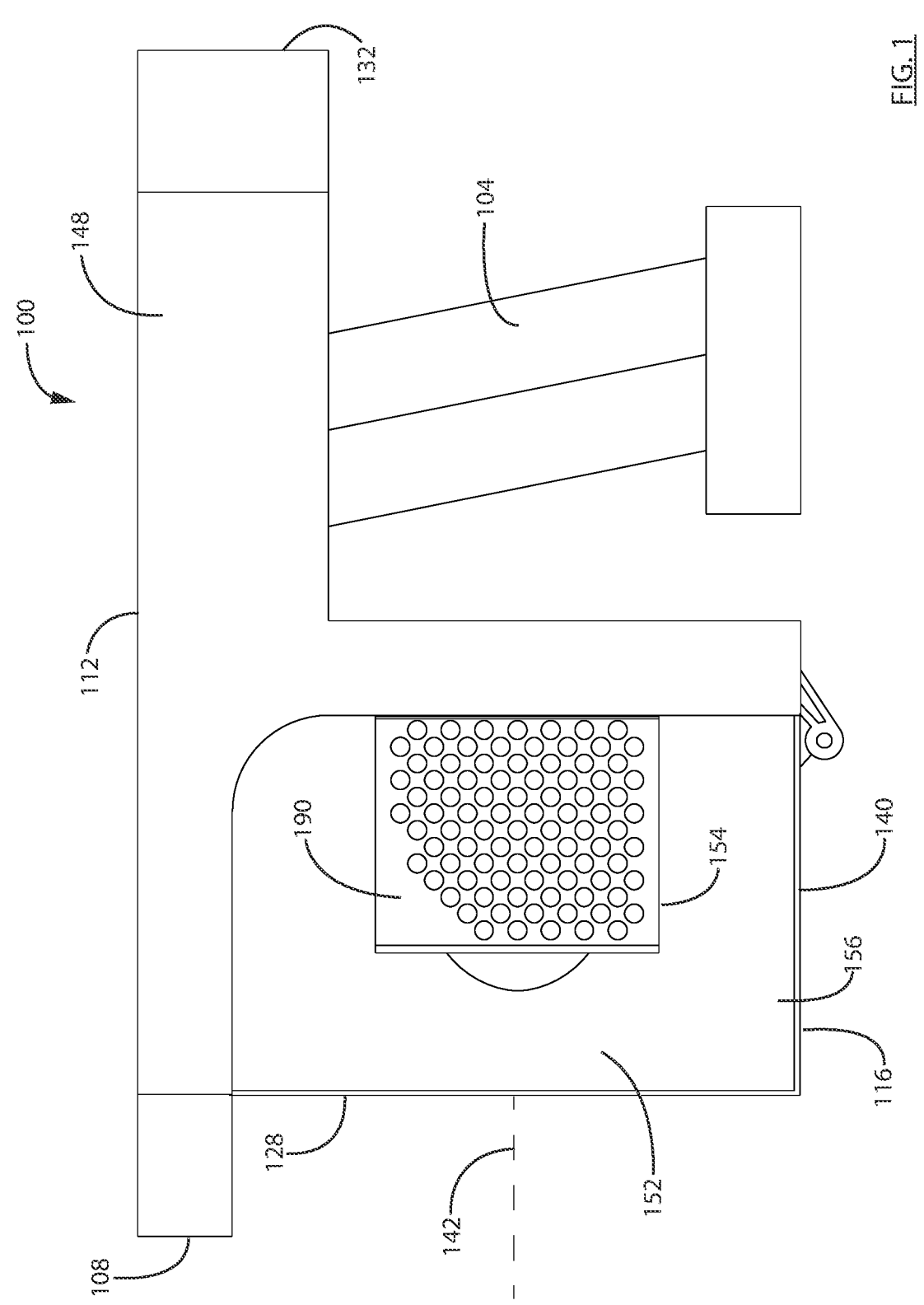
FIG. 1 is a side elevation view of a surface cleaning apparatus, in accordance with an embodiment.
Figure 2:
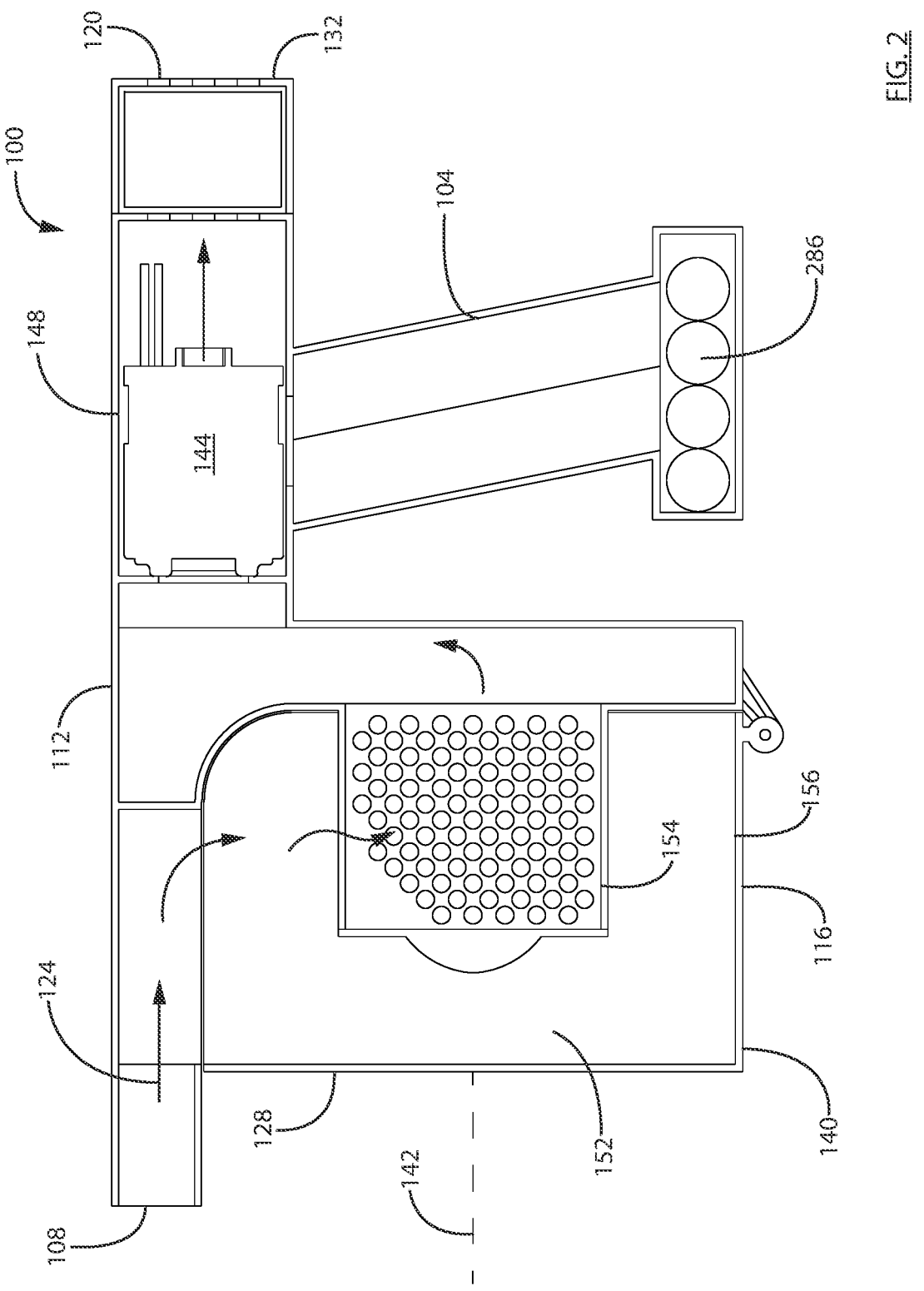
FIG. 2 is a cross-sectional view of the surface cleaning apparatus of FIG. 1.

Referring to FIGS. 1-2, an exemplary embodiment of a surface cleaning apparatus is shown generally as 100. The following is a general discussion of apparatus 100, which provides a basis for understanding several of the features that are discussed herein. As discussed subsequently, each of the features may be used individually or in any particular combination or sub-combination in this or in other embodiments disclosed herein.

Embodiments described herein include an improved air treatment member 116, an improved air treatment system, a surface cleaning apparatus 100 including the same and the configuration of the surface cleaning apparatus. Surface cleaning apparatus 100 may be any type of cleaning apparatus, including for example a hand vacuum cleaner, a stick vacuum cleaner, a canister vacuum cleaner, and an upright vacuum cleaner.

In FIGS. 1-2, surface cleaning apparatus 100 is illustrated as a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together such as by an adhesive or welding, so as to move as one while maintaining a constant orientation relative to each other. This is to be contrasted with canister and upright vacuum cleaners, whose weight is typically supported by a surface (e.g. a floor) during use. When a canister vacuum cleaner is operated or when an upright vacuum cleaner is operated in a 'lift-away' configuration, a second hand is typically required to direct the dirty air inlet at the end of a flexible hose.

In any of the embodiments disclosed herein, surface cleaning apparatus 100 may include a handle 104 that has a pistol grip (e.g. extends forwardly and upwardly) as shown, or that is oriented in another manner.

Still referring to FIGS. 1-2, surface cleaning apparatus 100 includes a main body 112 having an air treatment member 116 (which may be permanently affixed to the main body 112 or may be removable therefrom for emptying), a dirty air inlet 108, a clean air outlet 120, and an air flow path 124 extending between the dirty air inlet 108 and the clean air outlet 120.

Surface cleaning apparatus 100 has a front end 128, a rear end 132, an upper end (also referred to as the top) 136, and a lower end (also referred to as the bottom) 140. In the embodiment shown, dirty air inlet 108 is at an upper portion of apparatus front end 128 and clean air outlet 120 is at a rearward portion of apparatus 100 at apparatus rear end 132. It will be appreciated that dirty air inlet 108 and clean air outlet 120 may be positioned in different locations of apparatus 100. A longitudinal axis 142 extends between the front and rear ends 128, 132.

A suction motor 144 is provided to generate vacuum suction through air flow path 124, and is positioned within a motor housing 148 (which may be part of the main body 112). Suction motor 144 may be a fan-motor assembly including an electric motor and impeller blade(s). In the illustrated embodiment, suction motor 144 is positioned in the air flow path 124 downstream of air treatment member 116. In this configuration, suction motor 144 may be referred to as a "clean air motor". Alternatively, suction motor 144 may be positioned upstream of air treatment member 116, and referred to as a "dirty air motor".

Air treatment member 116 is configured to remove particles of dirt and other debris from the air flow. In the illustrated example, air treatment member 116 includes a treatment chamber 152 having porous dirt separator 154, and a dirt collection chamber 156 (also referred to as a "dirt collection region", "dirt collection bin", "dirt bin", or "dirt chamber"). In the illustrated example, dirt collection chamber 156 is a region of treatment chamber 152 where separated dirt may accumulate until dirt collection chamber 156 is emptied. Alternatively or in addition, air treatment member 116 may include a dirt collection chamber 156 that is external to treatment chamber 152. Porous dirt separator 154 may include a rigid porous member (e.g., a fine mesh screen and/or a plastic shroud having a plurality of openings therein), a filter (e.g. felt, foam, PTFE, HEPA media, low penetration, paper, paper-wax, cellulose, or other filter media), or a combination of one or more rigid porous members and one or more filters. Porous dirt separator 154 and dirt chamber 156 may be of any configuration suitable for separating dirt from an air stream and collecting the separated dirt, respectively.

Figure 3:
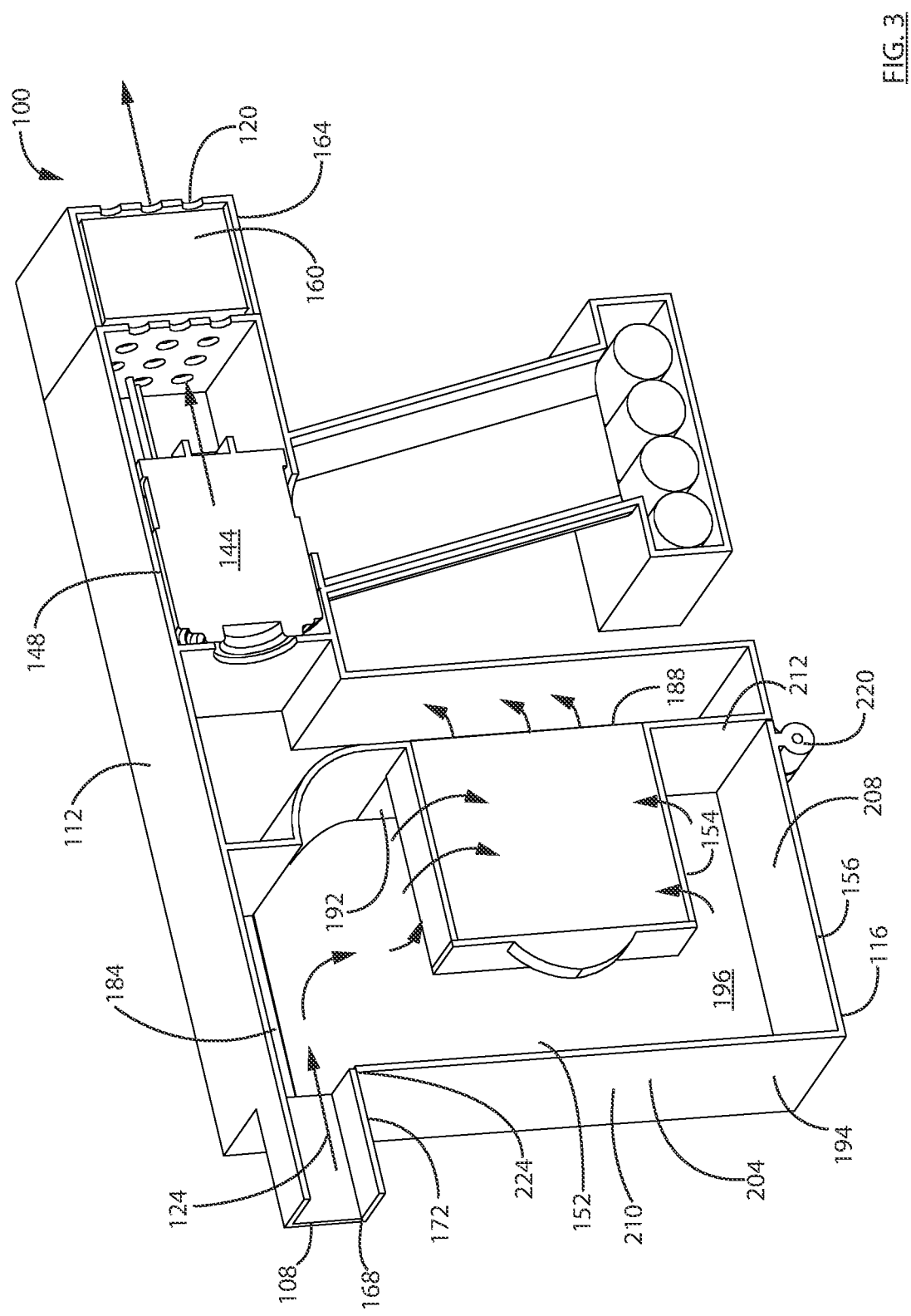
FIG. 3 is a perspective view of the cross-section of FIG. 2, with a treatment chamber in a closed position.

Referring to FIG. 3, hand vacuum cleaner 100 may include a post-motor filter 160 provided in the air flow path 124 downstream of suction motor 144 (e.g., in a post motor filter housing 164 that may be part of main body 112). Post-motor filter 160 may be formed from any suitable physical, porous filter media. For example, post-motor filter 160 may be one or more of a foam filter, felt filter, HEPA filter, or other physical filter media. In some embodiments, post-motor filter 160 may include an electrostatic filter, or the like. As shown, post-motor filter 160 may be located in a post-motor filter housing 164. In other embodiments, hand vacuum cleaner 100 may have neither a post-motor filter 160 nor a post-motor filter housing 164.

In the illustrated embodiment, dirty air inlet 108 may be the inlet end 168 of an air inlet conduit 172. Optionally as exemplified, inlet end 168 of air inlet conduit 172 can be used as a nozzle to directly clean a surface. Alternatively, or in addition to functioning as a nozzle, air inlet conduit 172 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may extend forward of air treatment member 116, although this need not be the case.

In the embodiment of FIG. 3, air treatment member 116 comprises a treatment chamber 152 having a porous dirt separator 154 located in the air flow path between the treatment chamber air inlet 184 and a treatment chamber air outlet 188. Treatment chamber 152 may have a front end 210, a rear end 212, a pair of laterally opposed sidewalls 196 extend longitudinally between the front and rear ends 210, 212, and front and bottom walls 204, 208 which extend laterally and connect the left and right sidewalls 196. As exemplified, the porous dirt separator 154 may define the location at which air exits the volume of the treatment chamber 152 and is subjected to physical filtration by passing through the porous dirt separator and the treatment chamber air outlet 188 may be characterized as the location at which air exits the air treatment member 116.

As exemplified, the treatment chamber air inlet 184 may be at an opposite end of the air treatment member 116 from the treatment chamber air outlet 188. The treatment chamber air inlet 184 may be located at the downstream end of the air inlet conduit 172 and forward of the porous dirt separator 154. As exemplified, the treatment chamber air inlet 184 may be at an upper end of the air treatment chamber 116. Accordingly, as exemplified, air may travel downwardly into the air treatment chamber 116 and then rearwardly to the porous dirt separator 154. Accordingly, as air enters the air treatment chamber 116, heavier dirt particles may fall downwardly to dirt collection chamber 156. In other embodiments, the treatment chamber air inlet 184 and outlet 188 may be positioned at different locations.

In operation, after activating suction motor 144, dirty air enters apparatus 100 through dirty air inlet 108 and is directed along air inlet conduit 172 to the treatment chamber air inlet 184. Dirt particles and other debris (hereafter "dirt") may be separated from the dirty air flow as the dirty air flows through the air treatment chamber 116 and as air passes through the porous dirt separator 154 before exiting treatment chamber air outlet 188. At least some of the separated dirt may collect within dirt chamber 156 until dirt chamber 156 is emptied. For example, if the air treatment chamber 116 is a momentum separator as exemplified, then some, e.g., the heavier, dirt may be separated from the inflow air steam by gravity due to the air flow rate decreasing as it enters the air treatment chamber 116 and/or a change in the direction of the air flow as it enters the air treatment chamber. Additional dirt may be separated by the porous dirt separator 154 due to filtration.

From treatment chamber air outlet 188, the air flow may be directed into motor housing 148, drawn into suction motor 144 and then discharged from apparatus 100 through post-motor filter 160 before exiting clean air outlet 120.
Air Treatment Member Wipers In accordance with one aspect of this disclosure, in some embodiments, the air treatment member may include one or more wipers that travel across an upstream surface of a porous dirt separator. Removing dirt that is on an exterior surface of the porous dirt separator 154 may reduce the back pressure through the air treatment chamber by removing material that may partially clog the porous dirt separator 154. The air treatment member wipers may be used by themselves or in combination with one or more of the multi-stage perforated substrates, openable pre-motor filter chamber, the nested porous separating members, the valving for multiple treatment chambers, the debriding devices, the bypass valve, the power components configurations and the use of a sequential momentum separator and cyclone as disclosed herein.

The air treatment chamber 152 have a moveable portion and a stationary portion. The moveable portion is moveable between a closed position, in which the air treatment chamber 152 is closed, and an open position in which the air treatment chamber 152 is emptyable. In some embodiments, one or more wipers may travel across an upstream surface 190 of a porous dirt separator 154 as the air treatment chamber 152 is opened (e.g., a door, a sidewall or other portion of the walls defining the air treatment chamber 152 is moved from the closed position to the open position).

For example, the wiper may brush, slide, or scape the porous dirt separator as the treatment chamber is opened. This may remove dirt from surfaces of the porous dirt separator, whereby the filtration capacity of the porous dirt separator may be restored (this may be referred to herein as emptying or cleaning the porous dirt separator). For example, dirt removed from the porous dirt separator by the wiper may collect in the dirt collection region of the treatment chamber that is being opened or may exit the treatment chamber with the dirt collection in the dirt collection region. In this case, the air treatment member may allow the user to clean the porous dirt separator simultaneously as the user opens the treatment chamber for emptying. This may reduce or eliminate user contact required to clean the dirty porous dirt separator, and may reduce the steps required for a user to clean the porous dirt separator and empty the treatment chamber (e.g. as compared with opening the treatment chamber and then manually removing, cleaning, and reinstalling the porous dirt separator). The openable portion of the air treatment member 116 may be driving connected to the wiper (e.g., the portion of the air treatment member 116 that opens may move a driving member and the driving member may engage and move the wiper) or the wiper may be connected (e.g., non-moveably connected) to the portion of the air treatment member 116.

Alternately, or in addition, porous dirt separator 154 may be openable. Opening the air treatment chamber 152 may open (e.g., concurrently open) porous dirt separator 154 or enable the porous dirt separator 154 to subsequently be opened (see e.g., FIGS. 6 and 10). Porous dirt separator 154 may house a further air treatment member, such as a second stage porous dirt separator 154 and/or a filter. Accordingly, porous dirt separator 154 may be openable for emptying and/or removing a further air treatment member, such as a second stage porous dirt separator 154 and/or a filter. For example, opening treatment chamber 152 may also provide user-access to porous dirt separator 154, which may include one or more substrates (e.g. screens, shrouds), one or more filters (also referred to as a "physical filter media" or a 'filter media'), or combinations thereof. Dirt chamber 156 may be a region of an openable treatment chamber 152, whereby opening treatment chamber 152 opens both of chambers 152, 156, as well as providing access to porous dirt separator 154.

Figure 4:
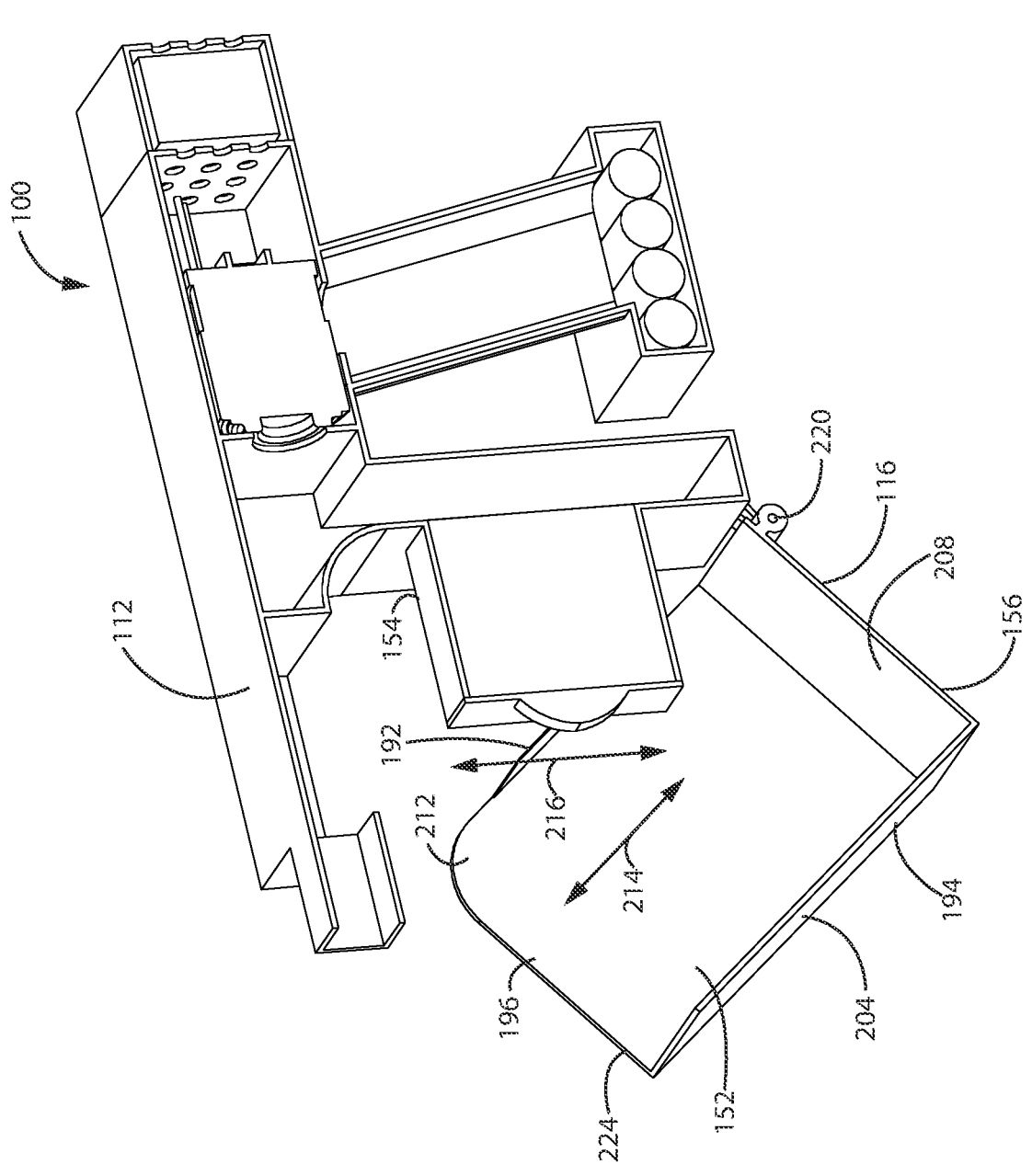
FIG. 4 is a perspective view of the cross-section of FIG. 2, with the treatment chamber in an open position.
Figure 5:
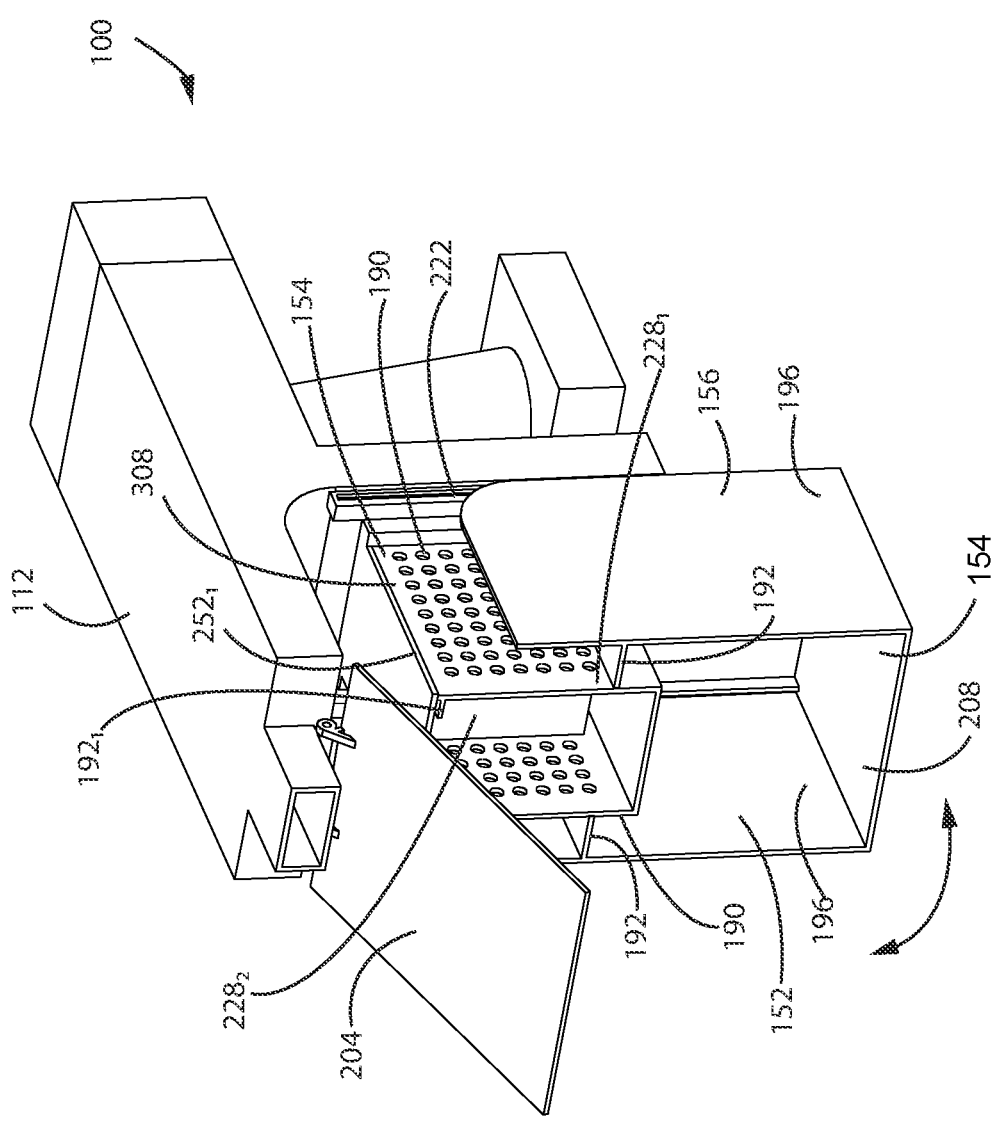
FIG. 5 is a perspective view of a surface cleaning apparatus, with a treatment chamber in an open position, in accordance with another embodiment.

As exemplified in FIGS. 4 and 5, in some embodiments, the act of opening the treatment chamber 152 may wipe dirt from some or all of an upstream surface 190 (FIG. 1) of porous dirt separator 154. As exemplified, porous dirt separator 154 may be positioned inside treatment chamber 152, whereby dirt that falls from the porous dirt separator 154 may collect in treatment chamber 152 (to be poured out with the dirt that has accumulated in the treatment chamber 152)

or it may be emptied concurrently with the dirt that has already accumulated in treatment chamber 152. As exemplified, treatment chamber 152 may include wipers 192 that make direct wiping contact with (e.g. brush, slide, or scrape) separator upstream surface 190 (FIG. 1) during the act of opening treatment chamber 152. Wipers 192 may be rigid (e.g. hard plastic or metal scraper or stiff brush) or flexible (e.g. silicone spatula or soft bristled brush), or include both rigid and flexible elements.

Figure 6:
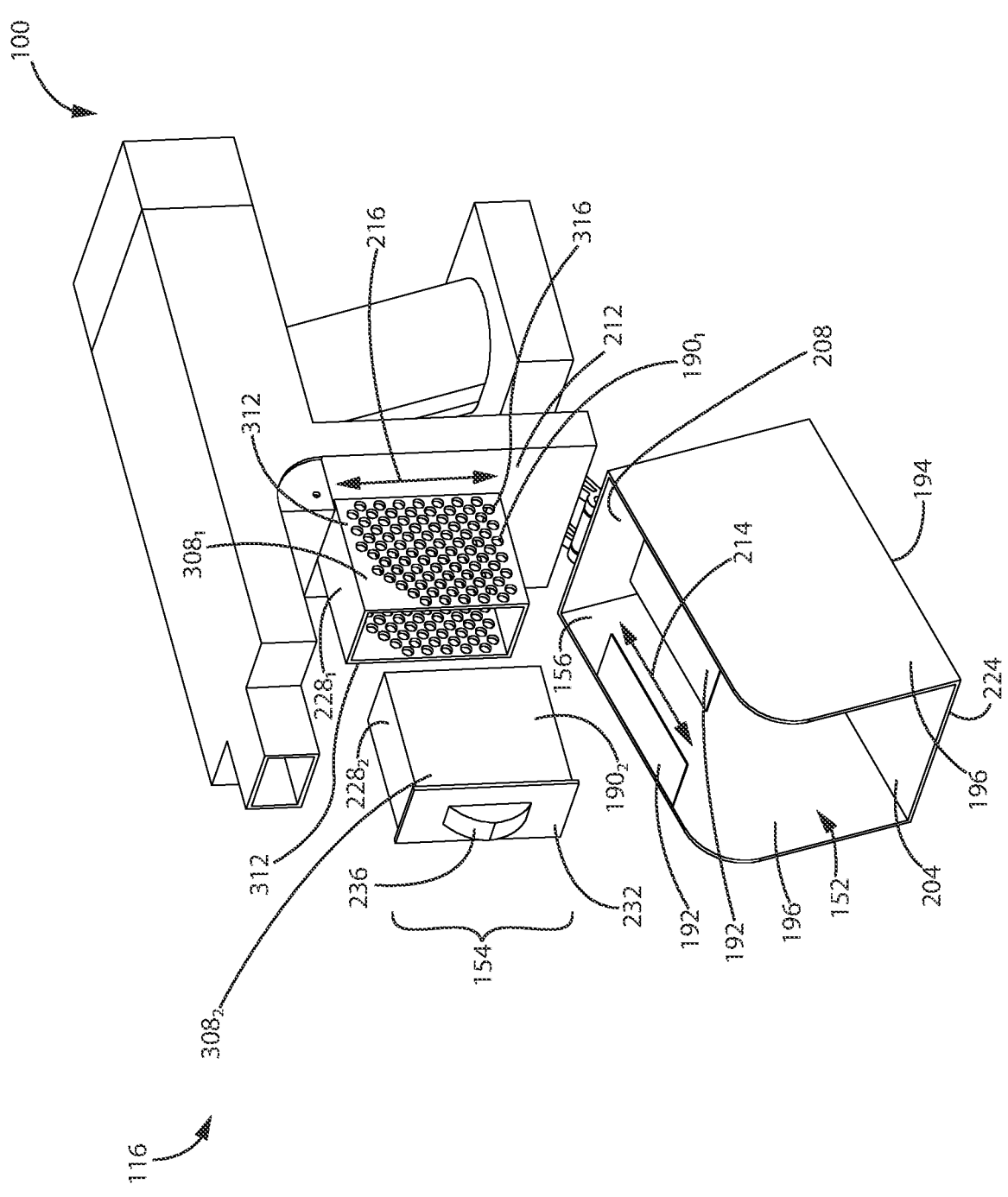
FIG. 6 is a perspective view of the surface cleaning apparatus of FIG. 1, with the treatment chamber in the open position and an inner porous separating member removed.

In the embodiment of FIGS. 3, 4 and 6, wipers 192 may be positioned proximate chamber rear end 212 (e.g., abutting or recessed into the rear end wall). An advantage of such a design is that the wipers 192 may not interfere with air flow in the treatment chamber 152. In the embodiment of FIG. 5, wipers 192 may be positioned proximate the upper end of the treatment chamber 152 (e.g., abutting or recessed into the upper wall).

As exemplified, wipers 192 may be moved when the treatment chamber 152 is opened. As exemplified in FIGS. 3, 4 and 5, wipers 192 may extend from each of chamber sidewalls 196 laterally inwardly towards porous dirt separator 154.

Wipers 192 may make wiping contact with upstream surface 190 (FIG. 6) on the left and right sides of porous dirt separator 154 during at least a portion (e.g. at least 25%) of the opening stroke (i.e. opening movement) of treatment chamber 152. In the illustrated example, wipers 192 are physically in contact with upstream surface 190 (FIG. 6) when treatment chamber 152 is in the closed position and that physical contact persists as treatment chamber 152 is moved toward the open position until the wipers 192 clear (i.e. move past) the porous dirt separator 154. This allows wipers 192 to wipe a majority (i.e. at least 50%) of the surface area of upstream surface 190 (FIG. 6). In some embodiments, wipers 192 may have a length 214 that is at least 50% of a dimension of the upstream surface (e.g. 50%-200% of the upstream surface dimension, or at least 100% of upstream surface dimension). The upstream surface dimension may be the upstream surface height 216 (see FIG. 6) or the width of the upstream surface in the direction of axis 142. Dirt that is debrided from upstream surface 190 (FIG. 6) may fall onto chamber walls 196, 204, and/or 208, and thereafter be poured out of treatment chamber 152 when treatment chamber 152 is emptied.

Treatment chamber 152 may be openable in any manner that allows wipers 192 to wipe some or all of the upstream surface 190 as treatment chamber 152 is opened, or in response to opening treatment chamber 152. As exemplified in FIGS. 3, 4 and 6, air treatment chamber 152 includes a moveable portion (which comprises the front wall 204 and the side walls 196 of the treatment chamber 152) that can move between the open and closed positions and a stationary portion (which comprises the rear wall of the air treatment chamber 152 on which porous dirt separator 154 may be mounted). Accordingly, the moveable portion surrounds at least a portion of the air treatment chamber. The moveable portion may be rotatably (e.g., pivotally) openable by, e.g., a hinge 220. Hinge 220 may rotatably join, e.g., a lower rear end of chamber door 194 to main body 112. As the moveable portion is opened, wipers 192 travel in an arcuate path across upstream surface 190, which is attached to the stationary portion. For example, wipers 192 may be mounted in a fixed orientation to the moveable portion.

In some embodiments, the moveable portion may comprise part or all of the front wall 204 of the air treatment chamber 152 and may be referred to as a front door 194. It will be appreciated that a front door 194 may comprise at least part of the side wall 196 of the air treatment chamber 152 and may include at least a substantial portion (or all) of the side wall 196 of the air treatment chamber 152. As such, the moveable portion may alternately be referred to as a door 194.

It will be appreciated that the air treatment chamber may be opened by translating one or more portions of the walls defining the air treatment chamber. For example, one or more sidewalls 196 may be translated in the direction of axis 142 and/or vertically (e.g., downwardly as exemplified in FIG. 5). In the example of FIG. 5, the moveable portion comprises the sidewalls 196 and the bottom wall 208 of the air treatment chamber.

Air treatment member 116 may include any number of wipers 192 (e.g. 1 to 20 wipers, such as for example 2 wipers in the example shown—one per side), which may collectively make direct wiping contact with any number of sides of porous dirt separator upstream surface 190 as or in response to moving treatment chamber 152 to the open position (e.g. opening chamber door 194). For example, wiper(s) 192 may collectively make direct wiping contact with fewer than all sides of upstream surface 190 (FIG. 6), or may collectively make direct wiping contact with all sides of upstream surface 190 (FIG. 6), as or in response to moving treatment chamber 152 to the open position.

Turning to FIG. 6, in the illustrated example, porous dirt separator 154 includes an outer wall 308, and outer wall 308 includes laterally spaced apart sidewalls 312. Sidewalls 312 may form part of, or all of, upstream surface 190. For example, each sidewall 312 may include perforations 316 (e.g. at least 20 perforations, such as 20 to 1000 perforations). Each of sidewalls 312 may extend longitudinally into treatment chamber 152 from chamber rear end 212 as shown. Accordingly, sidewalls 312 may collectively extend in more than plane.

As shown in FIG. 6, each wiper 192 may be configured to travel across at least a portion of a respective one of side walls 312 as or in response to moving treatment chamber 152, 156 to the open position.

In some embodiments, as exemplified in FIG. 6, the openable portion of treatment chamber 152 may have an open upper end 224. When treatment chamber 152 is opened (e.g., door 194 is pivoted forwardly), the open upper end 224 (or an opening 224 at the upper end) may face forwardly and/or downwardly whereby dirt collected in treatment chamber 152 can be poured out through the open end 224.

Alternatively or in addition to moving wiper(s) 192 across an outer wall 308 of a porous dirt separator 154 when a chamber door 194 is opened, wiper(s) 192 may move across outer wall 308 when another chamber wall (e.g. one or more of walls 196, 204, and 208) is moved. FIG. 5 illustrates an example in which treatment chamber 152 includes movable sidewalls 196, and in which moving sidewalls 196 may cause wipers 192 to move across outer wall 308.

The movable chamber wall 196, 204, and/or 208 may be movable in any manner. For example, the movable wall 196, 204, and/or 208 may be rotatable (e.g. pivoting) and/or translatable relative to apparatus main body 112. As exemplified in FIG. 5, sidewalls 196 are slideably connected to main body 112, which allows treatment chamber 152 to open by translation (e.g. downwardly slidable as shown, or forwardly slidable). Treatment chamber 152 may have any sliding connection to main body 112. For example, treatment chamber 152 may be slideably connected to main body 112 by a rail 222.

Figure 9:
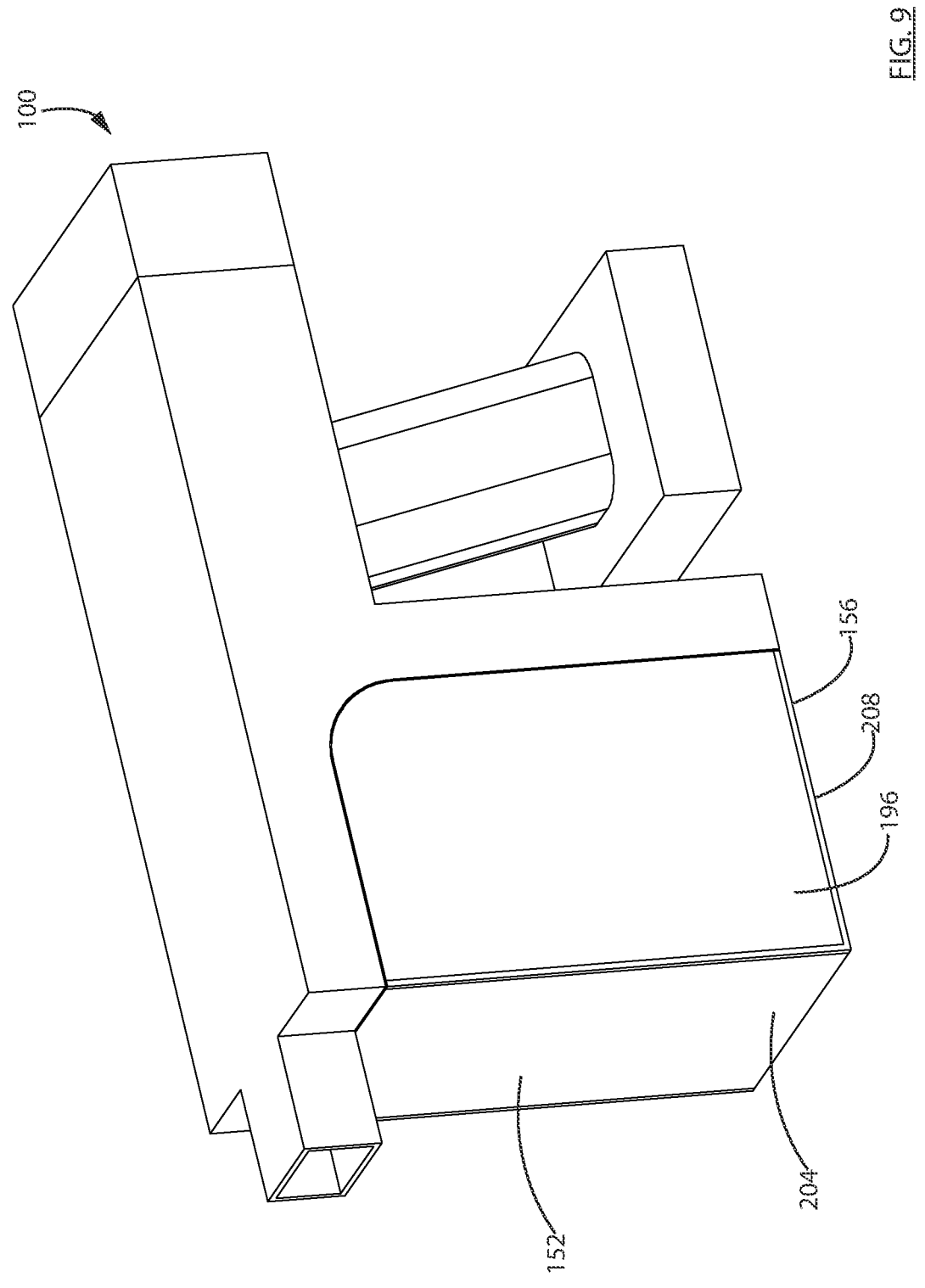
FIG. 9 is a perspective view of a surface cleaning apparatus, with a treatment chamber in a closed position, in accordance with another embodiment.
Figure 10:
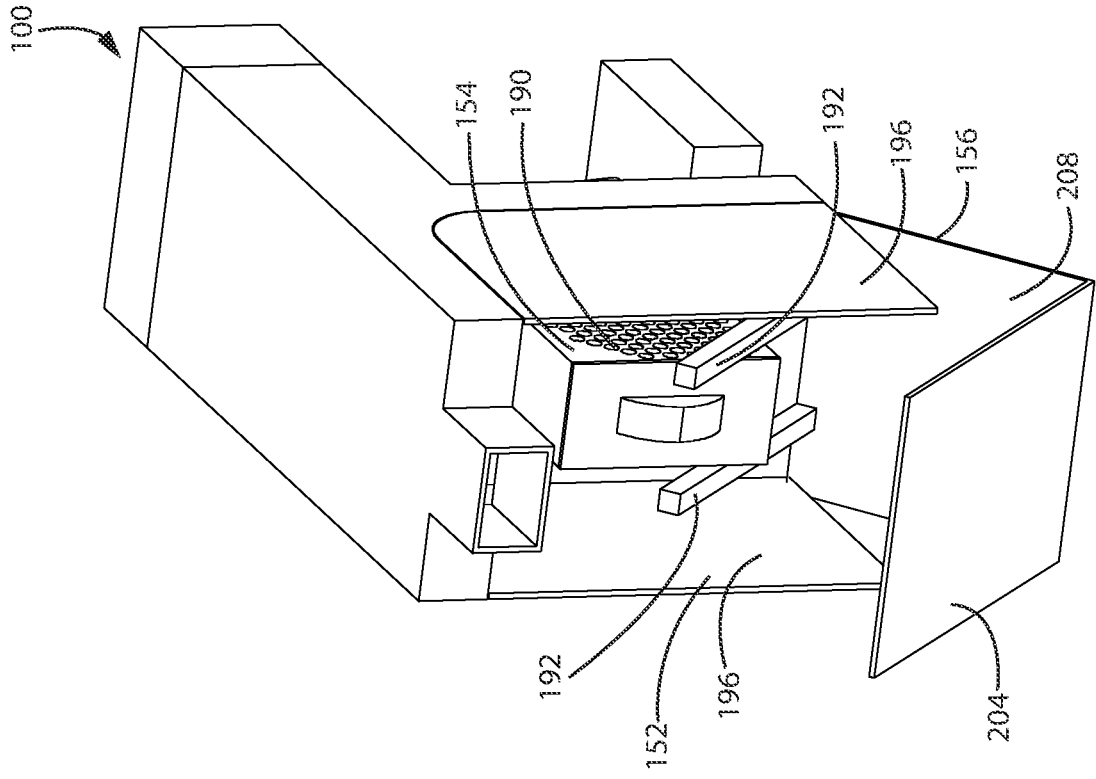
FIG. 10 is a perspective view of the surface cleaning apparatus of FIG. 9, with the treatment chamber in an open position.
Figure 11:
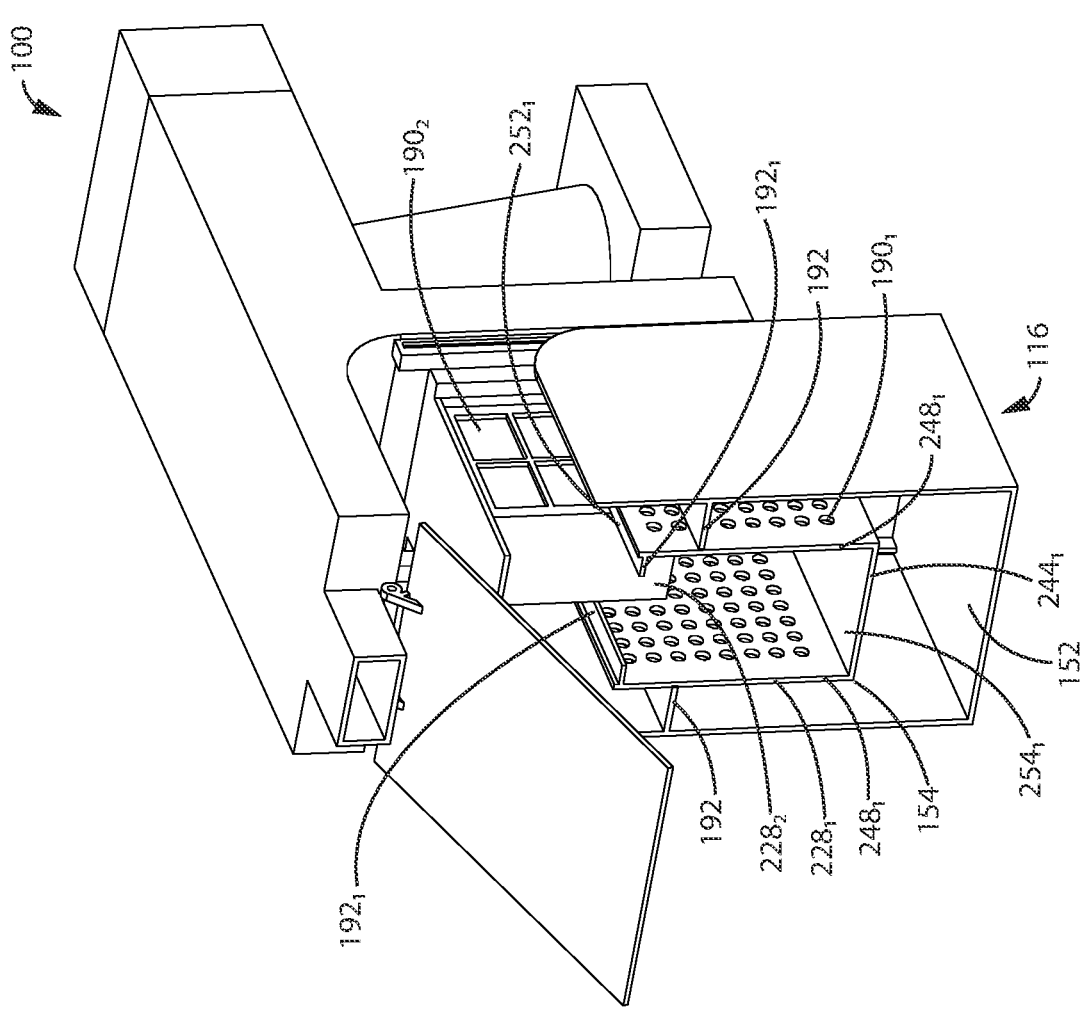
FIG. 11 is a perspective view of the surface cleaning apparatus of FIG. 5, with a porous dirt separator in an open position.
Figure 12:
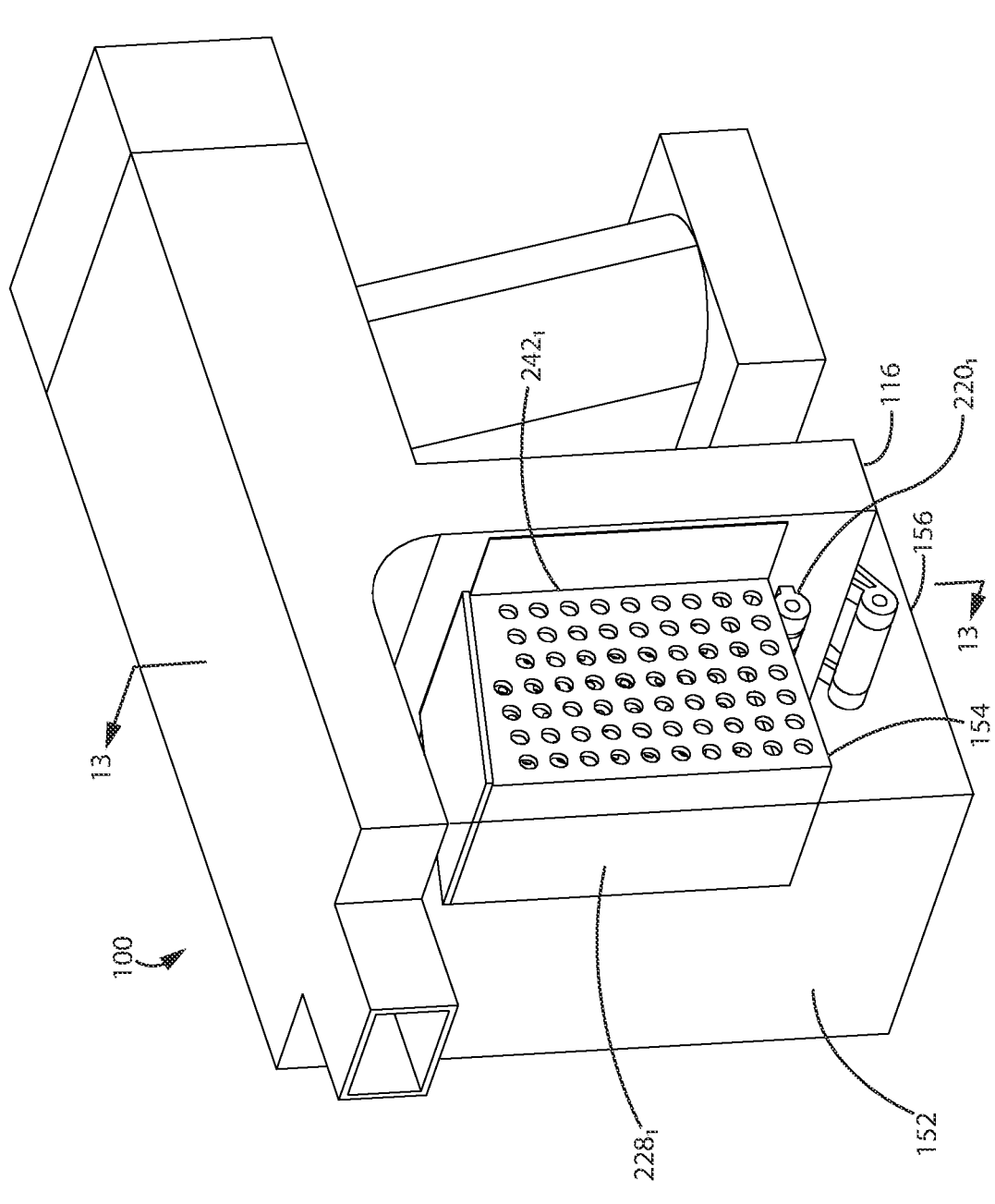
FIG. 12 is a perspective view of a surface cleaning apparatus, with a treatment chamber in a closed position, in accordance with another embodiment.
Figure 13:
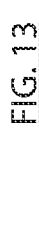
FIG. 13 is a cross-sectional view taken along line 13-13 in FIG. 12.
Figure 14:
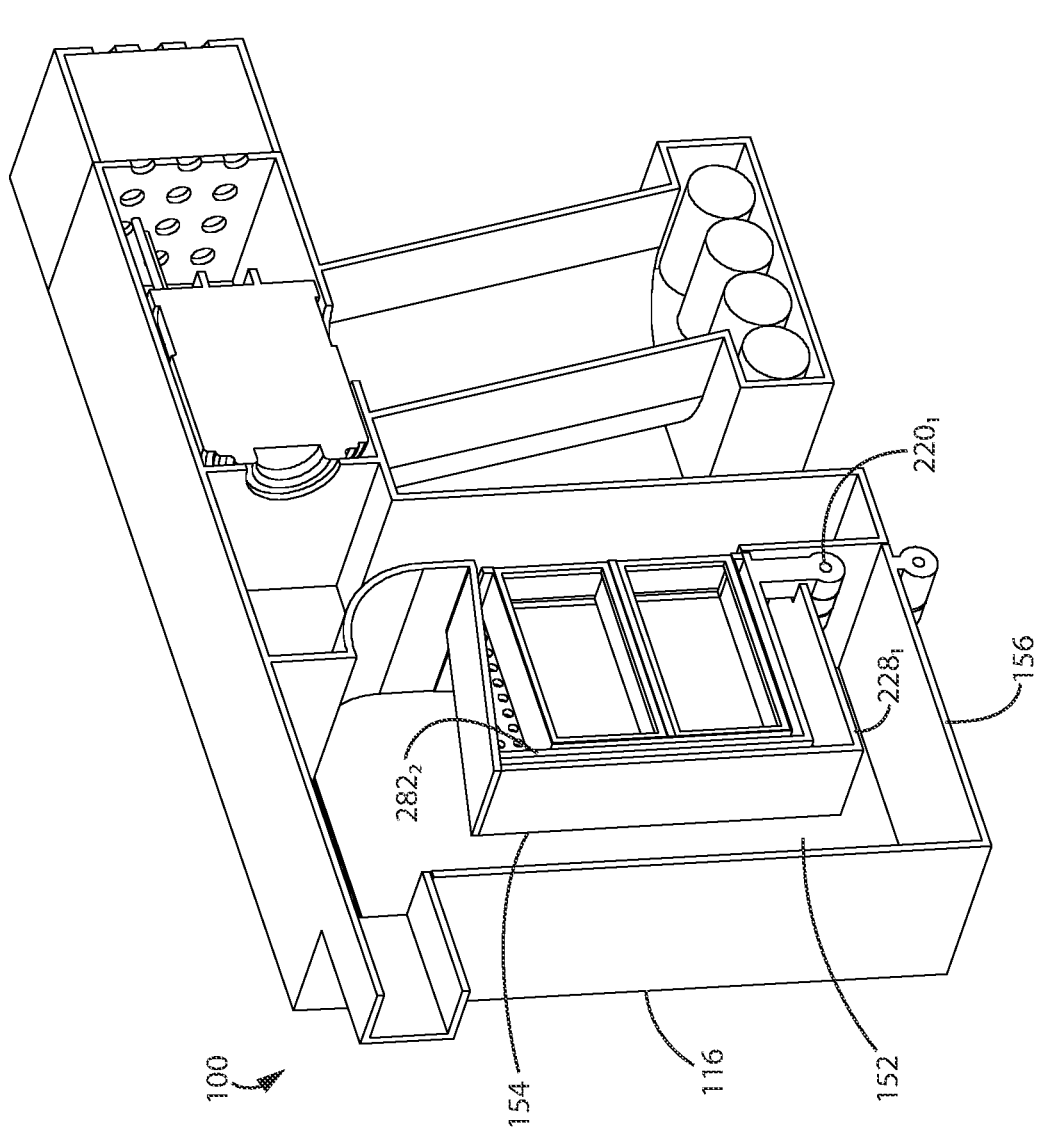
FIG. 14 is a perspective view of the cross-section of FIG. 13.
Figure 15:
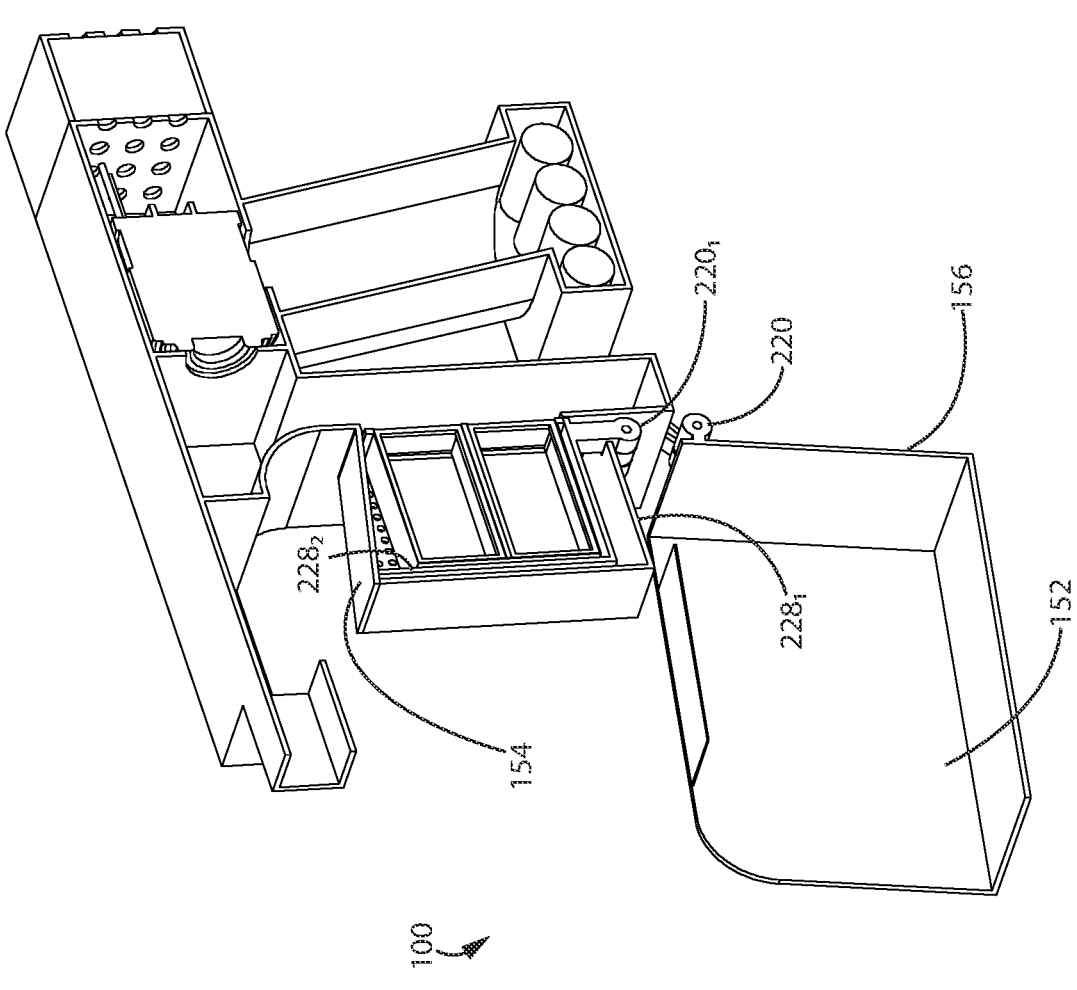
FIG. 15 is a perspective cross-sectional view of FIG. 13, with a treatment chamber in an open position.
Figure 16:
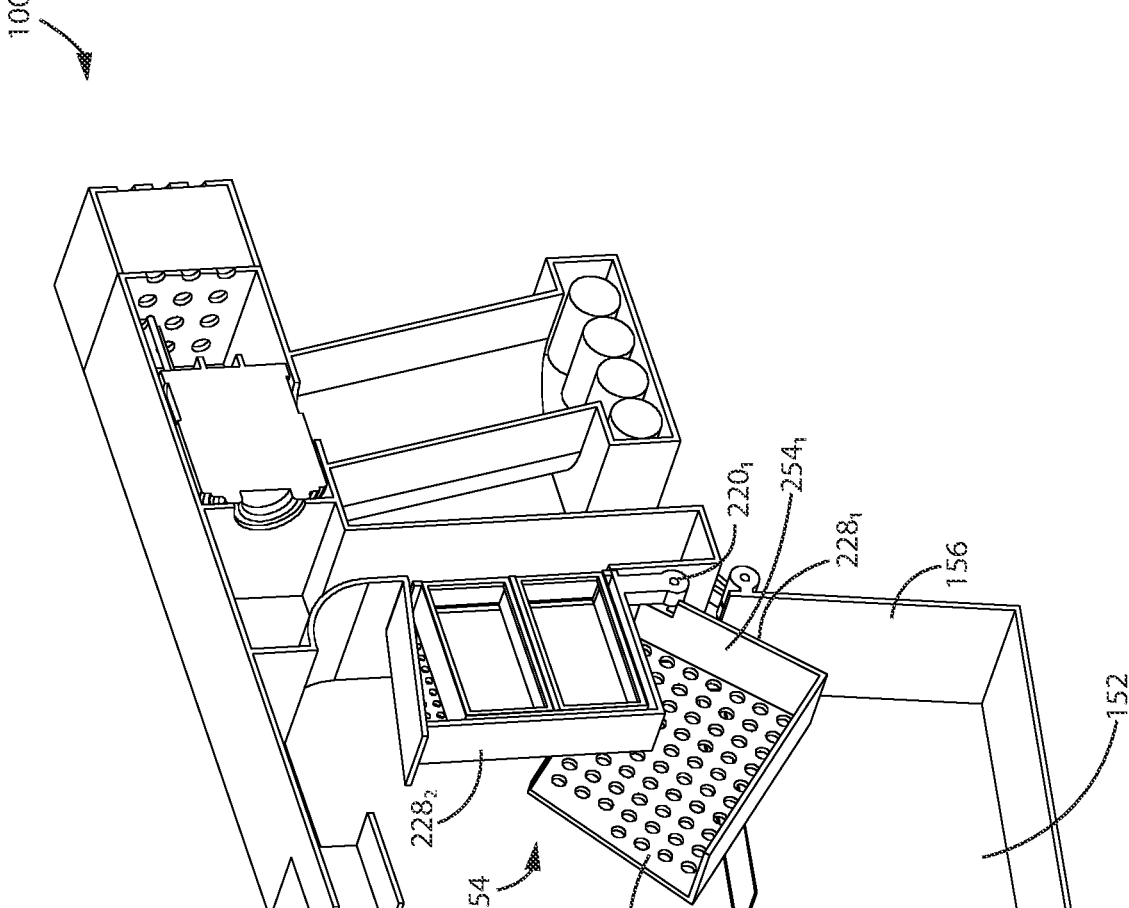
FIG. 16 is a perspective cross-sectional view of FIG. 13, with the treatment chamber in an open position, and a porous dirt separator partially opened.
Figure 17:
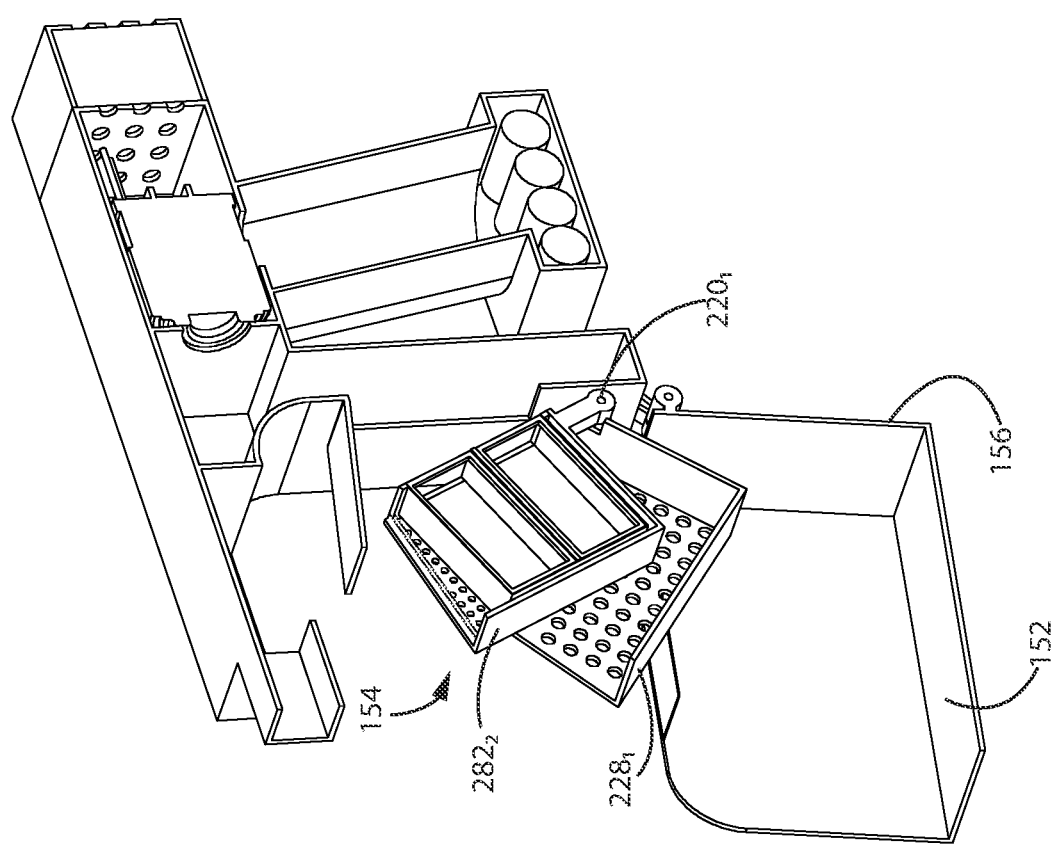
FIG. 17 is a perspective cross-sectional view of FIG. 13, with the treatment chamber in an open position, and a porous dirt separator further opened.

FIGS. 9-10 show an embodiment in which chamber sidewalls 196 may remain stationary when treatment chamber 152 is opened. For example, front and bottom walls 204 and 208 may move relative to sidewalls 196 when treatment chamber 152 is opened. As shown, the movable bottom wall 208 may be connected to one or more wipers 192 that extend upwardly from bottom wall 208 to make wiping contact with upstream surface 190 as or in response to opening treatment chamber 152.

Figure 7:
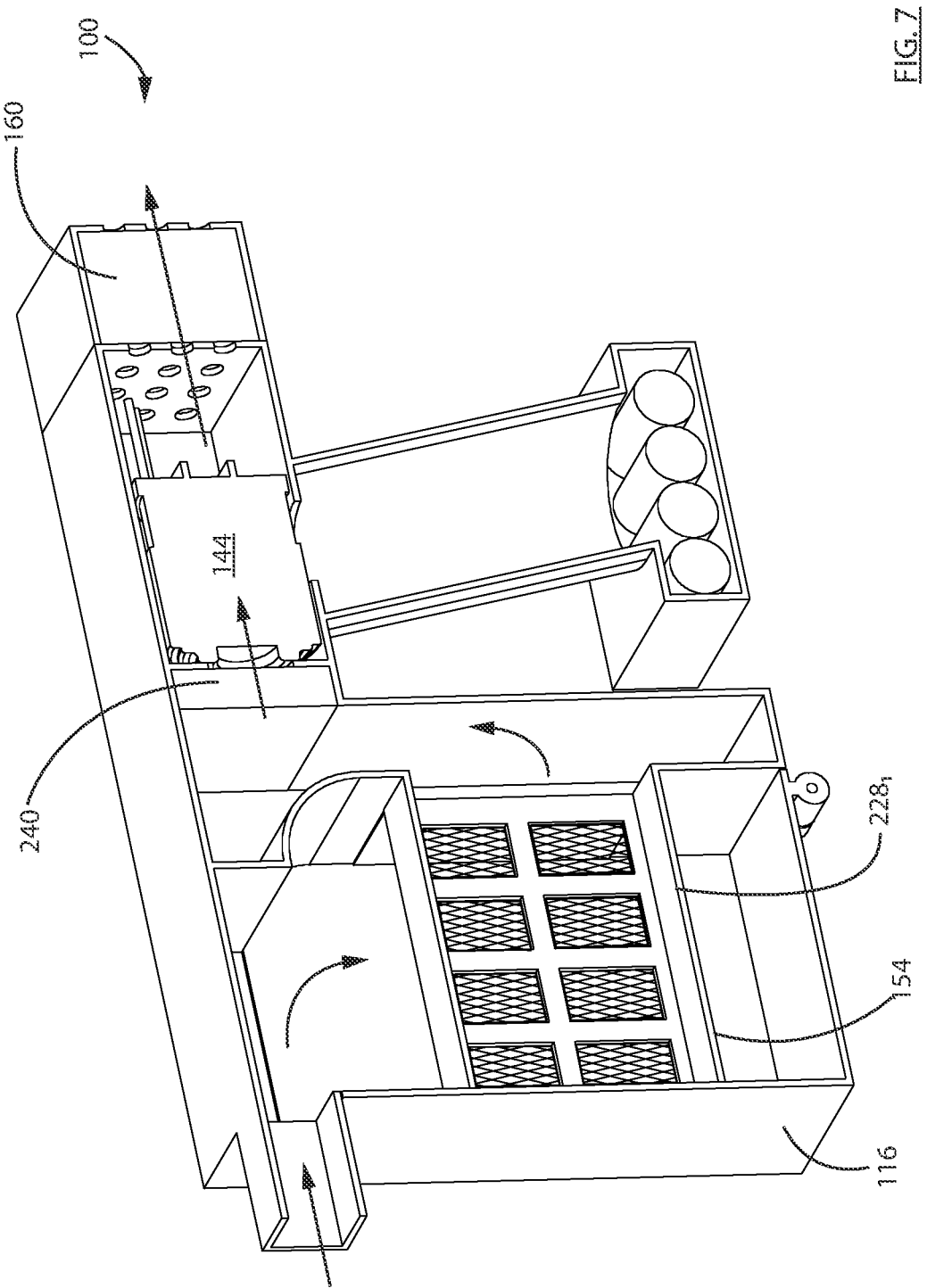
FIG. 7 is a perspective cross-sectional view of a surface cleaning apparatus, with a treatment chamber in a closed position, in accordance with another embodiment.
Figure 8:
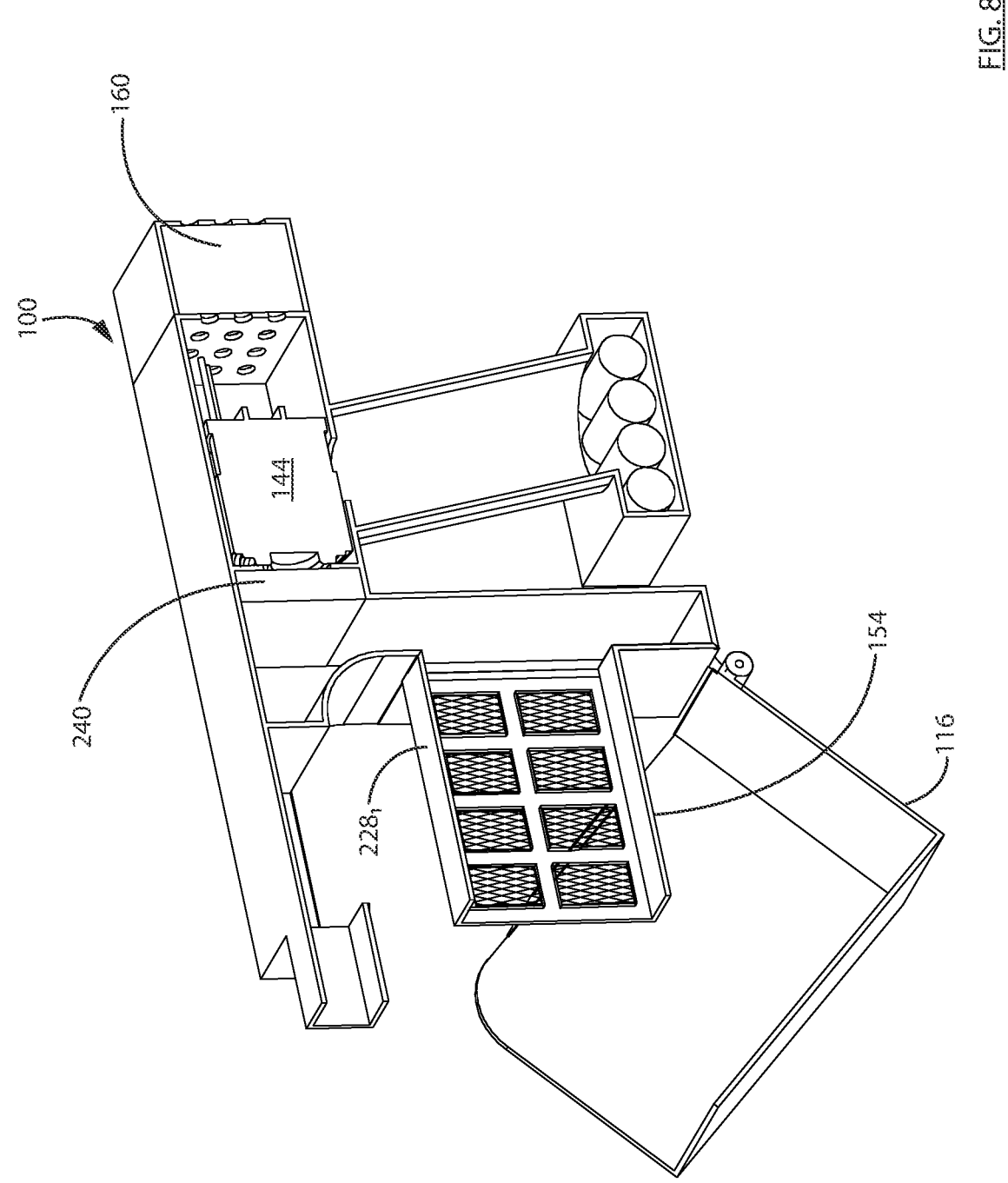
FIG. 8 is a perspective cross-sectional view of the surface cleaning apparatus of FIG. 7, with the treatment chamber in an open position.

As exemplified in FIGS. 7 and 8, in some embodiments porous dirt separator 154 may comprise a single stage (e.g., an inner porous separating member may not be provided interior of the porous dirt separator 154).

Multi-Stage Perforated Substrates

In accordance with another aspect, the porous dirt separator may comprise two or more sequential perforated substrates, such as screens or shrouds, which use physical separation (a physical separation media) to separate dirt from air flow that passes through the porous separating member(s) and which may be nested. The upstream porous separating member(s) may be coarse for capturing larger dirt particles, and downstream porous separating member(s) may be fine for capturing smaller dirt particles. This arrangement of coarse and fine porous separating members may provide greater particle separation efficiency as compared with using a single porous separating member tasked with capturing dirt particles of all sizes.

The multi-stage perforated substrates may be used by itself or in combination with one or more of the air treatment member wipers, openable pre-motor filter chamber, the nested porous separating members, the valving for multiple treatment chambers, the debriding devices, the bypass valve, the power components configurations and the use of a sequential momentum separator and cyclone as disclosed herein.

The porous dirt separator 154 may include any number of perforated substrates, such as screens or shrouds, which operate to separate dirt from air flow that flows through the perforated substrates. Accordingly, several layers of perforated substrates may be used to sequentially clean the air flowing therethrough. These may be partially or fully nested.

Figure 18:
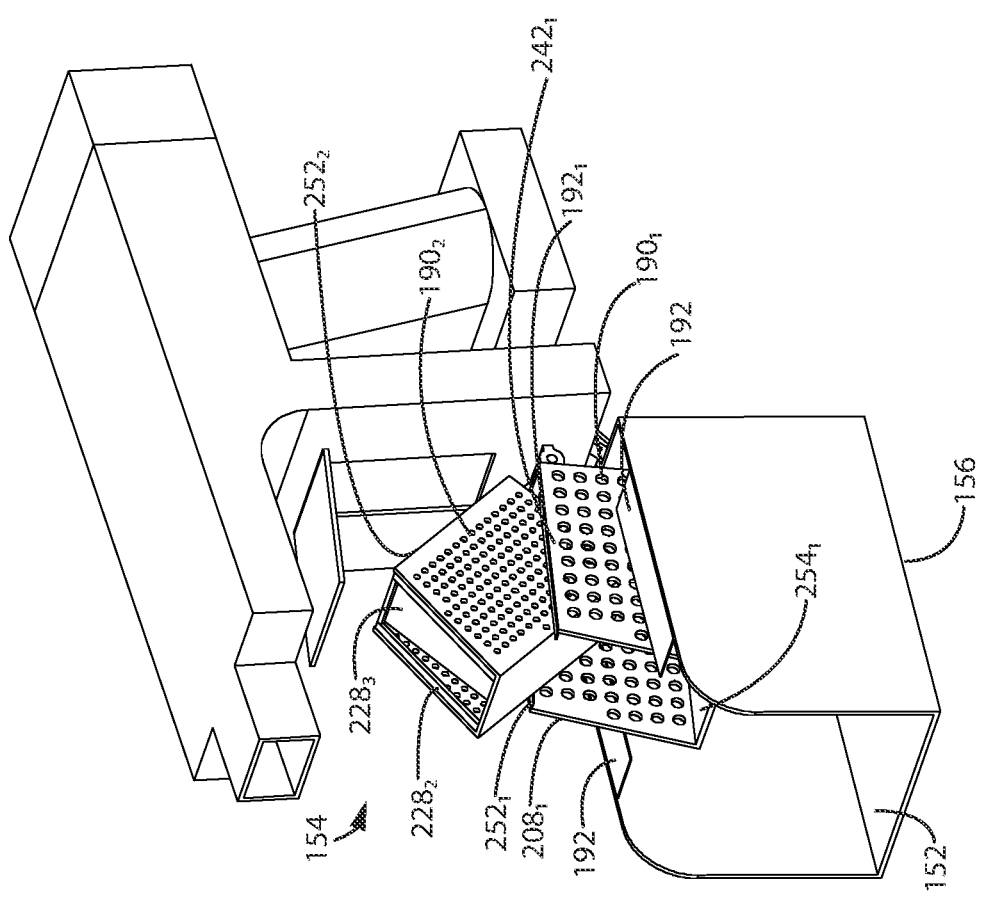
FIG. 18 is the perspective view of FIG. 13, with the treatment chamber in an open position, and a porous dirt separator opened.
Figure 19:
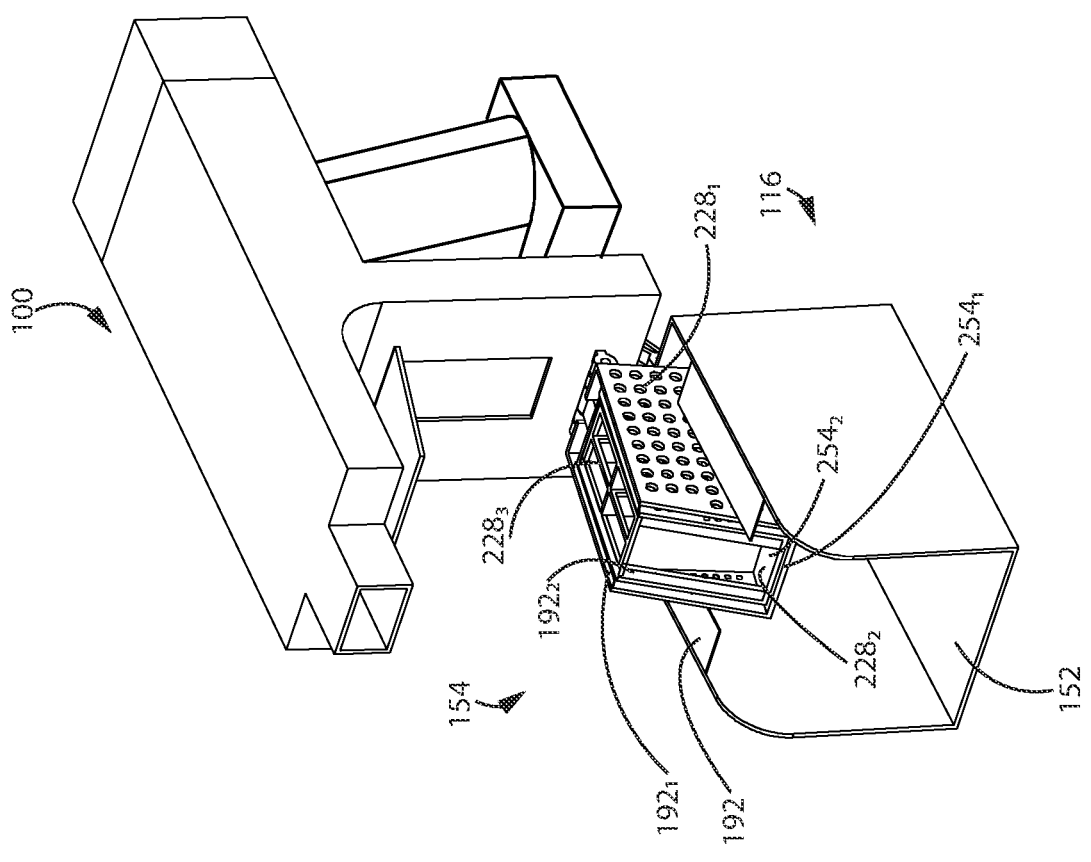
FIG. 19 is the perspective view of FIG. 13, with the treatment chamber in an open position, and a porous dirt separator fully opened.
Figure 20:
FIG. 20 is the perspective view of FIG. 13, with the treatment chamber in an open position, and a porous dirt separator fully opened, and an inner porous separating member removed.

FIGS. 18-20 exemplify a porous dirt separator 154 that includes three porous separating members 228 positioned in the air flow path in series. As shown, porous dirt separator 154 may include an outer perforated substrates (porous separating member $228_1$), an intermediate perforated substrates (porous separating member $228_2$), and an inner filter (porous separating member $228_3$). In the downstream direction, each porous separating member $228_N$ may be configured to filter progressively finer dirt than the immediately upstream porous separating member $228_{N-1}$.

In one example, outer porous separating member $228_1$ is a coarse screen, the intermediate porous separating member $228_2$ is a fine screen, and the inner porous separating member $228_3$ is a filter. For example, outer screen $228_1$ may have a coarse hole diameter of 0.015-0.125 inches, or more preferably 0.040 to 0.080 inches; the intermediate screen $228_2$ may have a fine hole diameter of 0.005 to 0.050 inches, or more preferably 0.005 to 0.010 inches; and the inner filter $228_3$ may have an even finer pore diameter of 0.01 to 1 micron, or more preferably 0.01 to 0.1 microns.

In another example, outer porous separating member $228_1$ is a coarse screen, the intermediate porous separating member $228_2$ is a coarse filter, and the inner porous separating member $228_3$ is a fine filter. For example, outer screen $228_1$ may have a coarse hole diameter of 0.015-0.125 inches, or more preferably 0.040 to 0.080 inches; the intermediate filter $228_2$ may have a finer pore size of 5 to 50 microns, or more preferably 5 to 20 micron; and the inner filter $228_3$ may have an even finer pore size of 0.01 to 1 microns, or more preferably 0.01 to 0.1 microns.

As discussed subsequently, and as exemplified in FIG. 18, it will be appreciated that wipers may also be used to clean one or more nested porous separating members.

Openable Pre-Motor Filter Chamber

In accordance with another aspect, a surface cleaning apparatus may include a pre-motor filter in a pre-motor filter chamber wherein the pre-motor filter chamber is opened when the momentum separator is opened.

The openable pre-motor filter chamber may be used by itself or in combination with one or more of the air treatment member wipers, the multi-stage perforated substrates, the nested porous separating members, the valving for multiple treatment chambers, the debriding devices, the bypass, the power components configurations and the use of a sequential momentum separator and cyclone as disclosed herein.

Figure 39:
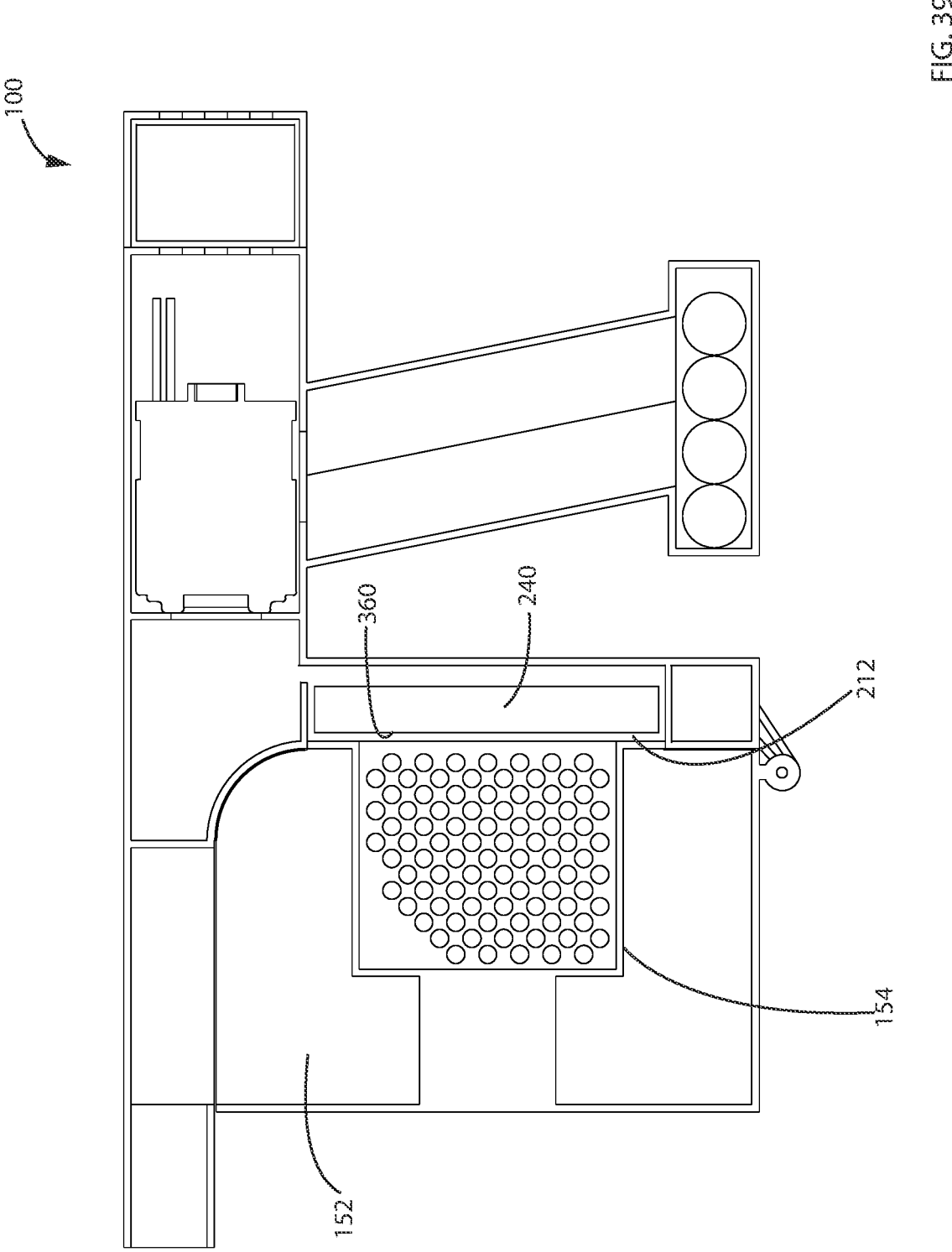
FIG. 39 is a cross-sectional view of a surface cleaning apparatus having a pre-motor filter in accordance with an embodiment.
Figure 40:
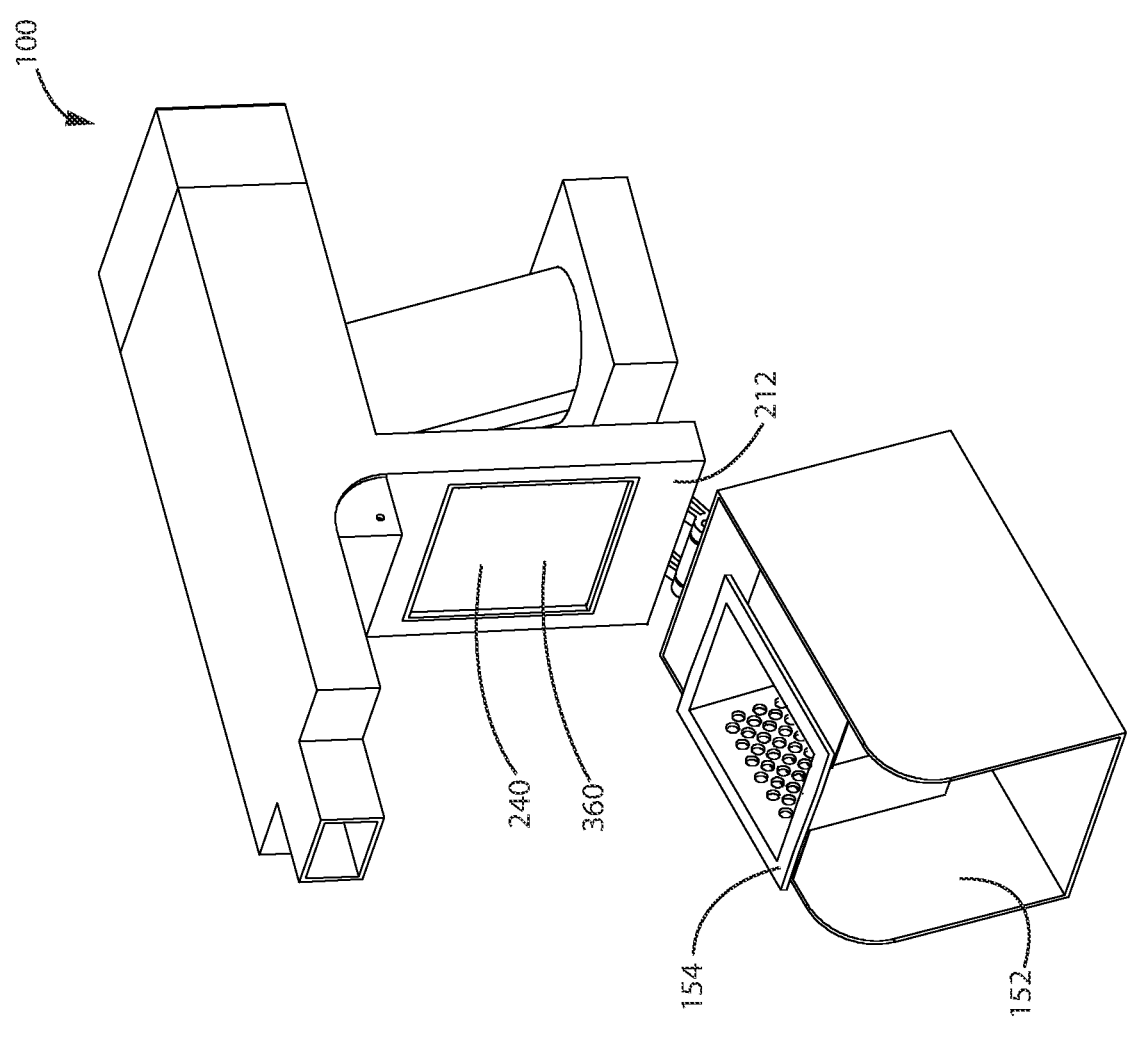
FIG. 40 is a perspective view of the surface cleaning apparatus of FIG. 39, with a treatment chamber in an open position.

As exemplified in FIGS. 39 and 40, surface cleaning apparatus 100 may include a pre-motor filter 240 positioned in the air flow path 124 between the air treatment member 116 and the suction motor 144. Pre-motor filter 240 may be configured to (e.g. have a pore size to) separate finer dirt from the air flow than air treatment member 116 and porous dirt separator 154.

As exemplified, pre-motor filter 240 is located proximate (e.g. at or behind) chamber rear end 212. As shown, an upstream surface 360 of pre-motor filter 240 may be visible and/or user accessible when treatment chamber 152 is opened. This can allow the user to inspect and/or clean pre-motor filter 240 in-situ to restore the dirt capacity and separation efficiency of pre-motor filter 240. For example, upstream surface 360 may be visible and/or accessible when treatment chamber 152 is open and porous dirt separator 154 is moved away from pre-motor filter 240. In the illustrated example, pre-motor filter 240 is accessible for user removal and replacement when treatment chamber 152 is open. This can allow the user to remove pre-motor filter 240 for cleaning, repair, and/or replacement.

In some embodiments (not shown), there may be both a filter at least partially nested within porous dirt separator 154 and a pre-motor filter 240 downstream of porous dirt separator 154.

Nested Porous Separating Members

In accordance with another aspect, in some embodiments, a porous dirt separator includes an inner porous separating member within a movable or openable outer porous separating member. This may provide user access to inspect, clean, repair, or replace the inner porous separating member. It will be appreciated that the inner porous separating member may be partially of fully nested in the outer porous separating member.

The nested porous separating members may be used by themselves or in combination with one or more of the air treatment member wipers, the multi-stage perforated substrates, openable pre-motor filter chamber, the valving for multiple treatment chambers, the debriding devices, the bypass valve, the power components configurations and the use of a sequential momentum separator and cyclone as disclosed herein.

It will be appreciated that the outer porous separating member may include one or more wipers that wipe the inner porous separating member when the outer porous separating member is moved or opened. This can allow the inner porous separating member to be cleaned by moving the outer porous separating member.

In some embodiments, the outer porous separating member is configured to move or open simultaneously or sequentially as the treatment chamber $152$ is opened. This can allow both the outer and inner porous separating members to be cleaned with a single user action of moving or opening a treatment chamber wall or door $194$.

Porous dirt separator $154$ may include a porous separating member $228_2$ (e.g. filter or screen) within a movable or openable outer porous separating member $228_1$. Outer porous separating member $228_1$ may be openable in any manner that moves at least a portion of the outer porous separating member $228_1$ relative to the inner porous separating member $228_2$. For example, outer porous separating member $228_1$ may be translatably openable (as exemplified in FIGS. $5$ and $11$), or rotatably openable (e.g. pivotally openable by a hinge $220_1$ as exemplified in FIGS. $6$ and $12$-$17$).

As exemplified in FIG. $6$, porous dirt separator $154$ includes an outer porous separating member $228_1$ (e.g. a screen or shroud) having an outer wall $308_1$ with an upstream surface $190_1$, and an inner porous separating member $228_2$ (e.g. a filter) having an outer wall $308_2$ with an upstream surface $190_2$.

In some embodiments, outer porous separating member $228_1$ may be more coarse (e.g. have a larger pore size), and inner porous separating member $228_2$ may be more fine (e.g. have a smaller pore size). In this case, air may first pass through the coarse outer porous separating member $228_1$ where larger (i.e. coarse) dirt and/or elongate members (e.g., hair) is removed from the air flow, and then the air may pass through the fine inner porous separating member $228_2$ where smaller (i.e. fine) dirt is removed from the air flow. This design may mitigate the smaller pores of the fine inner porous separating member $228_2$ being clogged prematurely by large dirt particles.

When treatment chamber $152$ is open, the inner porous separating member $228_2$ may be removable from air treatment member $116$. For example, porous separating member $228_2$ may be removable from outer porous separating member $228_1$. Inner separating member $228_2$ may be removed from outer separating member $228_1$ in any manner. As exemplified in FIG. $6$, porous separating member $228_2$ includes a front wall $232$ having a hand grip portion $236$ (e.g. a handle) that a user can grasp to pull porous separating member $228_2$ forwardly out of outer porous separating member $228_1$. This allows porous separating member $228_2$ to be inspected, cleaned, and/or replaced. Porous separating member $228_2$ may be removably attached to hand grip portion $236$ (e.g., hand grip portion $236$ may be a filter frame).

As exemplified in FIGS. $5$ and $11$, outer porous separating member $228_1$ may include inward facing wipers $192_1$ that make wiping contact with upstream surface $190_2$ of inner porous separating member $228_2$. For example, wipers $192_1$ may be located proximate an upper end $252_1$ of porous separating member $228_1$ and extend forwardly as shown. FIGS. $12$-$17$ show an example in which wipers $192_1$ are located proximate a rear end $242_1$ of porous separating member $228_1$ and extend upwardly.

Treatment chamber $152$ and outer porous separating member $228_1$ may be independently movable/openable as shown, or configured (e.g. mechanically or electromechanically) to open simultaneously, or configured (e.g. mechanically or electromechanically) to open in sequence (e.g. beginning with treatment chamber $152$ followed by outer porous separating member $228_1$). Moving/opening treatment chamber $152$ and separating member(s) $228$ simultaneously or sequentially may conveniently simplify the use of wiper(s) $192$ to clean separating member(s) $228$ to a single user action.

FIGS. $5$ and $11$ illustrate treatment chamber $152$ and outer porous separating member $228_1$ opening in sequence. FIGS. $15$-$16$ illustrate another embodiment in which treatment chamber $152$ and outer porous separating member $228_1$ open in sequence.

Returning to FIG. $11$, openable outer porous separating member $228_1$ may define a dirt collection region $254_1$ that collects dirt which falls from inner porous separating member $228_2$ (e.g. naturally and/or as a result of wiping upstream surface $190_2$ with wiper(s) $192_1$). For example, openable outer porous separating member $228_1$ may have a U-shape, cup shape, or scoop shape formed by a plurality of interconnecting walls $244_1$ and $248_1$ joined at their ends to define an inner volume to hold inner porous separating member $228_2$. As shown in FIG. $16$, openable outer porous separating member $228_1$ may have an open upper end (or upper opening) $252_1$, which may provide a dirt outlet to pour out dirt from dirt collection region $254_1$ when the outer porous separating member $228_1$ is opened. For example, dirt collection region $254_1$ may be emptied simultaneously with dirt chamber $156$, as shown.

FIGS. $18$-$20$ show an example of a porous dirt separator $154$ that includes three porous separating members $228$ positioned in the air flow path in series. In some embodiments, one or both of the outer and intermediate porous separating members $228_1$ and $228_2$ may be openable. Each openable porous separating member $228_1$ and/or $228_2$ may be configured with inwardly directed wipers $192_1$ or $192_2$ respectively that are configured to wipe the upstream surface $190_2$ or $190_3$ of the immediately next downstream porous separating member $228_2$ or $228_3$ respectively. Further, the openable porous separating members $228_1$ and/or $228_2$ may each define a dirt collection region $254_1$ or $254_2$ that collects dirt which falls from the immediately next downstream porous separating member $228_2$ or $228_3$ (e.g. naturally and/or from wiping upstream surface $190_2$ or $190_3$). Any or all of the openable porous separating members $228_1$ and/or $228_2$ may have an open upper end $252_1$ or $252_2$ that may provide a dirt outlet to pour out collected dirt when the porous separating member $228_1$ or $228_2$ is opened. As described above, the openable porous separating members $228_1$ and/or $228_2$ may be configured to open simultaneously with dirt chamber $156$ or in sequence. For example, treatment chamber $152$, porous separating member $228_1$ and porous separating member $228_2$ may open in sequence in this order, such as by translating each one relative to the others in a cascading telescoping manner.

Valving for Multiple Treatment Chambers

In accordance with another aspect, in some embodiments, the air treatment member includes two treatment chambers, and a valve is provided to control the amount of air flow delivered from the dirty air inlet to each of the treatment chambers. For example, the valve may have a first position in which air is provided only to the first treatment chamber, a second position in which air is provided only to the second treatment chamber, and optionally a third position in which air is provided to both treatment chambers.

The valving for multiple treatment chambers may be used by itself or in combination with one or more of the air treatment member wipers, the multi-stage perforated substrates, openable pre-motor filter chamber, the nested porous separating members, the debriding devices, the bypass valve, the power components configurations and the use of a sequential momentum separator and cyclone as disclosed herein.

The valve may be moved to the first or second position when the suction motor is operating in a low power mode in order to maintain sufficient air velocity and suction across the active treatment chamber for efficient dirt separation. For example, in a low power mode, using one of two air treatment chambers reduces the size of the air treatment chamber that is in use and enables a higher air flow rate compared to both air treatment chambers being used. The valve may be moved to the third position when the suction motor is operating in a high power mode in order to benefit from the porous dirt separator of both treatment chambers (i.e., using both air treatment chambers may enable a high rate of air flow while reducing the back pressure).

In some embodiments, the valve may change position based on the flow rate of air through each suction chamber. For example, as the porous dirt separator of one treatment chamber reaches capacity, the air flow through that treatment chamber may drop, and the valve may change position to direct more air through the other treatment chamber in which the porous dirt separator has greater remaining dirt capacity. This may improve the dirt separation efficiency and air flow efficiency of the air treatment member.

In some embodiments, the valve may change position to reduce or inhibit air flow through a treatment chamber while the porous dirt separator inside is being debrided (e.g. cleaned by a wiper). This may mitigate the airflow through that treatment chamber interfering with the debriding operation.

Figure 27:
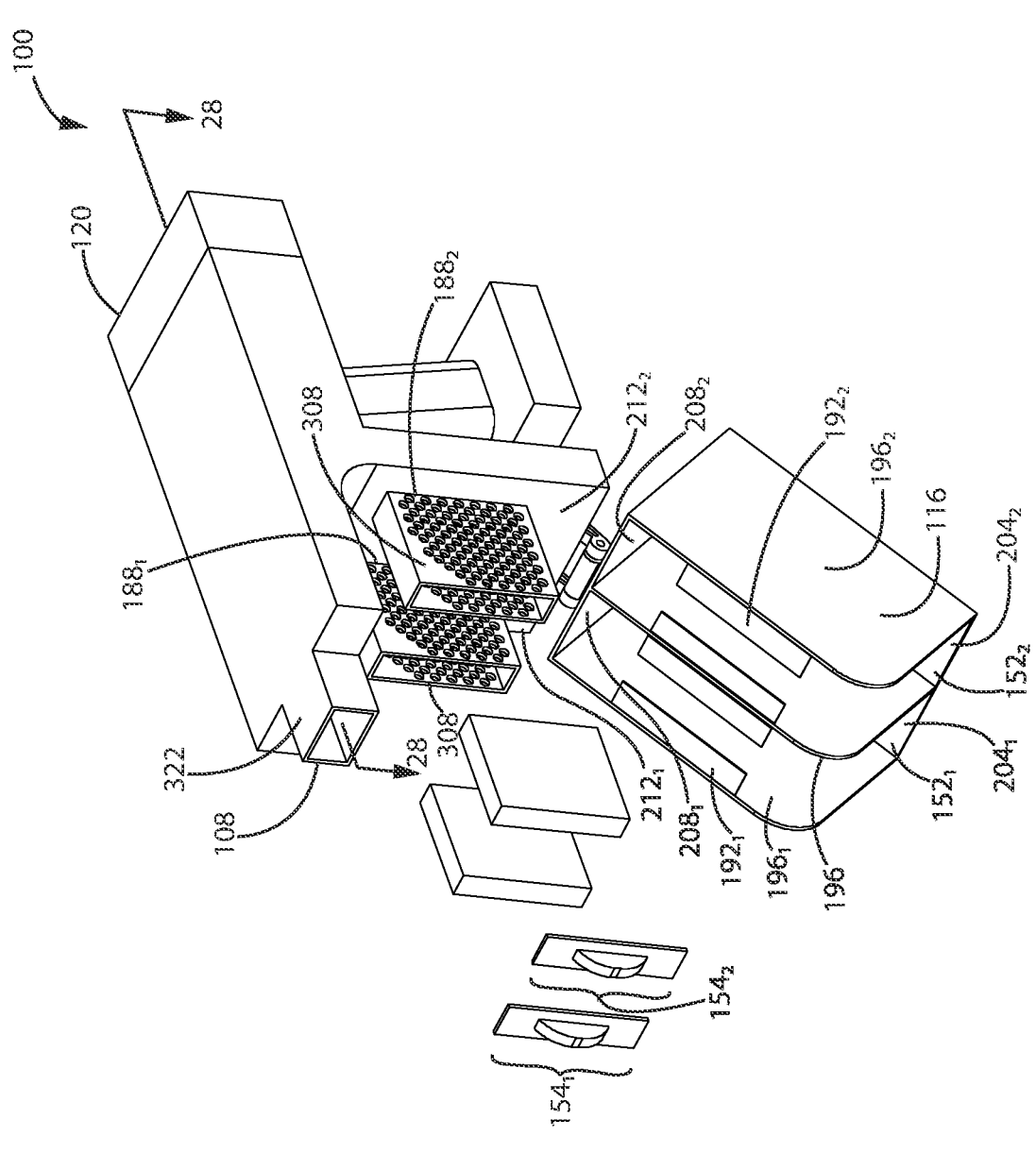
FIG. 27 is a perspective view of a surface cleaning apparatus having two treatment chambers in an open position and inner porous separating members removed, in accordance with another embodiment.
Figure 28:
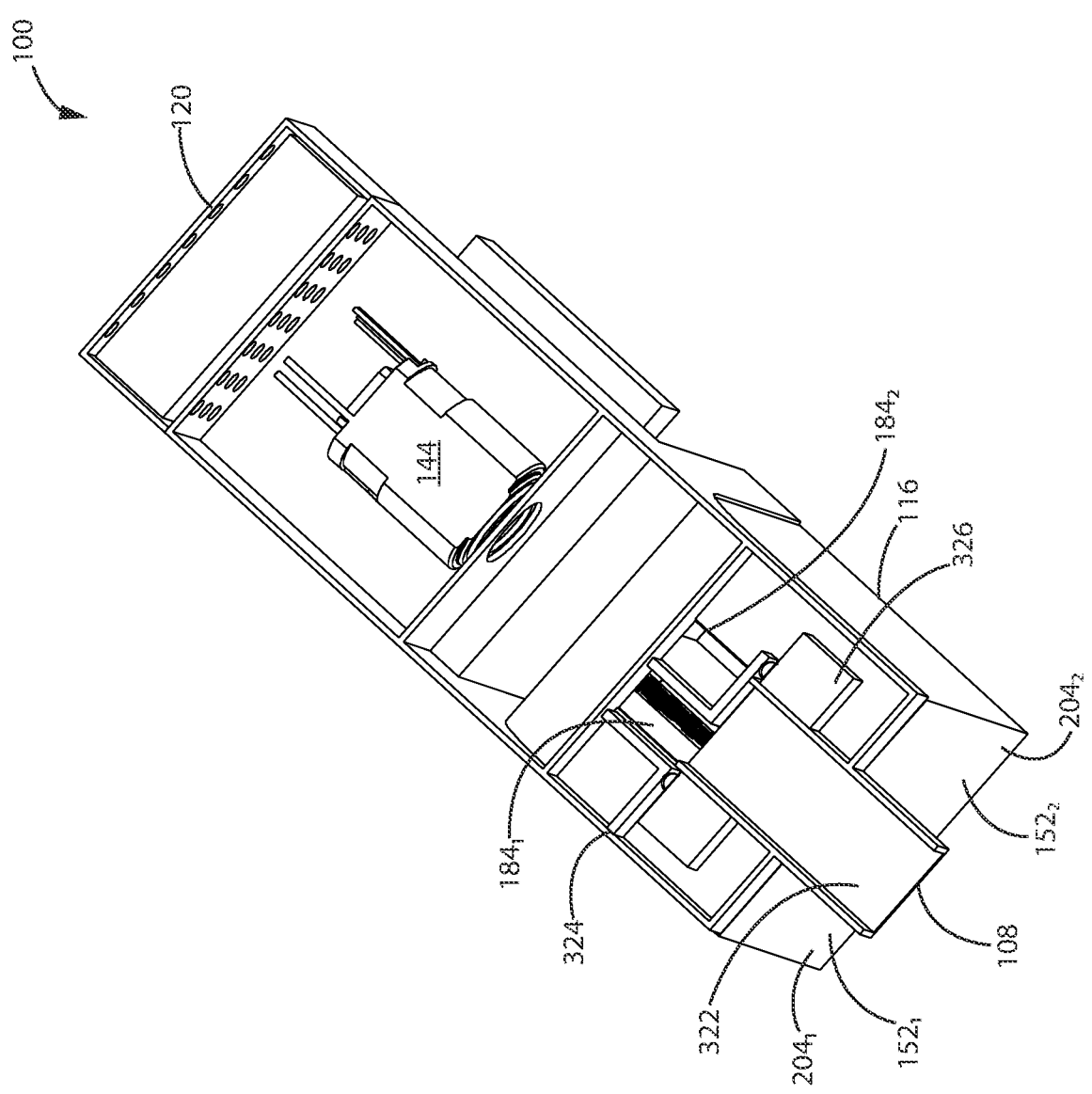
FIG. 28 is a cross-sectional view taken along line 28-28 in FIG. 27, with the treatment chambers in a closed position, and a valve in a first position.

Referring to FIGS. 27-28, surface cleaning apparatus 100 may include an air treatment member 116 having first and second treatment chambers $152_1$, $152_2$. Each treatment chamber 152 may include an air inlet 184, an air outlet 188, and a porous dirt separator 154 in the air flow path between the air inlet 184 and air outlet 188. The treatment chambers 152 and porous dirt separators 154 may have any configuration described herein in connection with multi-chamber or single chamber designs. Treatment chambers $152_1$, $152_2$ may be fluidly positioned in parallel in the air flow path between the dirty air inlet 108 and clean air outlet 120.

As shown, an air inlet passage 322 may extend from dirty air inlet 108 to a valve 324 positioned upstream of the first and second treatment chambers $152_1$, $152_2$. Valve 324 may be manually (e.g. by user selection) or automatically (e.g. by electronic logic) adjustable to control the amount of air provided to each of the first and second treatment chambers $152_1$, $152_2$.

Each treatment chamber 152 may have any configuration suitable for defining an air flow path that is parallel to the other treatment chamber 152. For example, each treatment chamber 152 may include a front wall 204, a rear wall 212, a bottom wall 208, and sidewalls 196. In the illustrated example, the two treatment chambers 152 share a common dividing wall 196. In alternate embodiments, the air treatment chambers 152 may be of any other design.

Valve 324 may have any configuration suitable for controlling the amount of air provided to each of the first and second treatment chambers $152_1$, $152_2$. For example, valve 324 may include solely manually operated (i.e. by hand) mechanical parts, or valve 324 may include electromechanical parts (e.g. electrically powered actuator 326) that responds to commands generated by manual user selections and/or electronic logic.

Figure 29:
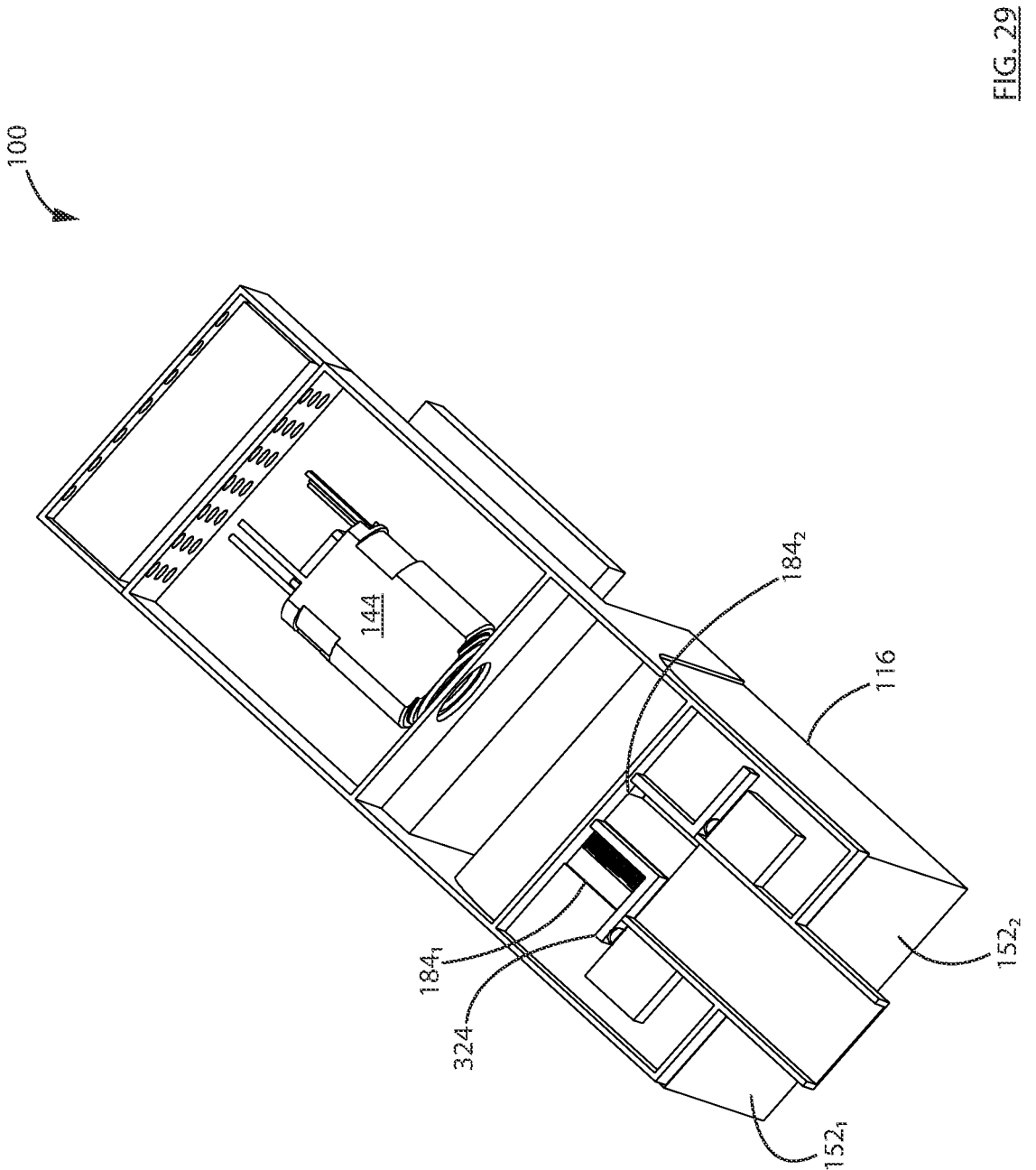
FIG. 29 is the cross-sectional view of FIG. 28, with the valve in a second position.
Figure 30:
FIG. 30 is the cross-sectional view of FIG. 28, with the valve in a third position.
Figure 31:
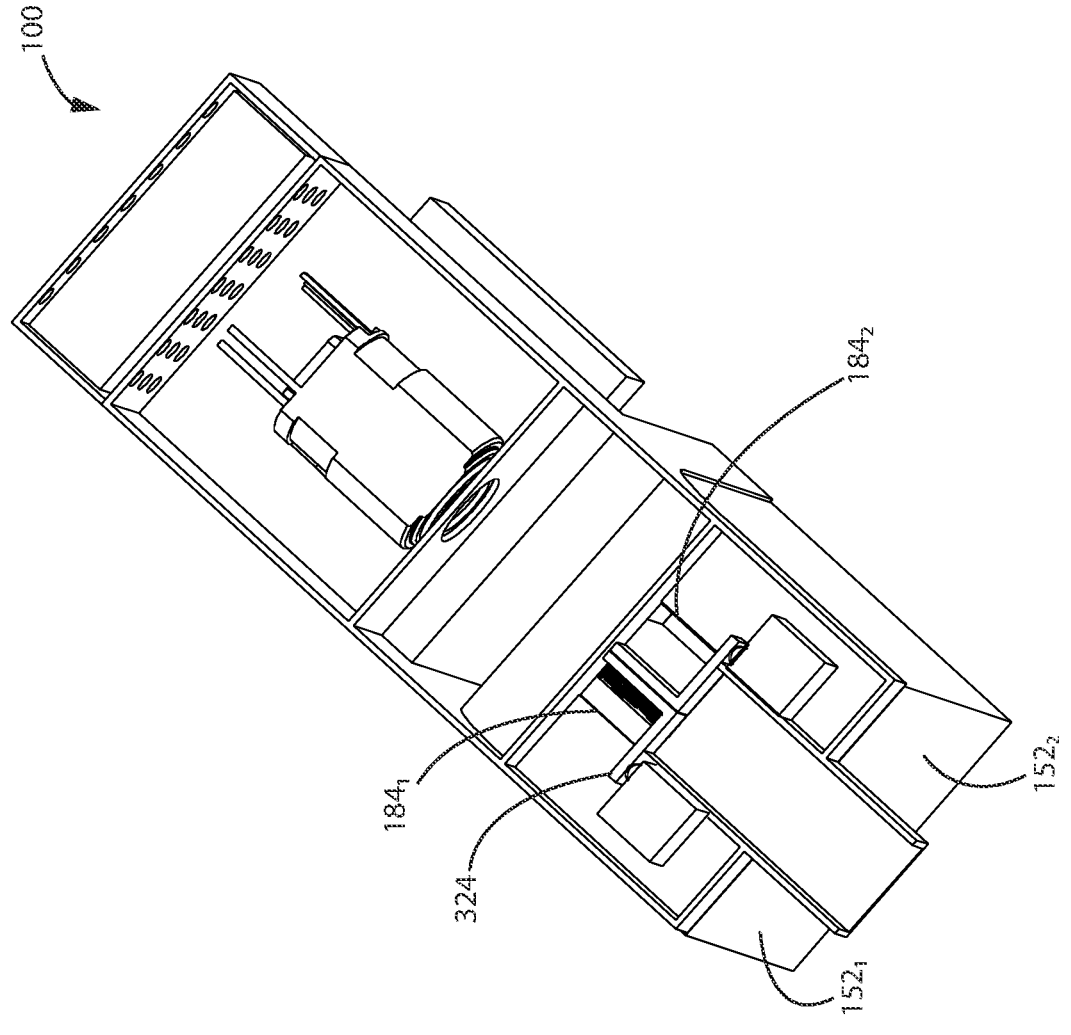
FIG. 31 is the cross-sectional view of FIG. 28, with the valve in a fourth position.

Valve 324 may be adjustable (e.g. movable) between different positions that provide different amounts of air to the first and second treatment chambers $152_1$, $152_2$. FIGS. 28-31 show four example positions. In FIG. 28, valve 324 is in a first position in which valve 324 removes the second treatment chamber $152_2$ from the air flow path so that air is provided only to the first treatment chamber $152_1$. In FIG. 29, valve 324 is in a second position in which valve 324 removes the first treatment chamber $152_1$ from the air flow path so that air is provided only to the second treatment chamber $152_2$. In FIG. 30, valve 324 is in a third position in which valve 324 positions both the first and second treatment chambers $152_1$, $152_2$ in the air flow path, so that air is provided to both the first and second treatment chambers $152_1$, $152_2$. In FIG. 31, valve 324 is in a fourth position in which valve 324 removes both the first and second treatment chambers $152_1$, $152_2$ from the air flow path, so that air is provided to neither the first nor second treatment chambers $152_1$, $152_2$ (e.g., in a bypass mode as discussed herein). Valve 324 may be adjustable to all or any subset of these positions. Further, valve 324 may provide variations on these positions in which valve 324 may restrict but not fully inhibit air flow through one or both treatment chambers $152_1$, $152_2$.

In some embodiments, the position of valve 324 may be automatically adjusted based on the flow rate of air through each of the first and second treatment chambers 152. For example, a reduction in air flow through a treatment chamber 152 may indicate that the dirt separator 154 of that treatment chamber 152 is reaching its dirt capacity (e.g., the pores are partially or fully clogged). In response to an air flow rate through the first treatment chamber $152_1$ being less than a threshold flow rate or less than a threshold fraction of the flow rate through the second treatment chamber, valve 324 may move to reduce or stop air flow through the first treatment chamber $152_1$, whereby a greater fraction (or all) air flow may be directed through the second treatment chamber $152_2$. This may improve the dirt separation efficiency and air flow efficiency of apparatus 100 by directing more (or all) of the air flow through an air treatment chamber 152 that has a dirt separator 154 with relatively greater dirt capacity.

Turning to FIG. 27, in some embodiments, each treatment chamber 152 may include one or more wipers 192 (or other debriding devices described below) that are movable across the outer wall 308 of the dirt separator 154 in the treatment chamber 152. For example, first treatment chamber $152_1$ may include first wiper(s) $192_1$ associated with first porous dirt separator $154_1$, and second treatment chamber $152_2$ may include second wiper(s) $192_2$ associated with second porous dirt separator $154_2$. As shown, wipers 192 may move across the outer walls 308 of their respective dirt separators 154 when the treatment chambers 152 are opened.

Figure 32A:
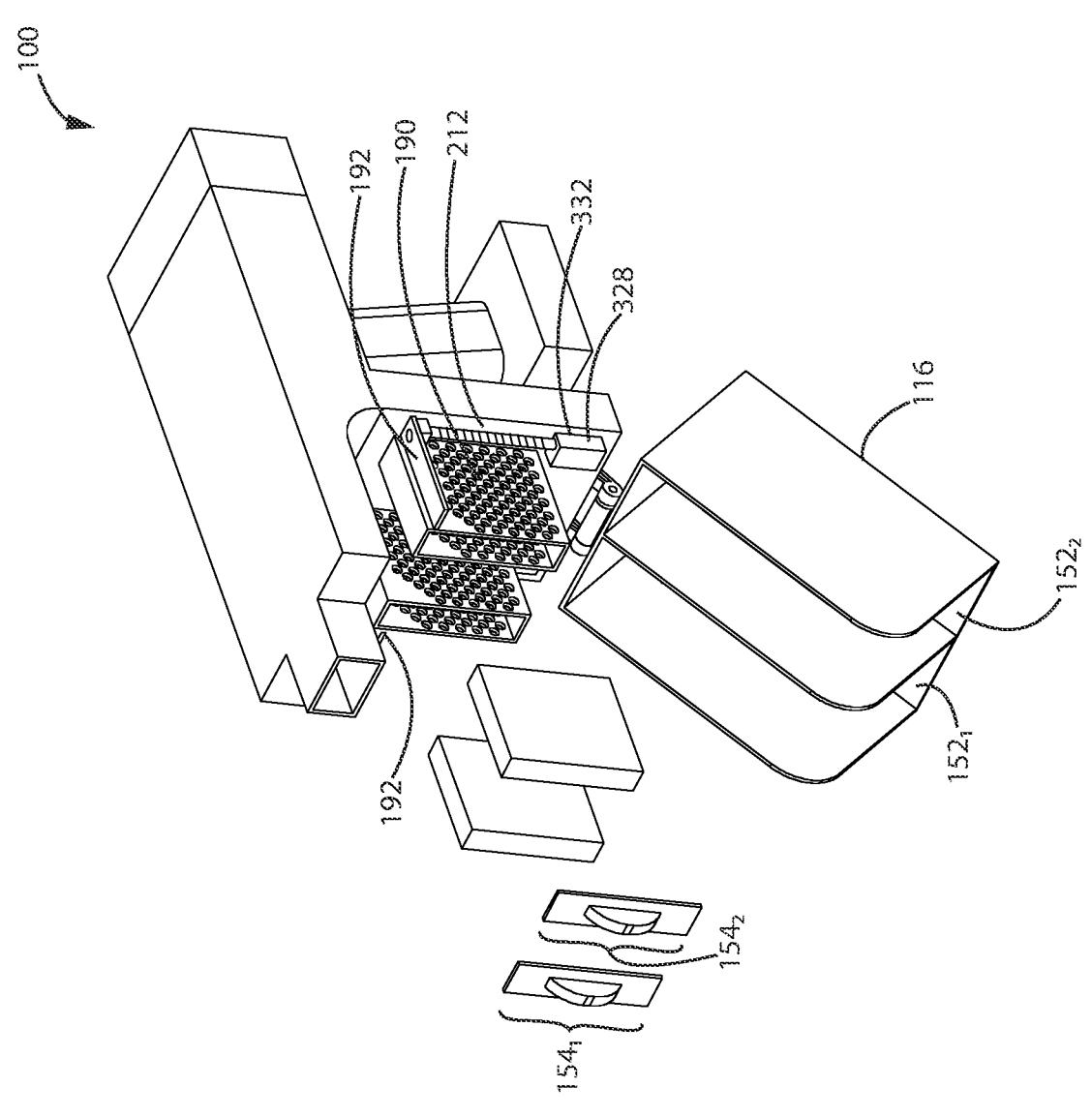
FIG. 32A is a perspective view of a surface cleaning apparatus having debriding devices including wiper actuators, in accordance with an embodiment.

Reference is now made to FIG. 32A. In some embodiments, one or both treatment chambers 152 may include one or more wipers 192 that include wiper actuators (e.g. electromechanical wiper actuators 328). Wiper actuators 328 may be activated in response to manual user selection (e.g. pressing a button), and/or opening treatment chambers 152, and/or other electronic logic (e.g. flow rate through the treatment chamber 152 having the associated wiper 192). Moreover, wiper(s) 192 of first treatment chamber $152_1$ may be activated independently of the wiper(s) 192 of second treatment chamber $152_2$, and vice versa.

In some embodiments, valve 324 (e.g., FIG. 28) may adjust position to reduce or stop air flow through one of treatment chambers 152, while the wiper(s) 192 in that treatment chamber 152 is activated to clean the dirt separator 154 in that treatment chamber 152. While the dirt separator 154 is being cleaned, air flow may continue through the other treatment chamber 152. This design can allow dirt separators 154 to be cleaned individually, without stopping air flow through air treatment member 116, so that the user can continue cleaning with apparatus 100 uninterrupted. By cleaning the dirt separators 154, the dirt capacity of the dirt separators 154 can be improved or restored thereby improving the dirt separation efficiency and air flow efficiency of apparatus 100.

Referring to FIG. 28-30, in some embodiments, the position of valve 324 may be adjusted based on the selected power level of the suction motor 144. For example, valve 324 may move automatically to the first or second position to provide air flow only to one of the treatment chambers 152 when the suction motor 144 is operating in a low power mode. This may help to maintain an air velocity and suction across the air treatment member 116 that is sufficient for efficient dirt separation. Further, valve 324 may move automatically to the third position to provide air flow to both treatment chambers 152 when suction motor 144 is operating in a high power mode in order to benefit from the dirt separators 154 of both treatment chambers 152.

Debriding Devices

In accordance with another aspect, in some embodiments, the air treatment member may include one or more debriding devices. A debriding device as described subsequently may assist in cleaning a dirt separator and/or may be capable of being triggered by electronic logic.

The debriding device may be used by itself or in combination with one or more of the air treatment member wipers, the multi-stage perforated substrates, openable pre-motor filter chamber, the nested porous separating members, the valving for multiple treatment chambers, the bypass valve, the power components configurations and the use of a sequential momentum separator and cyclone as disclosed herein.

As exemplified in FIG. 32A, as an alternative to wipers, or in addition to wipers, surface cleaning apparatus 100 may include one or more other debriding devices 332. The debriding devices 332 may be activated automatically to debride upstream surface(s) 190 of porous dirt separator 154. For example, the debriding device(s) 332 of a treatment chamber 152 may be activated automatically in response to the air flow rate through that treatment chamber 152 falling below a threshold flow rate or below a fraction of the flow rate through the other treatment chamber 152. This can allow the debriding device(s) 332 to improve or restore the dirt capacity and separation performance of the porous dirt separator 154 in that treatment chamber 152. Alternatively, or in addition, debriding devices 332 of one or both treatment chambers 152 may be activated automatically when the surface cleaning apparatus is turned off, and/or when one or both treatment chambers 152 are opened for emptying, and/or when activated manually (e.g. by a user device, such as a button). The debriding devices may include one or more of:

(i) electromechanically driven wipers (e.g. wipers that are rotated by motors, like windshield wipers on a car), (ii) spring actuated wipers that are energized when the dirt chamber or porous separating member is opened or closed, (iii) reversed air pressure (e.g. activated by repositioning one or more valves), which reverses the air flow across the dirty upstream surface 190, (iv) tapping on the porous separating member (e.g. with a manually or automatically actuated tapping member), (v) vibrator (e.g. solenoid, speaker, or offset weight motor), (vi) manual or electromechanical elongation (e.g. stretching) and/or contraction (e.g. compression) of the porous separating member, or (vii) other deformation of the porous separating member (e.g. inflation, like a balloon).

Figure 32B:
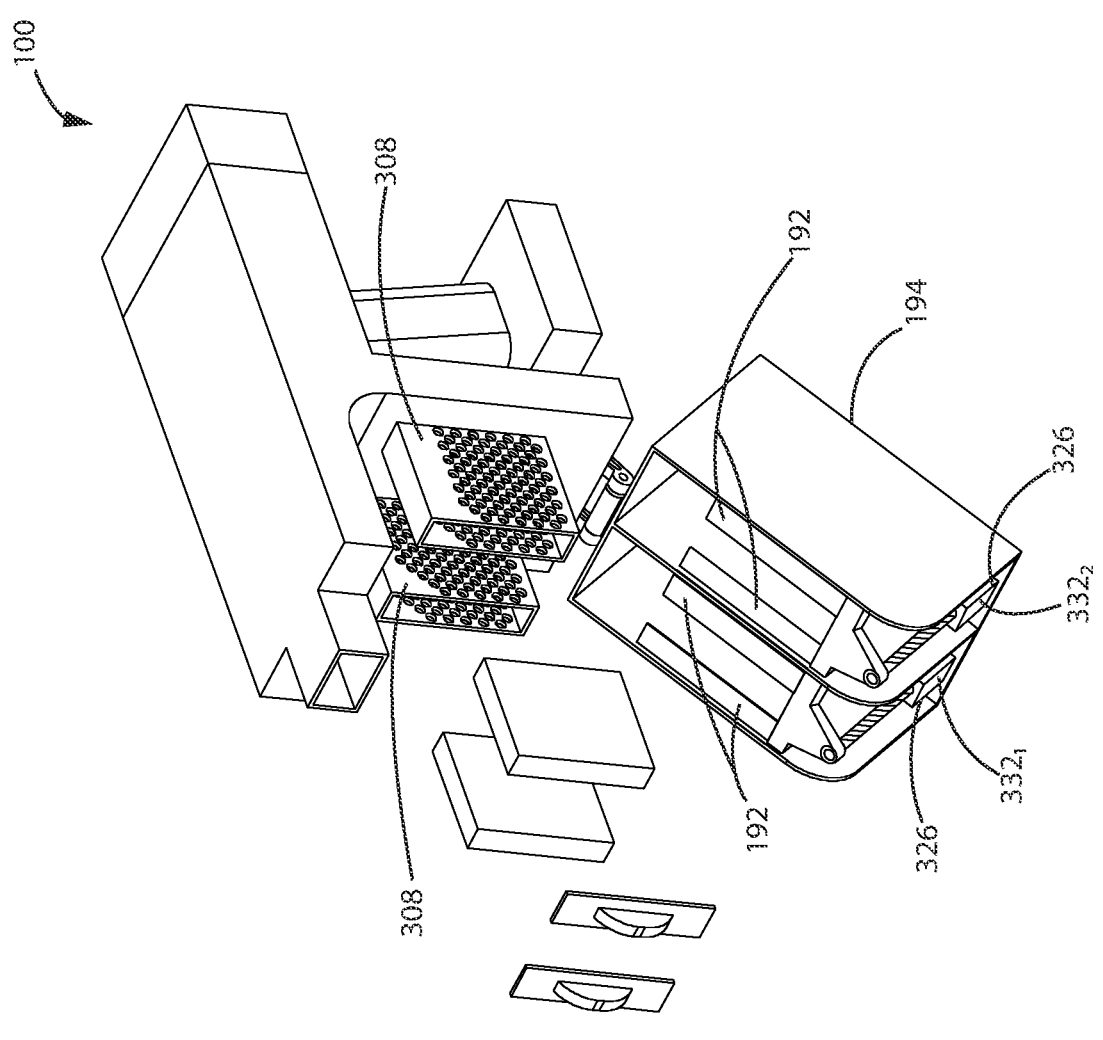
FIG. 32B is a perspective view of a surface cleaning apparatus having debriding devices including wiper actuators, in accordance with another embodiment.

FIG. 32B shows an example debriding device 332 that includes a wiper 192 that is moved across outer wall 308 by a wiper actuator 326. Wiper actuator 326 can be any electromechanical device that can be activated to move wiper actuator 326 across outer wall 308. For example, wiper actuator 326 may be a linear actuator as shown, or a rotary actuator (e.g. motor). As exemplified in FIG. 32A, wiper actuator 326 may be positioned proximate chamber rear end 212 and oriented to move wiper 192 vertically. As exemplified in FIG. 32B, wiper actuator is connected to openable door 194, and oriented to move wiper longitudinally. An advantage to the design of FIG. 32B is that wipers 192 may move across separator outer wall 308 when wiper actuator 326 is activated, and also when door 194 is moved (e.g. opened and/or closed).

Figure 33:
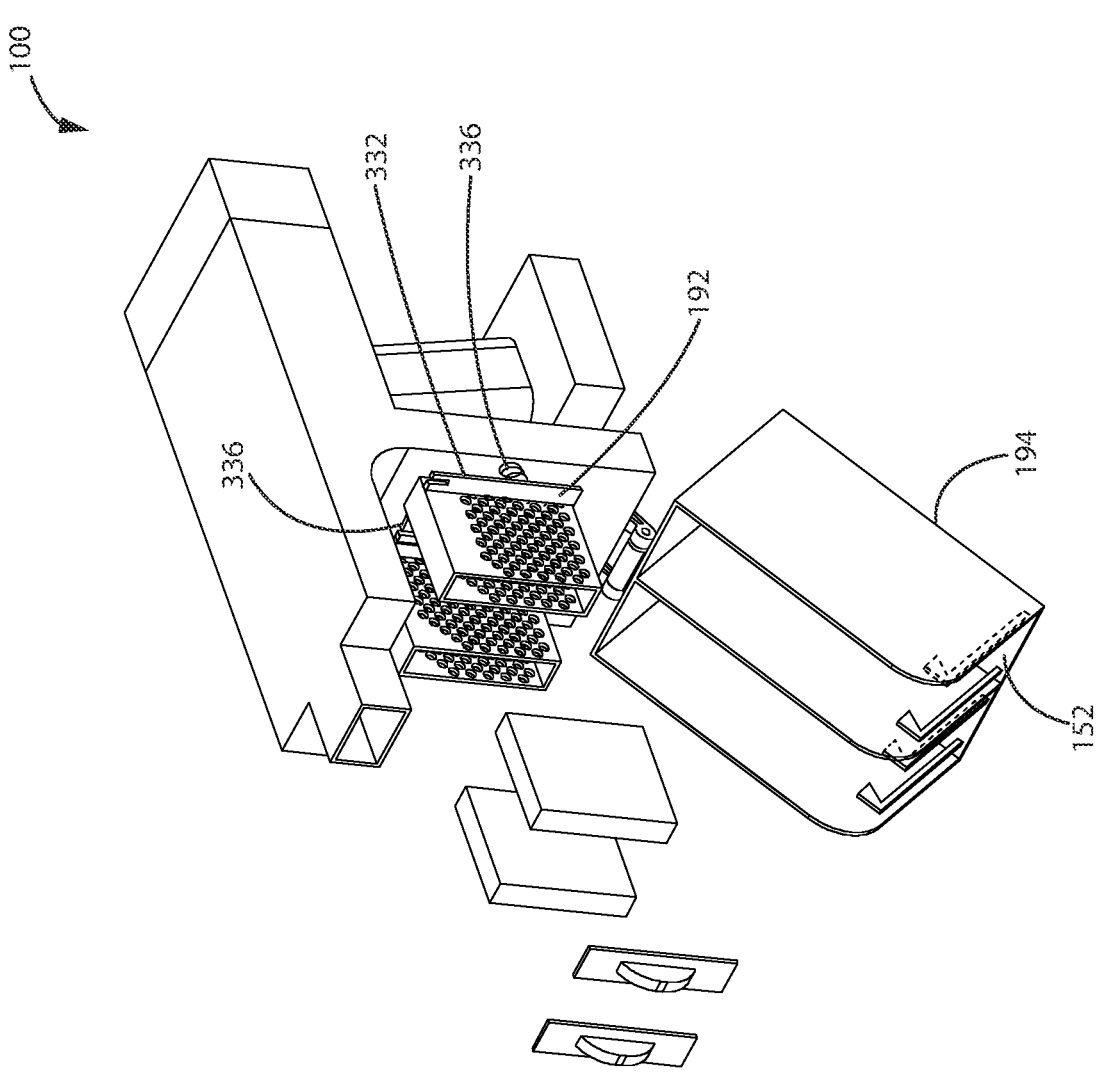
FIG. 33 is a perspective view of a surface cleaning apparatus having debriding devices including spring actuated wipers, in accordance with another embodiment.

FIG. 33 shows an example debriding device 332 that includes spring-actuated wipers 192. As shown, wipers 192 may include a spring member 336 that may be energized automatically as the treatment chamber 152 is opened and/or closed. The spring actuation may make wipers 192 move with greater speed as compared with synchronizing the movement of wipers 192 to the movement of a treatment chamber wall such as door 194.

Figure 34:
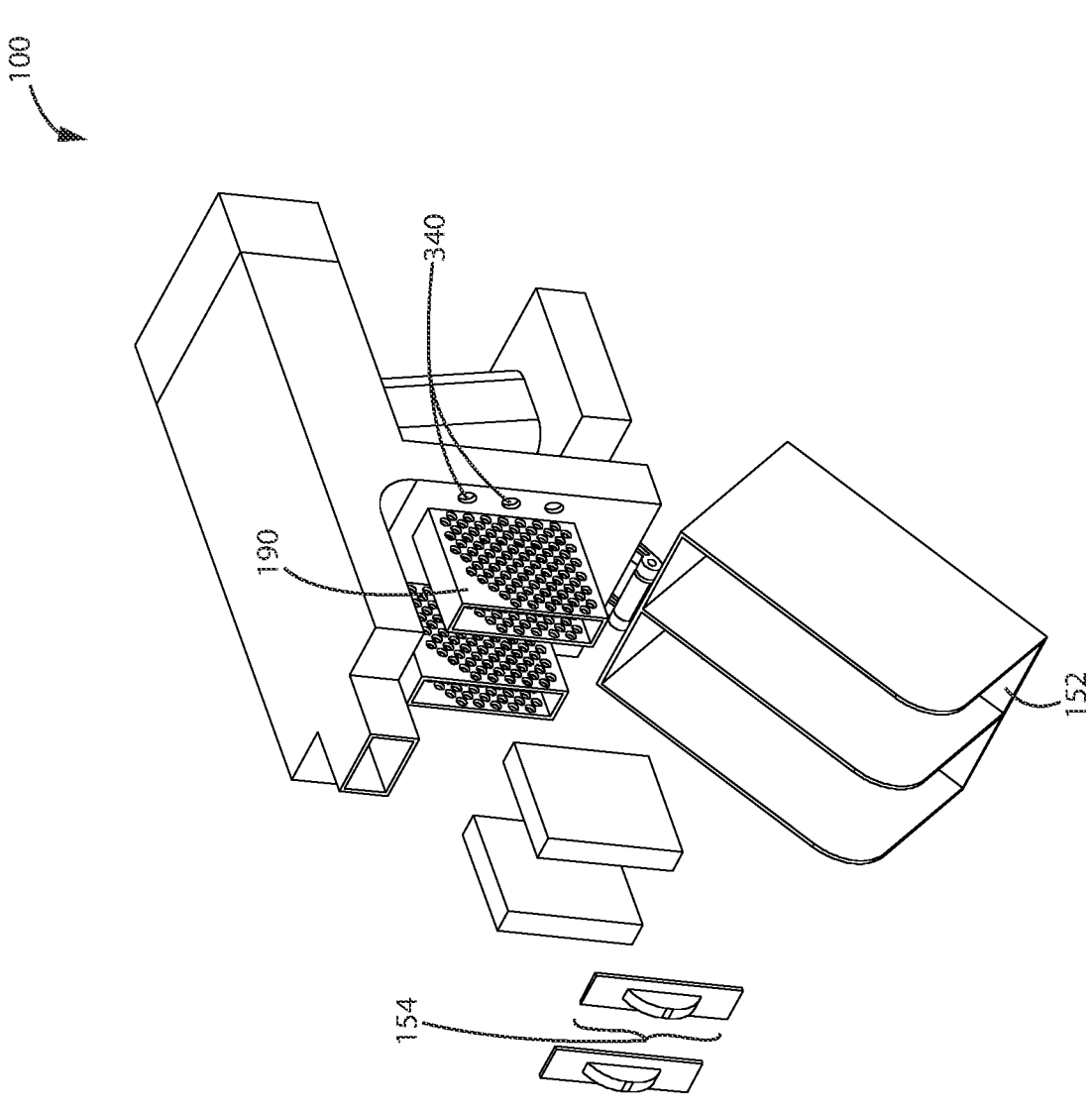
FIG. 34 is a perspective view of a surface cleaning apparatus having debriding devices including reverse air outlets, in accordance with an embodiment.

FIG. 34 shows an example debriding device 332 that includes one or more valved air outlets 340, which may be opened to direct streams of airflow into the associated treatment chamber 152 across the upstream surface 190 of the dirt separator 154. The streams of airflow may impinge upon the upstream surface 190 to help clean the dirt separator 154, thereby restoring its dirt capacity and separation efficiency.

Figure 35:
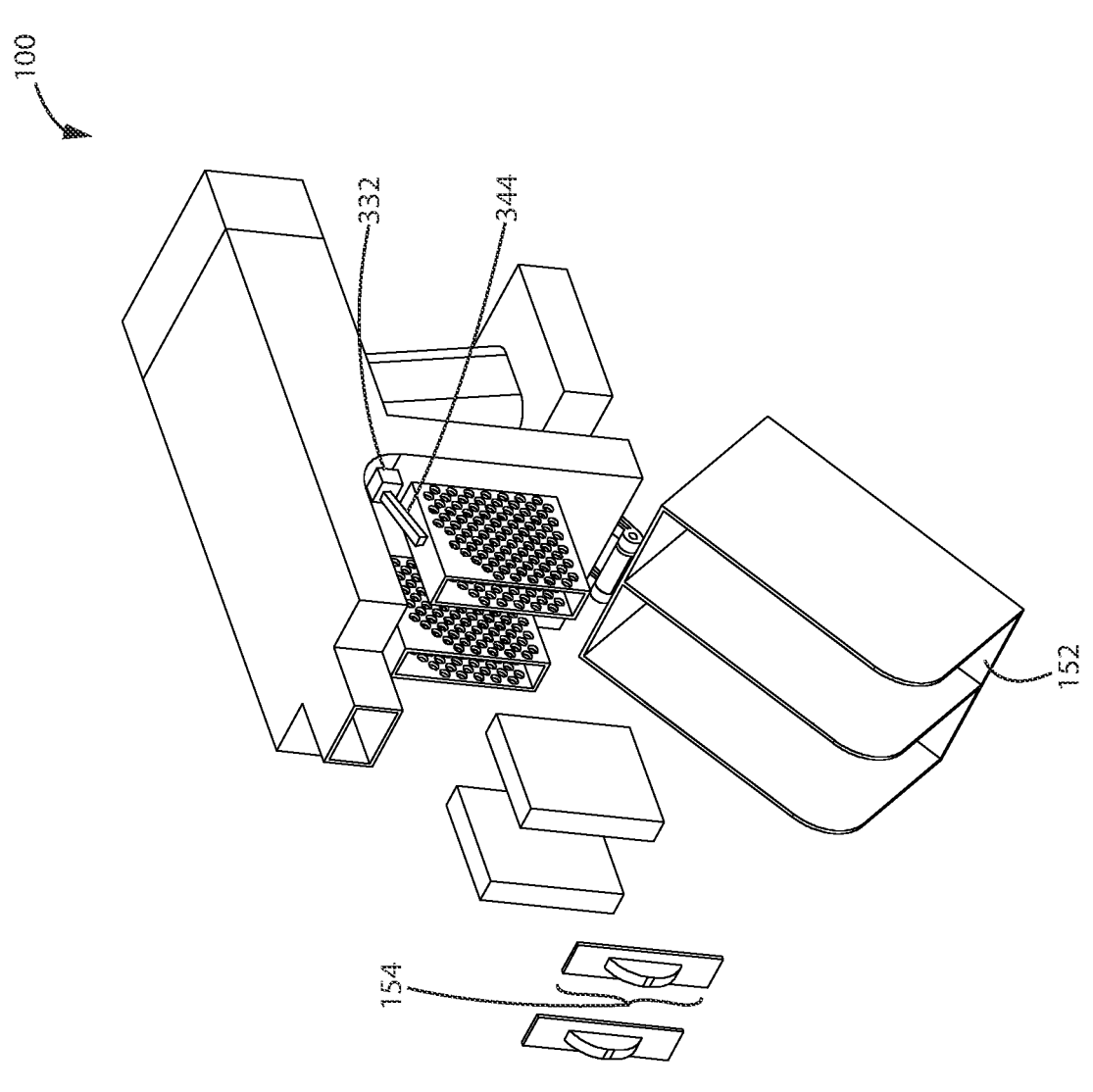
FIG. 35 is a perspective view of a surface cleaning apparatus having debriding devices including tapping members, in accordance with an embodiment.

FIG. 35 shows an example debriding device 332 that includes a tapping member 344 that may be manually or electromechanically actuated to tap upon dirt separator 154, and thereby cause dirt held by the dirt separator 154 to fall away.

Figure 36:
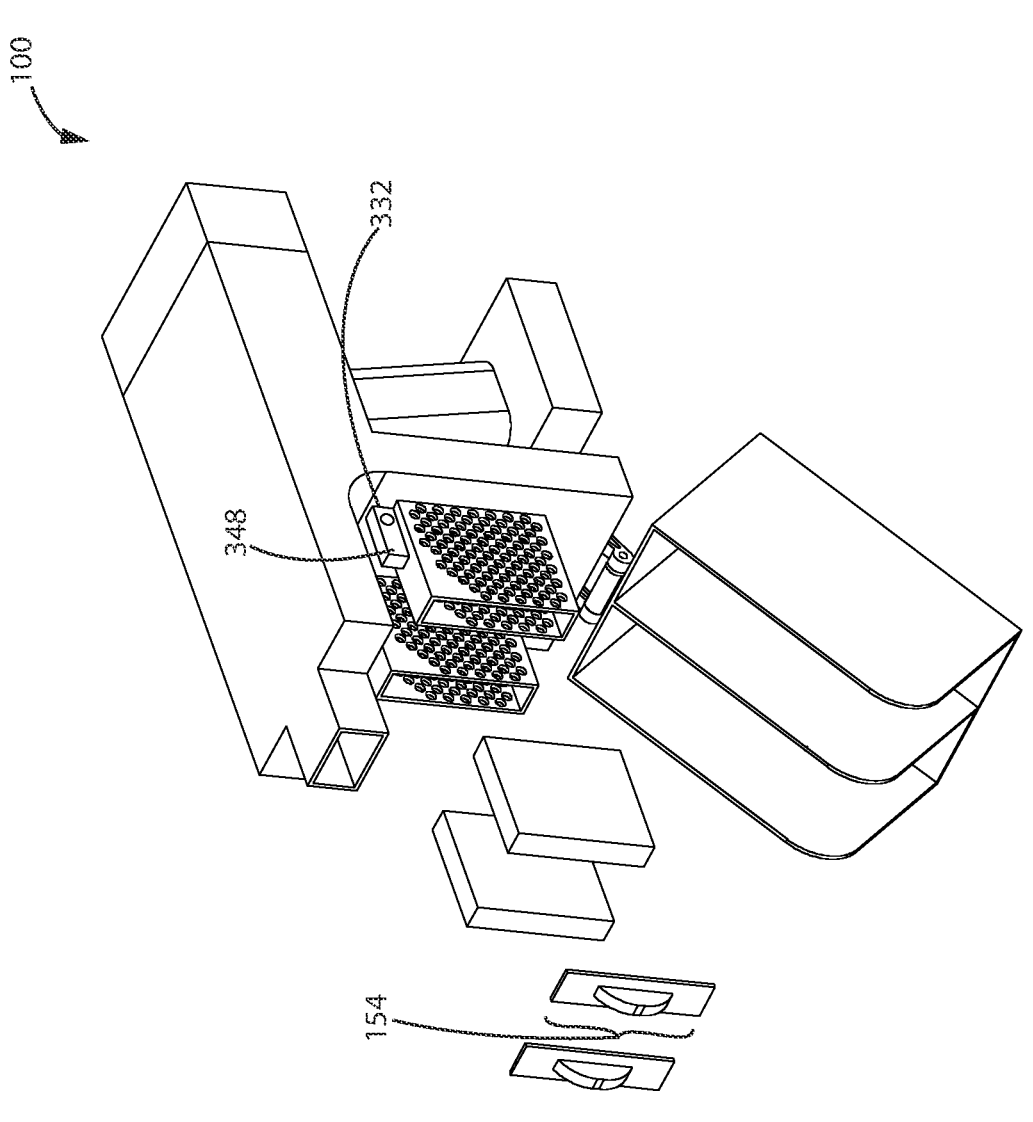
FIG. 36 is a perspective view of a surface cleaning apparatus having debriding devices including vibrators, in accordance with an embodiment.

FIG. 36 shows an example debriding device 332 that includes a vibrator 348. Vibrator 348 can be any device that can generate vibrations in dirt separator 154, which are effective at causing dirt held by dirt separator 154 to fall away. For example, vibrator 348 may be or include one or more of a solenoid, speaker, or offset weight motor.

Figure 37:
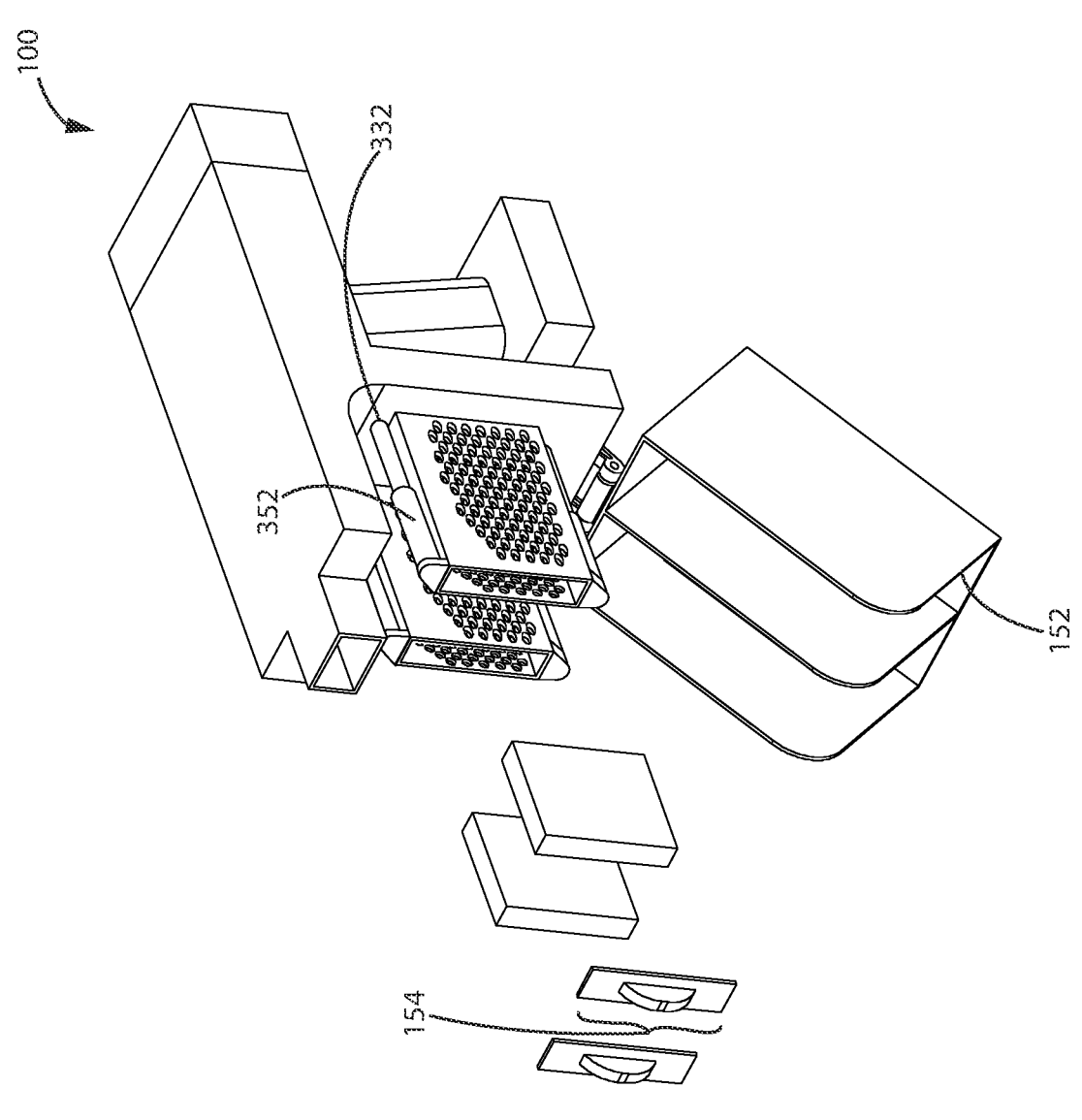
FIG. 37 is a perspective view of a surface cleaning apparatus having debriding devices including deformation actuators in accordance with an embodiment.
Figure 38:
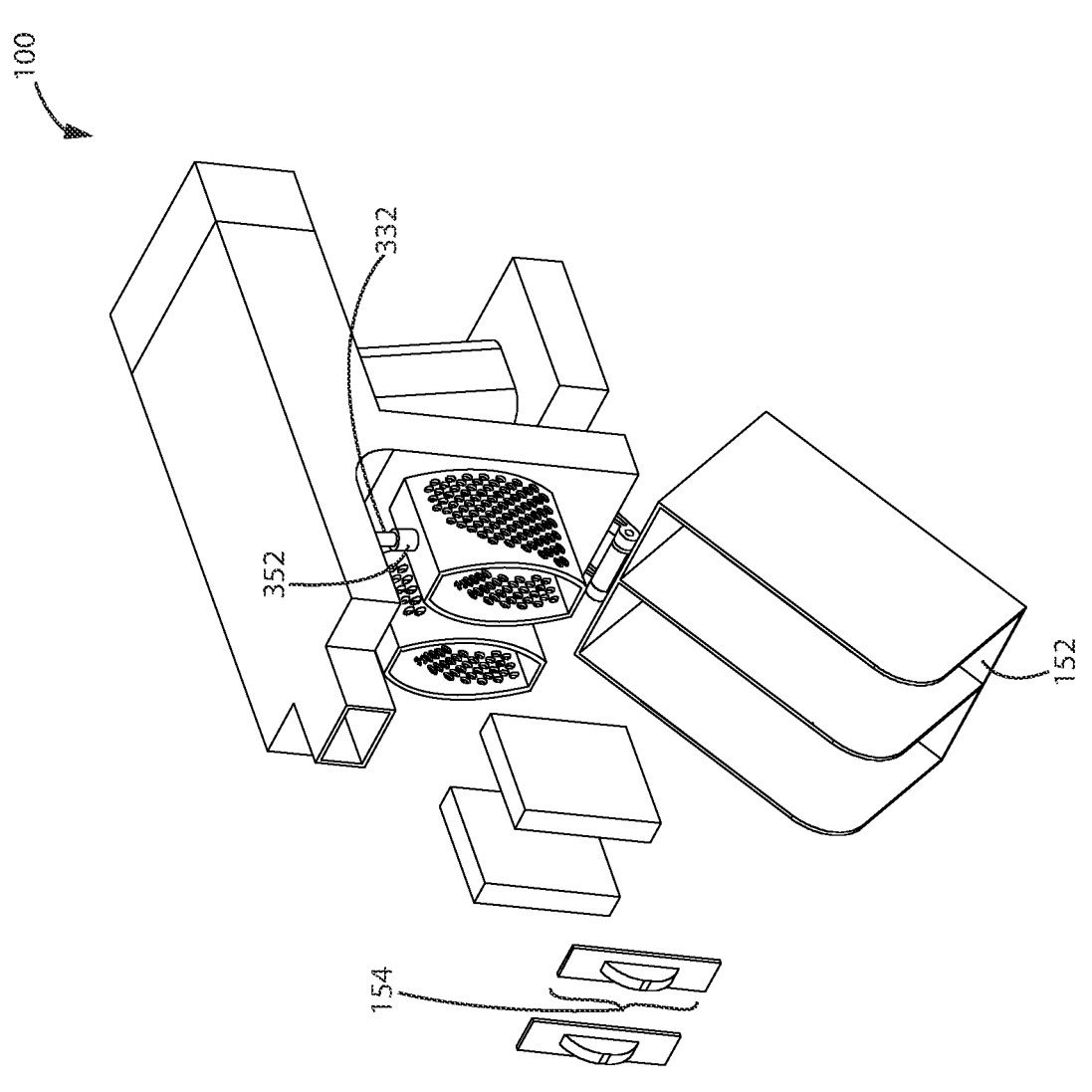
FIG. 38 is a perspective view of a surface cleaning apparatus having debriding devices including deformation actuators in accordance with another embodiment.

FIGS. 37-38 show examples of debriding devices 332 that include a deformation actuator 352. Deformation actuator 352 may be any device that can generate a dimensional deformity of dirt separator 154 (e.g. stretch, contraction, or inflation). For example, deformation actuator 352 may be or include one or more linear actuators connected to dirt separator 154, and that can be activated to deform dirt separator 154 longitudinally. In FIG. 37, deformation actuator 352 is configured to stretch and/or contract dirt separator 154. In FIG. 38, deformation actuator 352 is configured to inflate dirt separator 154. The deformation may cause relative movement between the dirt separator 154 and the dirt held thereon, whereby the dirt may detach and fall away.

Bypass Valve

In accordance with another aspect, in some embodiments, the surface cleaning apparatus may include a bypass valve that can be used in connection with an external air treatment member. The bypass valve may move to a first position when the external air treatment member is disconnected from the apparatus. In the first position, the valve may configure the air flow path through the apparatus so that the air treatment member of the surface cleaning apparatus (e.g., an internal air treatment member) is positioned in the air flow path. The bypass valve may move to a second position when the external air treatment member is connected to the apparatus. In the second position, the valve may configure the air flow path through the apparatus so that the internal air treatment member is excluded from the air flow path. This may mitigate the internal air treatment member creating unnecessary backpressure when the external air treatment member is acting to separate dirt from the air flow.

The bypass valve may be used by itself or in combination with one or more of the air treatment member wipers, the multi-stage perforated substrates, openable pre-motor filter chamber, the nested porous separating members, the valving for multiple treatment chambers, the debriding devices, the power components configurations and the use of a sequential momentum separator and cyclone as disclosed herein.

Figure 21:
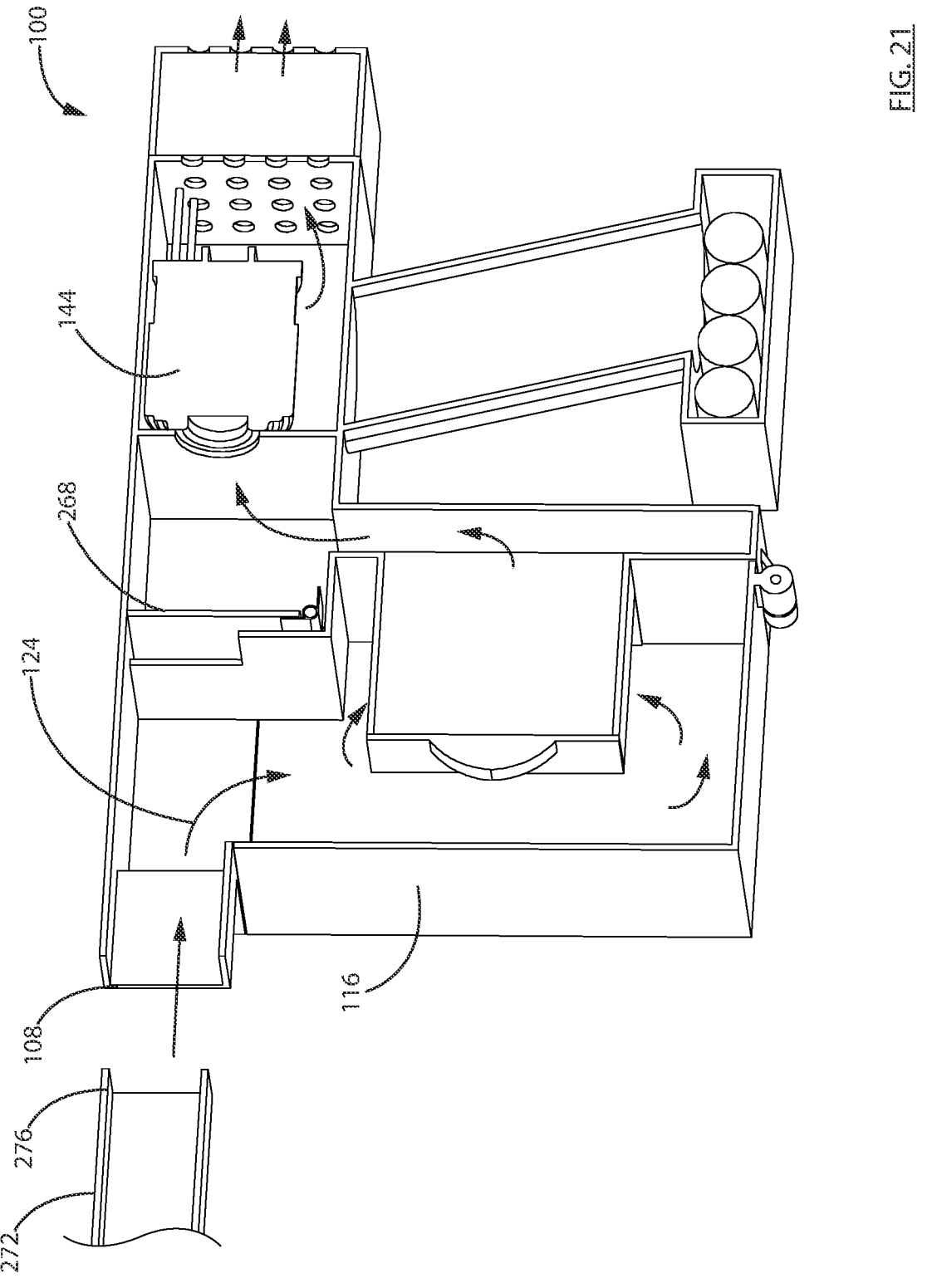
FIG. 21 is a perspective cross-sectional view of a surface cleaning apparatus, with a disconnected external air treatment member and a bypass valve in a first position, in accordance with an embodiment.
Figure 22:
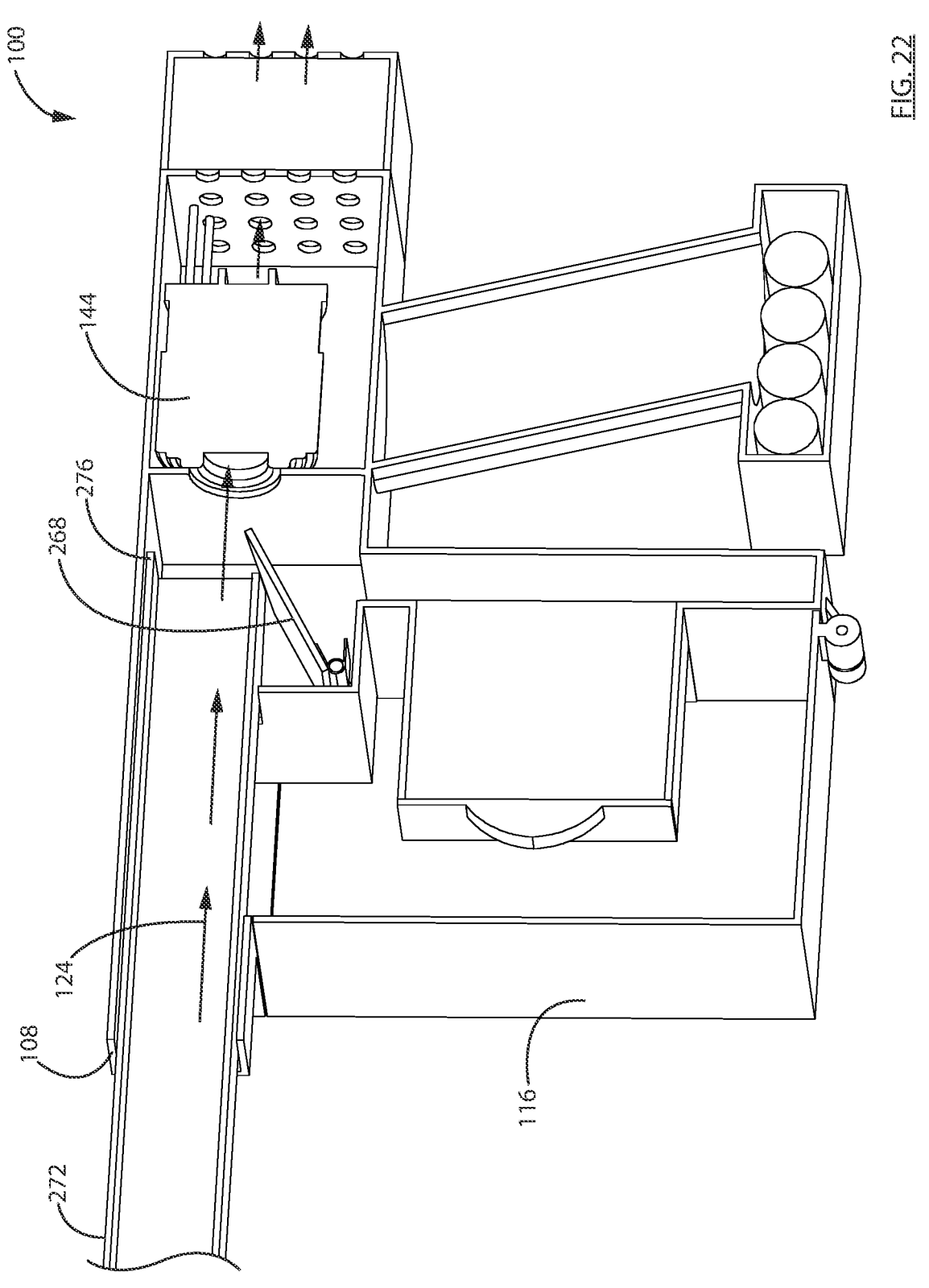
FIG. 22 is the perspective cross-sectional view of FIG. 21, with the external air treatment member connected and the bypass valve in a bypass position.

As exemplified in FIGS. 21-22, in any embodiment disclosed herein, surface cleaning apparatus 100 may include a bypass valve 268. Bypass valve 268 is movable between a first position (FIG. 21) and a second position (FIG. 22, also referred to as a bypass position). In the bypass position (FIG. 22), bypass valve 268 reconfigures the air flow path 124 from dirty air inlet 108 to suction motor 144 to bypass air treatment member 116 (i.e. air treatment member 116 is not positioned in the air flow path 124). In the first position (FIG. 21), the air flow path is configured so that some or all of the air flow traveling from dirty air inlet 108 to suction motor 144 passes through air treatment member 116 (i.e. air treatment member 116 is positioned in the air flow path 124).

Figure 23:
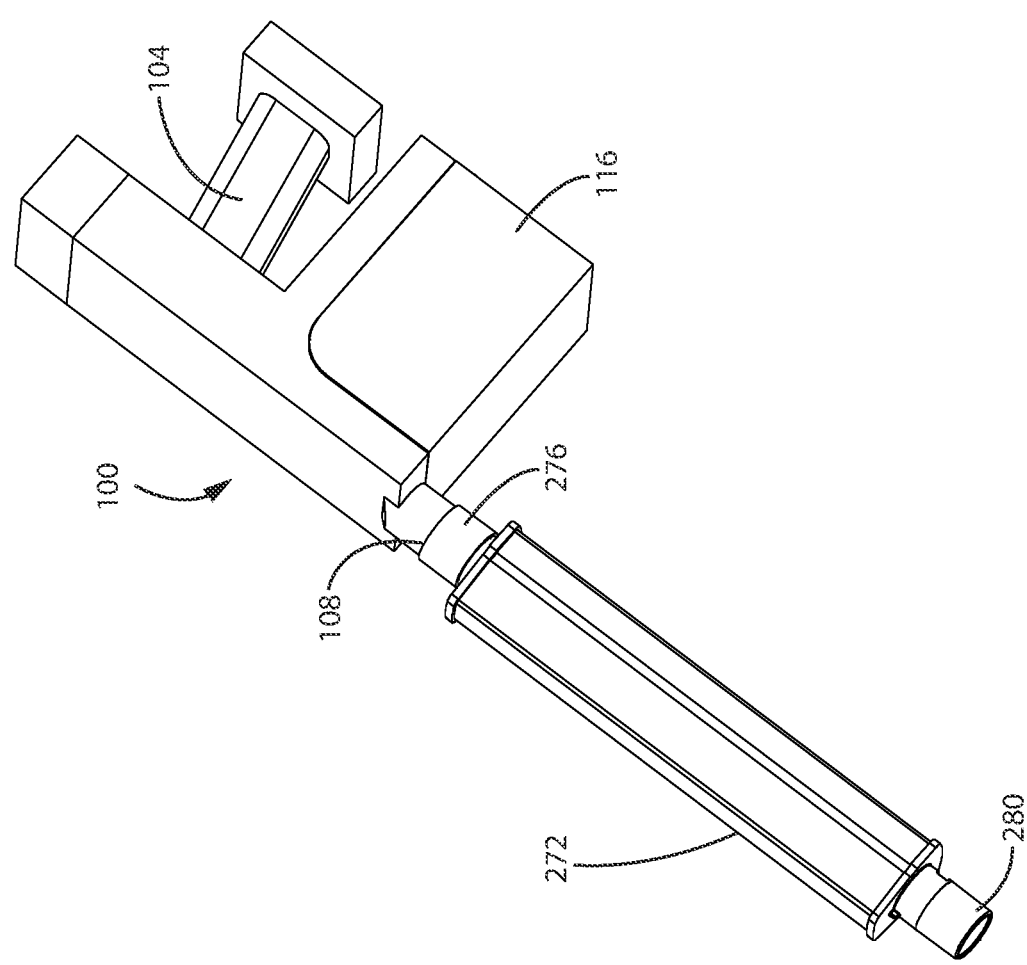
FIG. 23 is a perspective view of the surface cleaning apparatus of FIG. 21, with the external air treatment member connected.

Turning to FIGS. 21-23, bypass valve 268 may be used in connection with an external air treatment member 272 (e.g., a cyclone contained within the attachment shown in these Figures). In the example shown, a downstream end 276 of external air treatment member 272 is removably connectable to dirty air inlet 108. A floor cleaning head (not shown) may be connected to upstream end 280 or the upstream end 280 may be used as a nozzle to clean surfaces directly. The bypass valve 268 may be automatically or manually moved to the bypass position (FIG. 22) when the surface cleaning apparatus 100 is connected to the external air treatment member 272 so that dirty air is cleaned by the external air treatment member 272 and then travels to the suction motor 144 bypassing the air treatment member 116 of the surface cleaning apparatus 100. The bypass valve 268 may be automatically or manually moved to the first position (FIG. 21) when the surface cleaning apparatus 100 is disconnected from the external air treatment member 272 in order to resume cleaning the dirty air flow using air treatment member 116.

Power Components Configuration

In accordance with another aspect, in some embodiments, the surface cleaning apparatus may include one or more (or all) of a power cable, energy storage member (e.g. battery or supercapacitor), cord reel, and an AC to DC power supply. These components may have various positional arrangements in different embodiments, which may improve the ergonomics of the surface cleaning apparatus (e.g. reduced weight, better weight balance, or greater portability).

The power components configurations may be used by themselves or in combination with one or more of the air treatment member wipers, the multi-stage perforated substrates, openable pre-motor filter chamber, the nested porous separating members, the valving for multiple treatment chambers, the debriding devices, the bypass valve and the use of a sequential momentum separator and cyclone as disclosed herein.

Turning to FIG. 2, in any of the embodiments disclosed herein, surface cleaning apparatus 100 may be configured as a cordless (e.g. battery powered) device, or a corded (e.g. mains powered) device, or both. In embodiments including a cordless configuration, the suction motor 144 and energy storage member 286 (e.g. battery or supercapacitor) may be positioned in any suitable location. For example, the suction motor 144 may be positioned above handle 104 with the energy storage member 286 below handle 104 as exemplified. This configuration may help to lower the center of gravity of apparatus 100 where the energy storage member 286 is relatively large and heavy.

Figure 41:
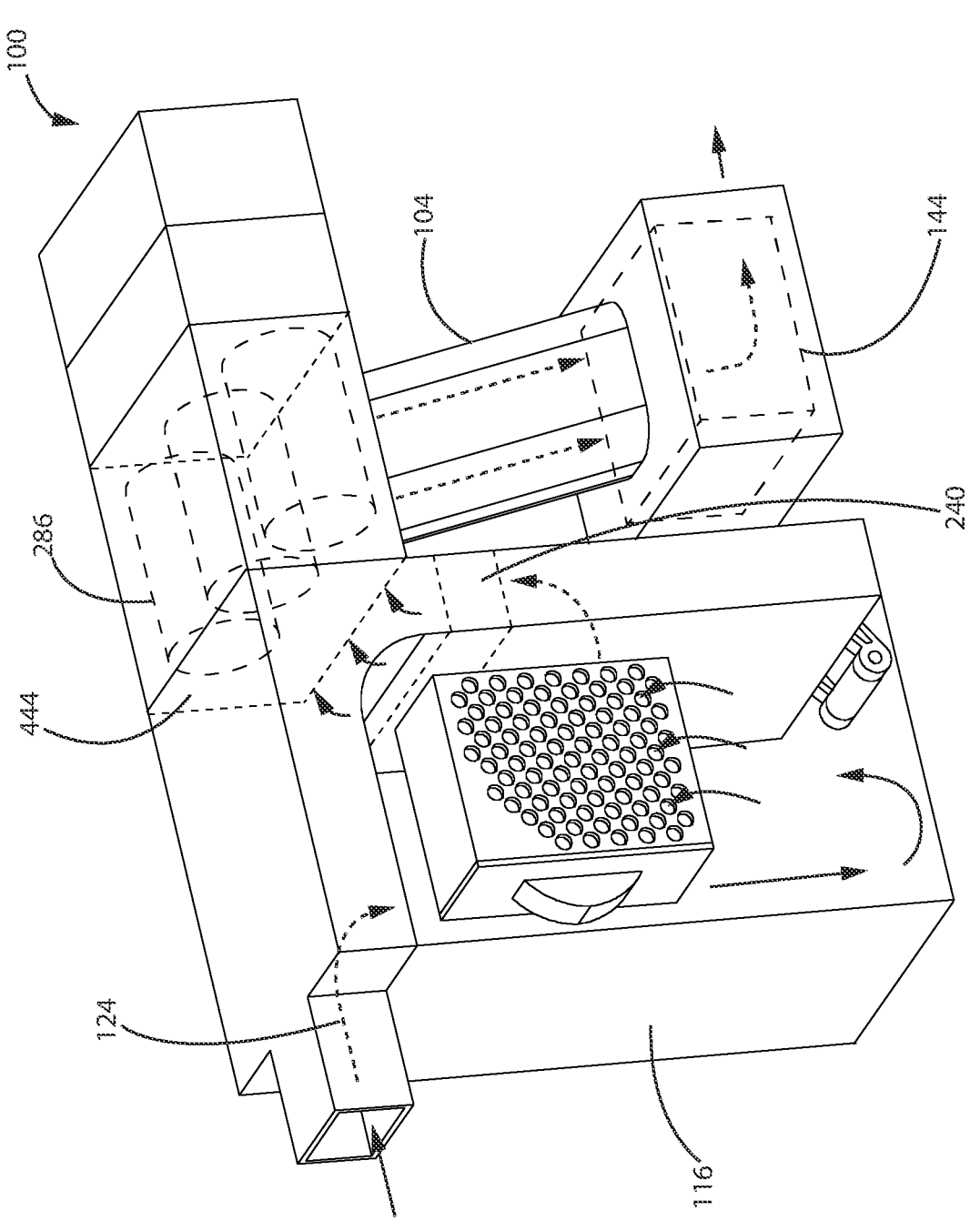
FIG. 41 is a perspective view of a surface cleaning apparatus having an energy storage member above the handle, and a suction motor below the energy storage member, in accordance with an embodiment.
Figure 41B:
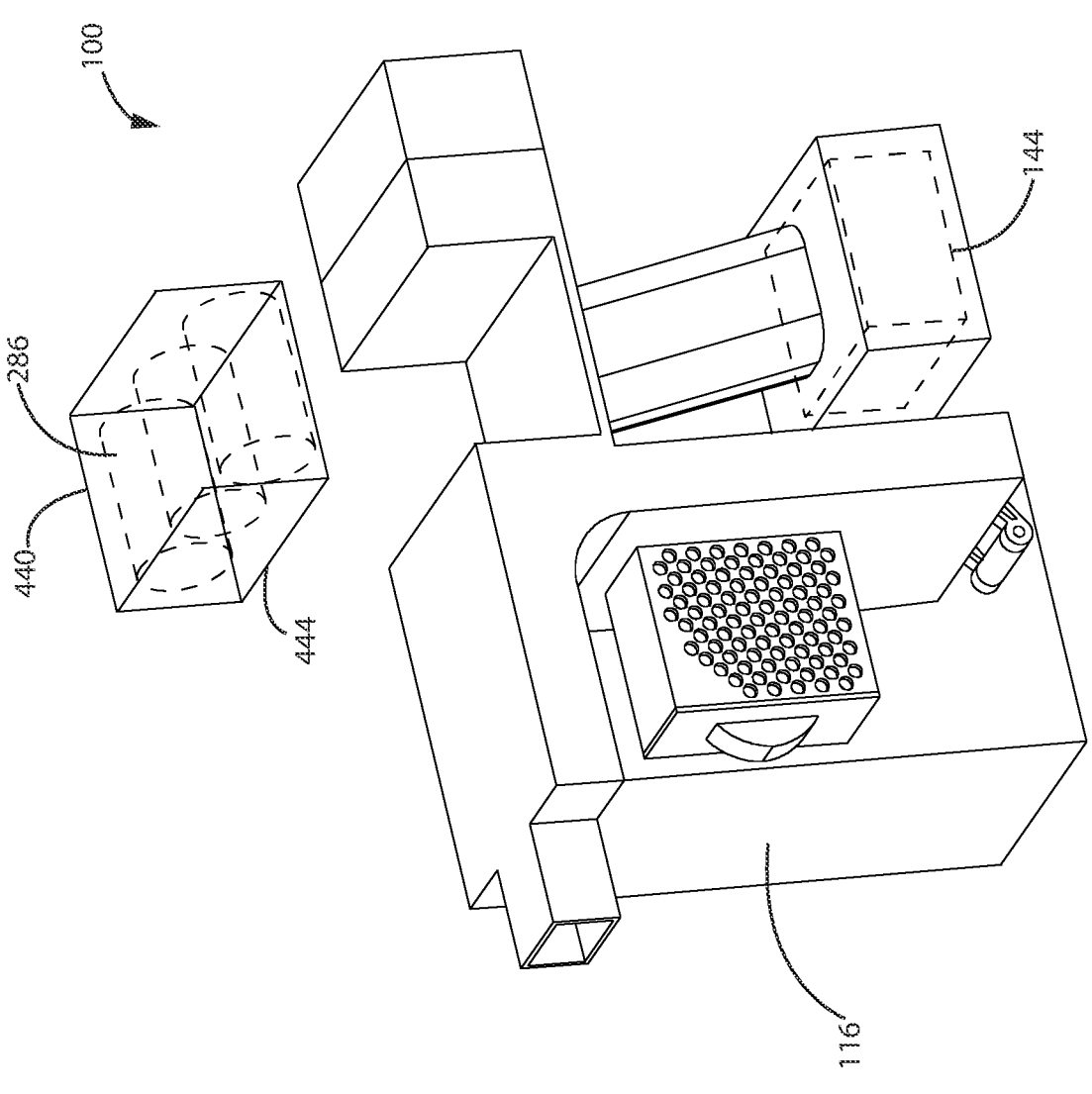
FIG. 41B is a perspective view of the surface cleaning apparatus of FIG. 41, with the energy storage member removed.

FIGS. 41-41B exemplify an alternative embodiment in which the suction motor 144 may be positioned below handle 104 with energy storage member 286 positioned above handle 104. As shown, this configuration may locate energy storage member 286 in the air flow path 124 upstream of suction motor 144. This can allow the air flow to cool energy storage member 286. Energy storage members (e.g. batteries and supercapacitors) may be damaged by overheating, which may occur during operation, and using the air flow upstream of the suction motor may assist in cooling the energy storage member during use.

In the illustrated example, energy storage member 286 is provided in a battery pack 440 having an outer wall 444. As shown, the air flow may pass over an outer surface of battery pack 440 (i.e. over an outer surface of wall 444) and/or through a battery pack as the air travels from air treatment member 116 to suction motor 144. As shown in FIG. 41B, battery pack 440 may be removably mounted to surface cleaning apparatus 100. This can allow battery pack 440 to be charged externally and to be swapped with another pre-charged battery pack.

In some embodiments, a pre-motor filter 240 may be positioned downstream of treatment chamber 152 and upstream of energy storage member 286. The pre-motor filter 240 may further clean the air flow before the air flow makes contact with the energy storage member 286 (e.g. before making contact with battery pack 440) to mitigate dirtying energy storage member 286 or the outer surface of battery pack 440 with dirt remaining in the air flow. Dirt on the outer wall of a battery pack would be an insulator and reduce heat dissipation from the battery pack.

Figure 24:
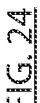
FIG. 24 is a perspective view of a surface cleaning apparatus with an energy storage member in the handle, a suction motor below the energy storage member, and a power cord, in accordance with an embodiment.
Figure 42:
FIG. 42 is a perspective view of a surface cleaning apparatus with an energy storage member in the handle and a suction motor above the energy storage member, in accordance with an embodiment.

FIG. 42 shows an example in which suction motor 144 may be positioned above handle 104 with energy storage member 286 inside handle 104. This configuration may position the center of mass of the energy storage member 286 where the user grasps surface cleaning apparatus 100. This may mitigate energy storage member 286 moving the apparatus center of mass away from the user's hand position when energy storage member 286 is connected to apparatus 100 (e.g. when operating in a cordless configuration) as compared to when energy storage member 286 is disconnected from apparatus 100 (e.g. when operating in a corded configuration with the battery removed). Alternatively, FIG. 24 shows an embodiment in which suction motor 144 is positioned below handle 104 with energy storage member 286 inside handle 104.

Figure 25:
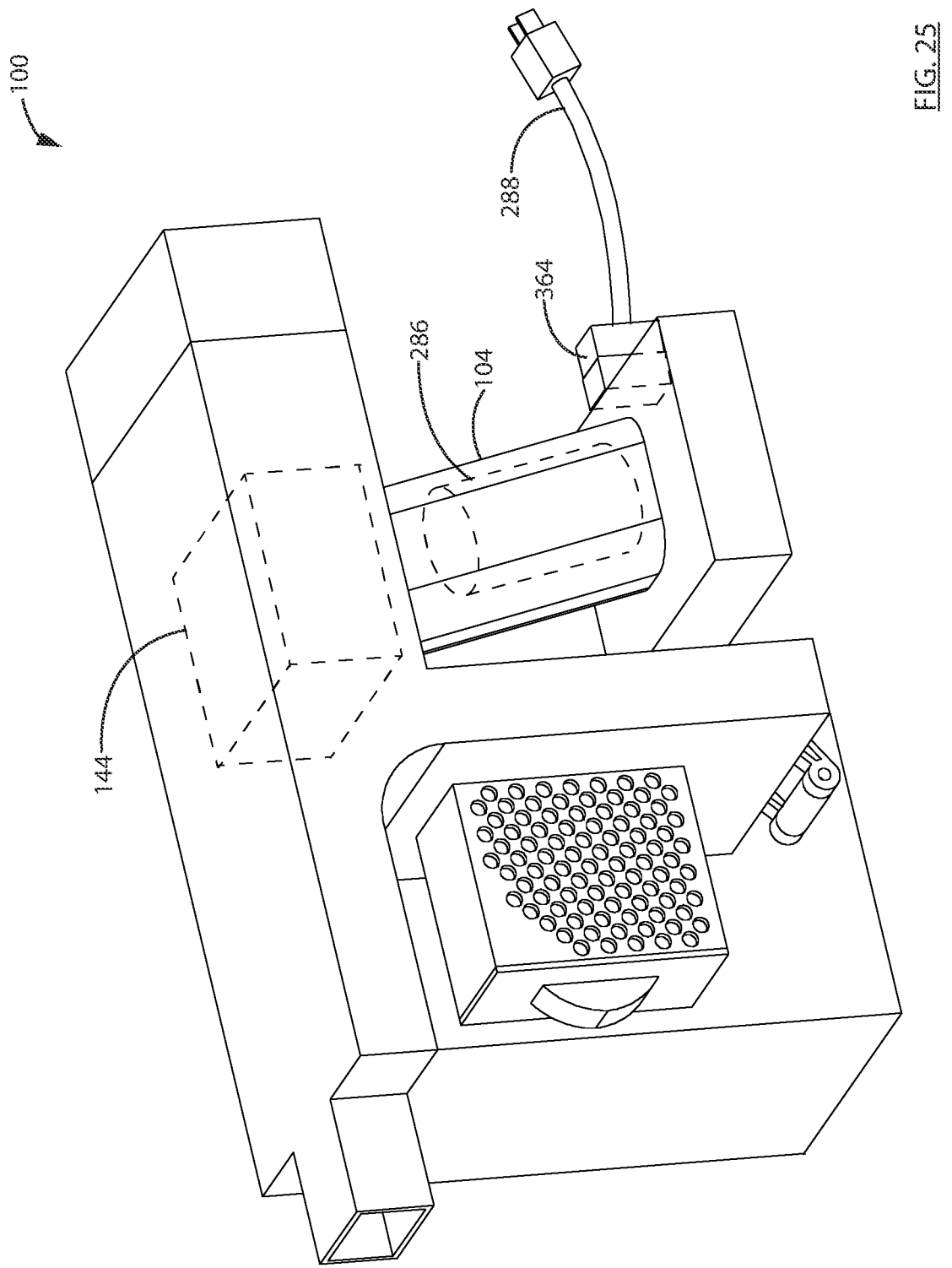
FIG. 25 is a perspective view of a surface cleaning apparatus with an energy storage member in the handle, a suction motor above the energy storage member, and a removable power cord, in accordance with an embodiment.

Turning to FIG. 25, in embodiments including a corded configuration, the cord 288 may be removable to reconfigure into a cordless (e.g. battery powered) configuration. For example, an electrical connector 364 may provide a removable connection between cord 288 and apparatus 100. This may reduce the weight of apparatus 100 when operated in a cordless configuration, as compared with a cordless configuration that requires carrying cord 288.

Figure 26:
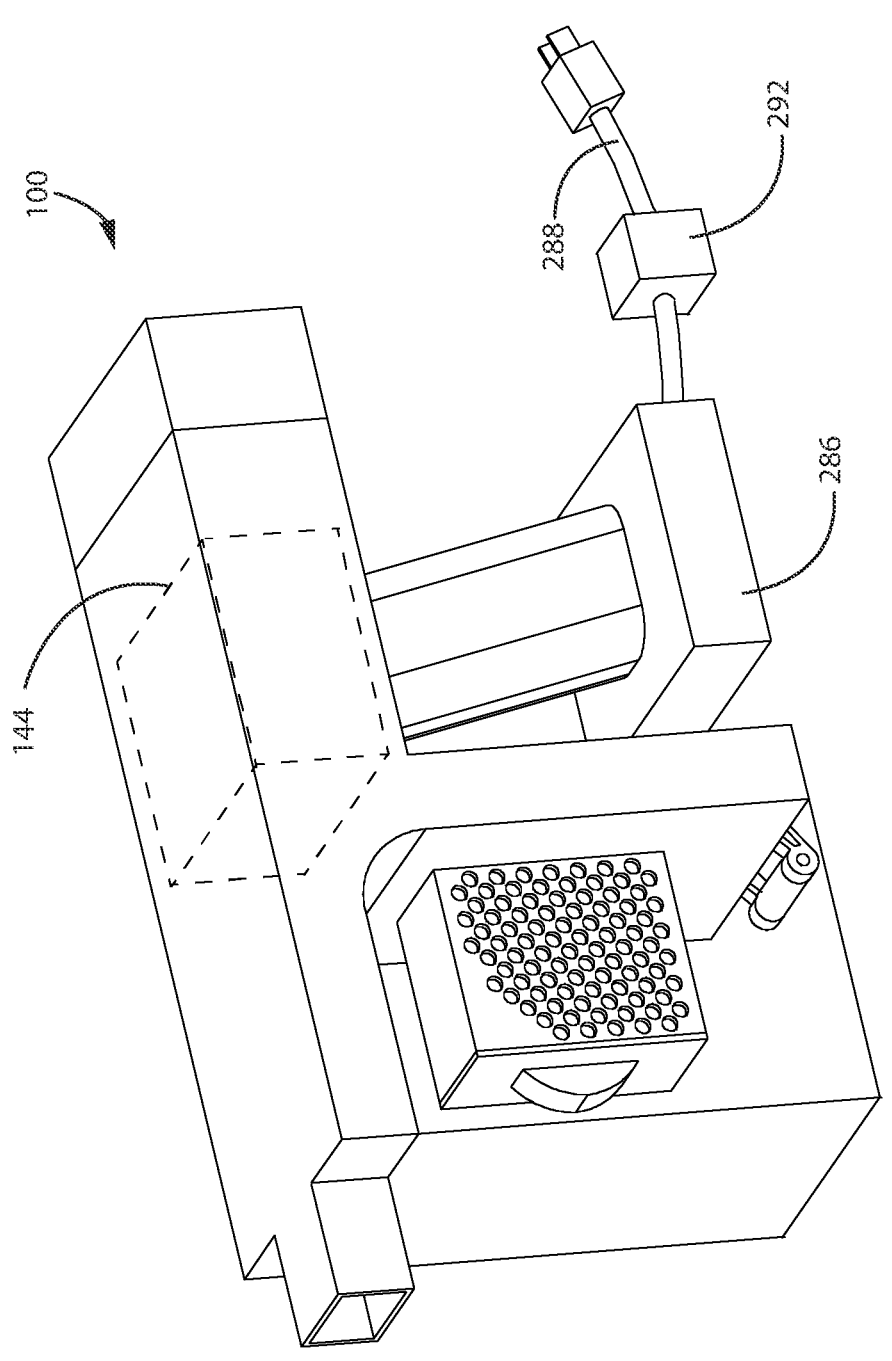
FIG. 26 is a perspective view of a surface cleaning apparatus with an energy storage member at a lower end of the handle, a suction motor at an upper end of the handle, a power cord, and an external power supply, in accordance with an embodiment.

As shown in FIG. 26, apparatus 100 may include an AC to DC power supply 292 in association with power cord 288 to supply DC power to the suction motor 144 and/or other electrically powered elements of apparatus 100. This may permit apparatus 100 to use a DC suction motor 144 that can be directly powered by energy storage member 286 in the cordless configuration, without suffering the energy loss associated with a DC to AC converter. In turn, this may extend the cordless runtime of apparatus 100 all else being equal. In other embodiments, power cord 288 may connect directly to mains power to supply AC power to suction motor 144 as shown in FIG. 25. For example, apparatus 100 may include an internal AC to DC power supply, or a suction motor 144 compatible with AC power.

Figure 43:
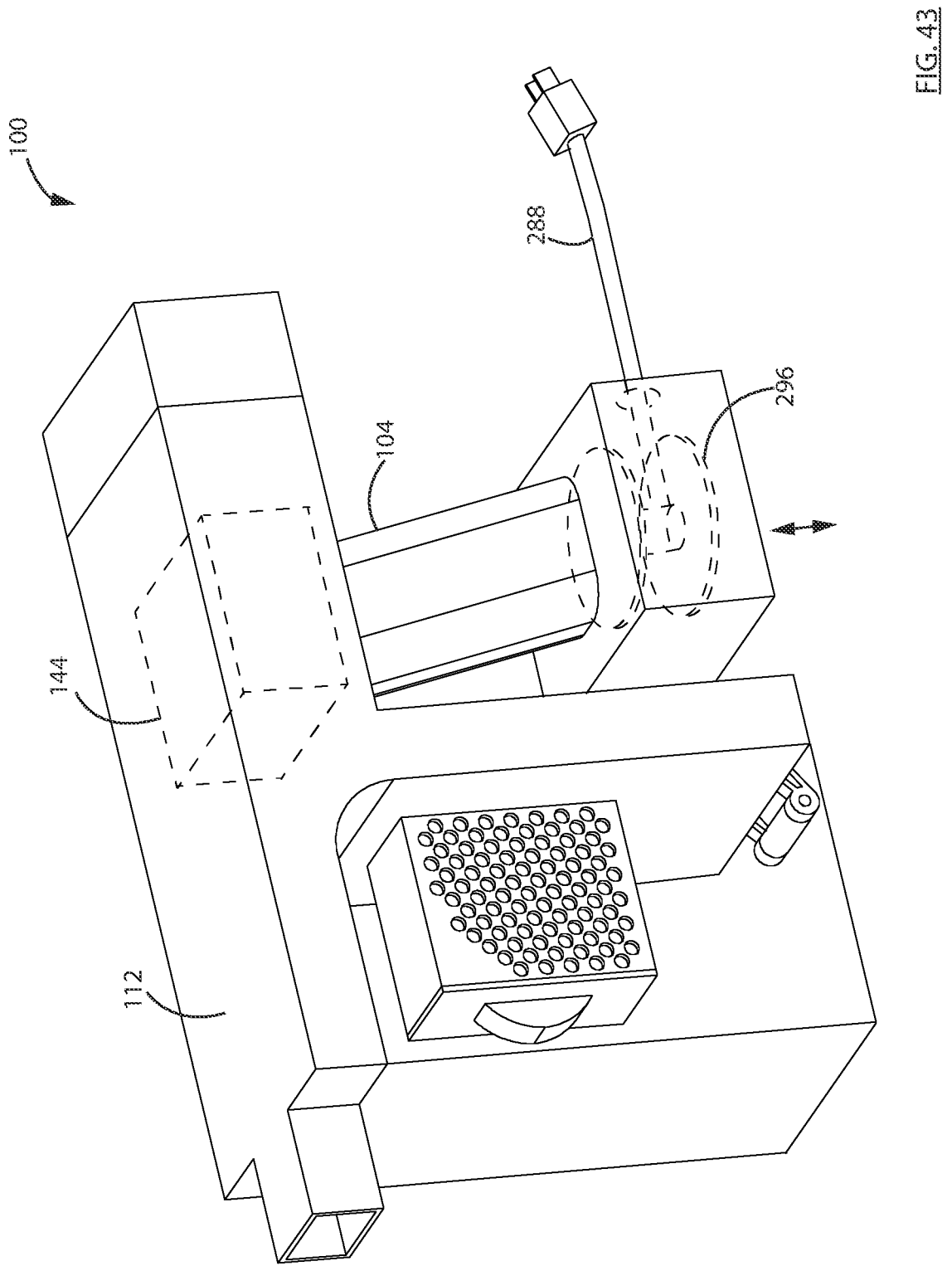
FIG. 43 is a perspective view of a surface cleaning apparatus having a cord reel in a lower end of the handle and a suction motor above the cord reel, in accordance with an embodiment.
Figure 44:
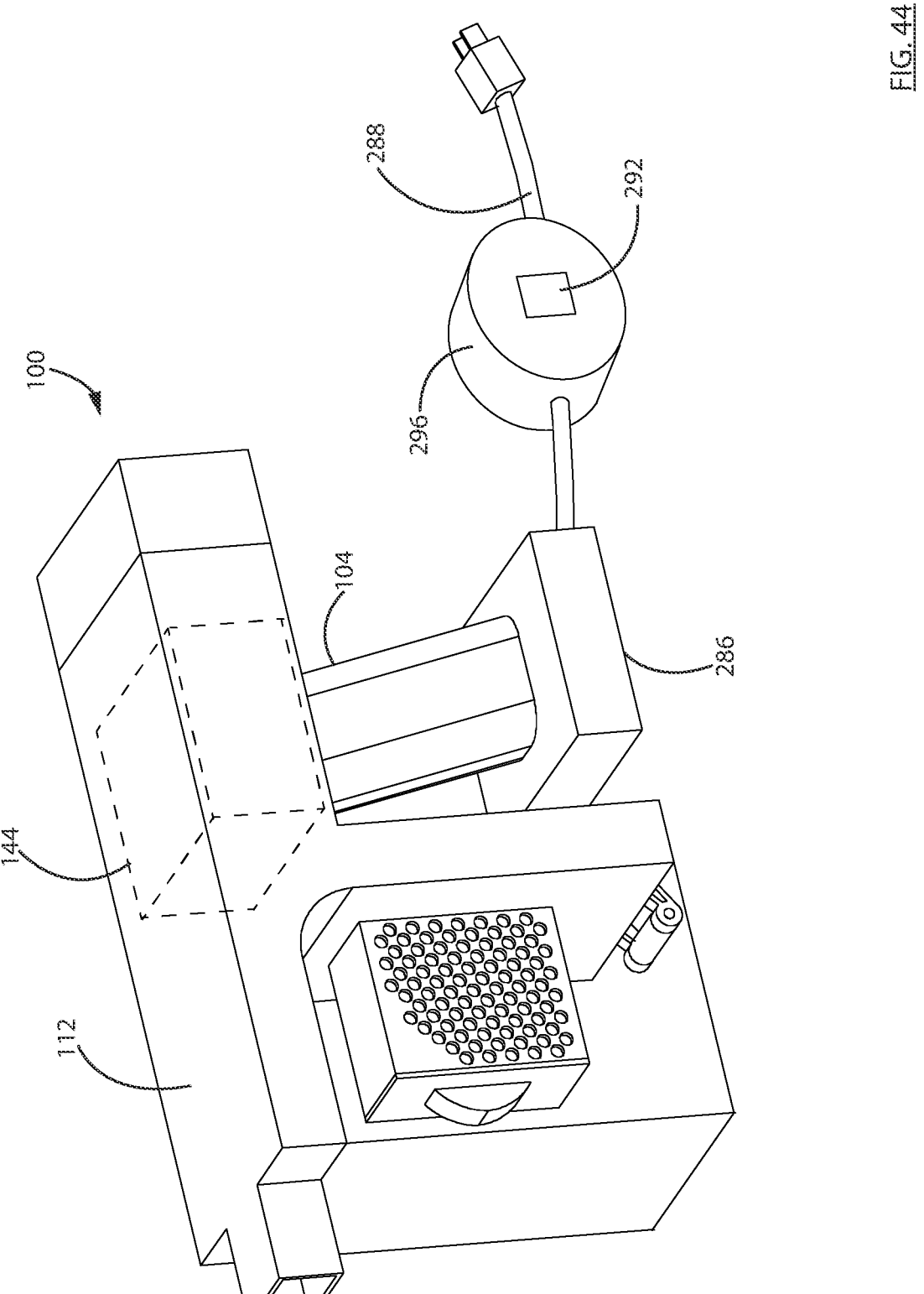
FIG. 44 is a perspective view of a surface cleaning apparatus having a external cord reel with a power supply, in accordance with an embodiment.

Referring to FIGS. 43-44, cord 288 may be associated with a cord reel 296. Cord reel 296 may be internal to main body 112 or rigidly connected to main body 112 (e.g. rigidly connected to apparatus 100 interior to handle 104). For example, FIG. 43 shows an embodiment of apparatus 100 including a cord reel 296 at a lower end of handle 104, and that is optionally detachable from apparatus 100. This can allow the user to remove cord reel 296 in order to reduce the weight of apparatus 100 when operating in a cordless configuration.

In other embodiments, cord reel 296 may be positioned external to apparatus 100 as shown in FIG. 44.

As exemplified in FIG. 44, cord reel 296 may include an AC to DC power supply 292. For example, AC to DC power supply 292 may be located centrally in cord reel 292. Cord 288 may be detachably connected to apparatus 100, which may allow the user to remove cord 288 and cord reel 296 to reduce the weight of apparatus 100 when operating in a cordless configuration.

Sequential Momentum Separator and Cyclone

In accordance with another aspect, in some embodiments, the surface cleaning apparatus includes a first stage momentum separator and a second stage cyclonic separator downstream of the first stage. For example, the momentum separator may efficiently separate large dirt particles from the air flow, and the cyclonic separator may efficiently separate small particles from the air flow. In some embodiments, the air treatment member may have a front door that concurrently opens a wall of the momentum separator and a wall of the cyclonic separator. This can allow both of the first and second cleaning stages to be opened in a single act (i.e. by opening the front door), and then emptied of dirt concurrently.

The use of a sequential momentum separator and cyclone may be used by itself or in combination with one or more of the air treatment member wipers, the multi-stage perforated substrates, openable pre-motor filter chamber, the nested porous separating members, the valving for multiple treatment chambers, the debriding devices, the bypass valve and the power components configurations disclosed herein.

Figure 45:
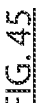
FIG. 45 is a perspective view of an air treatment member in accordance with an embodiment.
Figure 46:
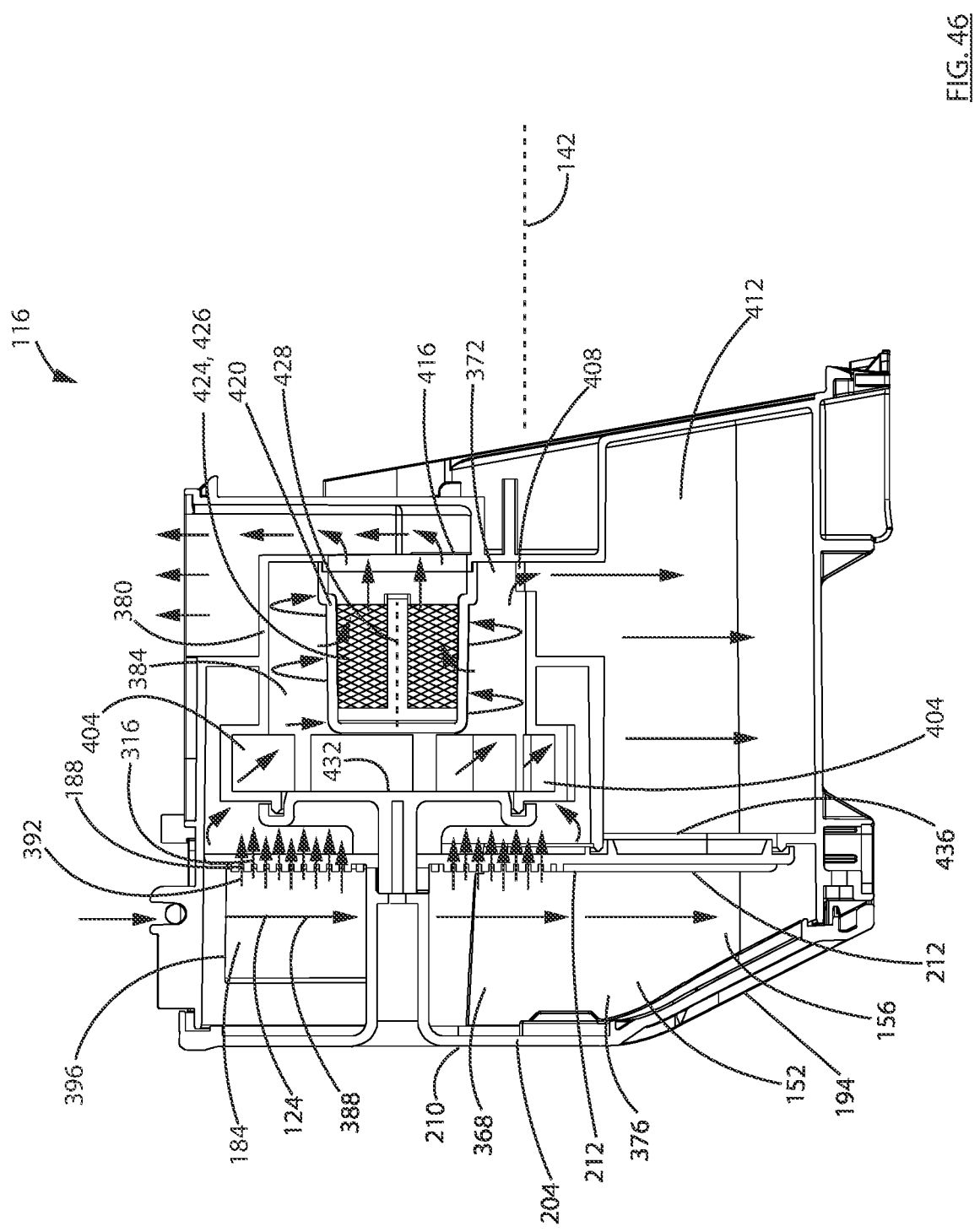
FIG. 46 is a cross-sectional view taken along line 46-46 in FIG. 45, in accordance with an embodiment.

As exemplified in FIGS. 45-46, air treatment member 116 may include a first cleaning stage 368 and a second cleaning stage 372. First cleaning stage 368 may include a momentum separator 376 having a treatment chamber 152 with an inlet 184, an outlet 188, a front end 210, and a rear end 212. Second cleaning stage 372 is downstream of first cleaning stage 368 along air flow path 124, and include at least one cyclone with a cyclone chamber 384. The second cleaning stage 372 may be axially rearward of the momentum separator 376.

Momentum separator 376 may separate relatively large particles from the air flow by causing the air flow to decelerate sharply in treatment chamber 152 between chamber inlet 184 and outlet 188 and/or to change the direction of air flow through the momentum separator. For example, chamber inlet 184 may be positioned and oriented to direct air entering treatment chamber 152 to deflect off of a wall of treatment chamber 152 before exiting through outlet 188. The sudden deceleration generated by this deflection may cause large dirt particles (which have the greatest momentum of the dirt in the air flow) to disentrain from the air flow. The disentrained dirt particles may collect in treatment chamber 152 (e.g. in a dirt region 156).

As exemplified in FIGS. 45-46, chamber inlet 184 may be positioned and oriented to direct air entering treatment chamber 152 in an inlet flow direction 388 (e.g., downwardly) that is transverse to an outlet flow direction 392 through chamber outlet 188 (axially in the direction of axis 142). This may inhibit the air entering treatment chamber 152 from exiting through chamber outlet 188 before experiencing a sudden deceleration that will separate large dirt particles from the air flow. This can allow the dirt particles to collect in a lower portion of treatment chamber 152 where gravity can assist with retaining the separated dirt particles in treatment chamber 152 until they are emptied from apparatus 100. As shown, treatment chamber air outlet 188 may define a generally rearwardly outlet flow direction 392, which is transverse to the generally downward inlet flow direction 388.

In some embodiments, treatment chamber air outlet 188 may be located at chamber rear end 212. For example, chamber rear end 212 may extend transverse to longitudinal axis 142, and may include a rearwardly oriented air outlet 188. Air outlet 188 can have any configuration that provides an exit for air leaving treatment chamber 152 towards cyclone chamber 384. For example, chamber air outlet 188 may include one opening (e.g. as in a conduit) or a plurality of openings 316 (e.g. a perforated substrate, such as a screen, a rigid plastic member with openings therethrough or other porous dirt separator) as exemplified. A chamber air outlet 188 including a porous dirt separator with a plurality of openings 316 may assist with separating large dirt particles remaining in the air flow before the air flow exits treatment chamber 152.

Cyclone 380 may have any configuration suitable for cyclonically separating particles of dirt from the air stream exiting first cleaning stage 368. As shown, cyclone chamber 384 may include one cyclone air inlet or a plurality of air inlets 404 as shown. Inlet(s) 404 may direct the air entering cyclone chamber 384 in a tangential direction that promotes cyclonic flow within cyclone chamber 384. The cyclonic movement of the air flow may cause dirt particles in the air flow to separate. As shown, cyclone chamber 384 may have a dirt outlet 408 through which separated dirt particles may exit cyclone chamber 384 and enter dirt chamber 412. Air exits cyclone chamber 384 through cyclone air outlet 416, which may be any air outlet known in the art. In some embodiments, an outlet passage 420 may be located immediately upstream of cyclone air outlet 416 (the rear end of passage 420). As shown, outlet passage 420 may include inlets 424 defined by a screen 426 (e.g. fine mesh) which may help separate dirt remaining in the air flow exiting cyclone chamber 384. Alternatively or in addition to having a screen 426, outlet passage 420 may act as a vortex finder that may promote the cyclonic flow pattern within cyclone chamber 384.

Figure 47:
FIG. 47 is a cross-sectional view taken along line 46-46 in FIG. 45, in accordance with another embodiment.

FIG. 46 exemplifies an embodiment in which cyclone chamber 384 is oriented with a substantially horizontal cyclone axis 428 (e.g. parallel to longitudinal axis 142). FIG. 47 shows an alternative embodiment in which cyclone axis 428 is oriented at an angle to vertical and horizontal. As shown, this design may provide momentum separator 376 with a larger dirt collection region 156. As exemplified, the cyclone is rearward of the momentum separator. Accordingly, air may travel generally rearwardly (e.g., axially in FIG. 46) from the openings or perforations in the porous substrate to the cyclone air inlet, thereby reducing back pressure through the hand vacuum cleaner.

Figure 48:
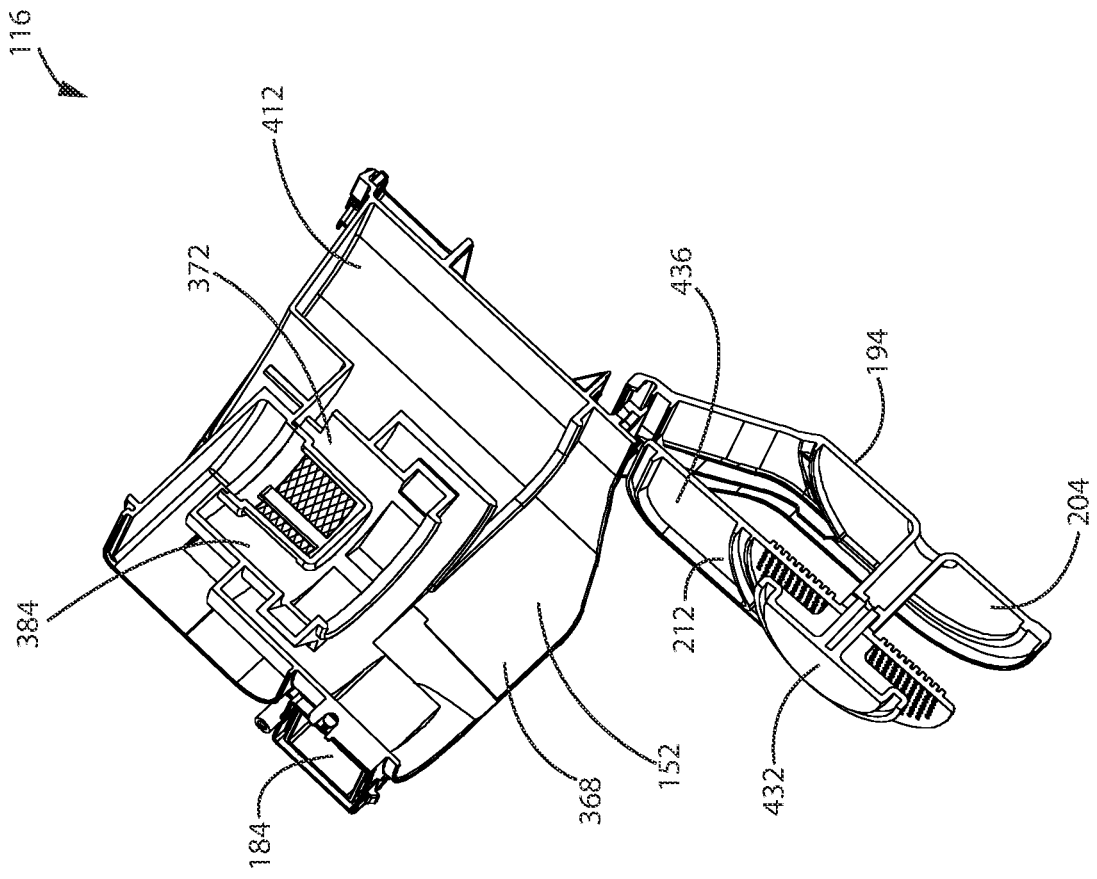
FIG. 48 is a perspective view of the surface cleaning apparatus of FIG. 46, with a front door in an open position; and, FIG. 49 is a perspective view of the surface cleaning apparatus of FIG. 47, with a front door in an open position.
Figure 49:
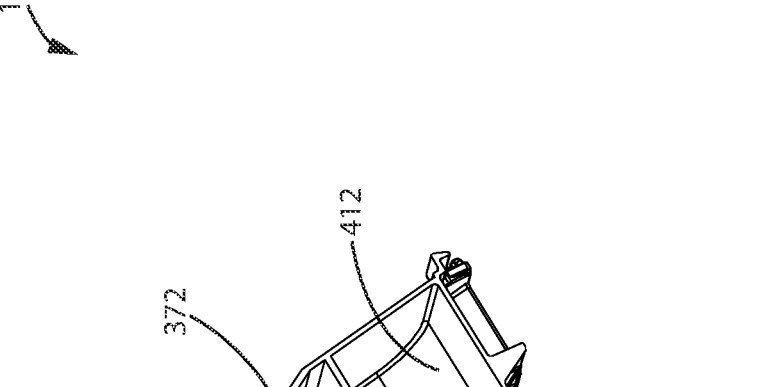
Figure 49:
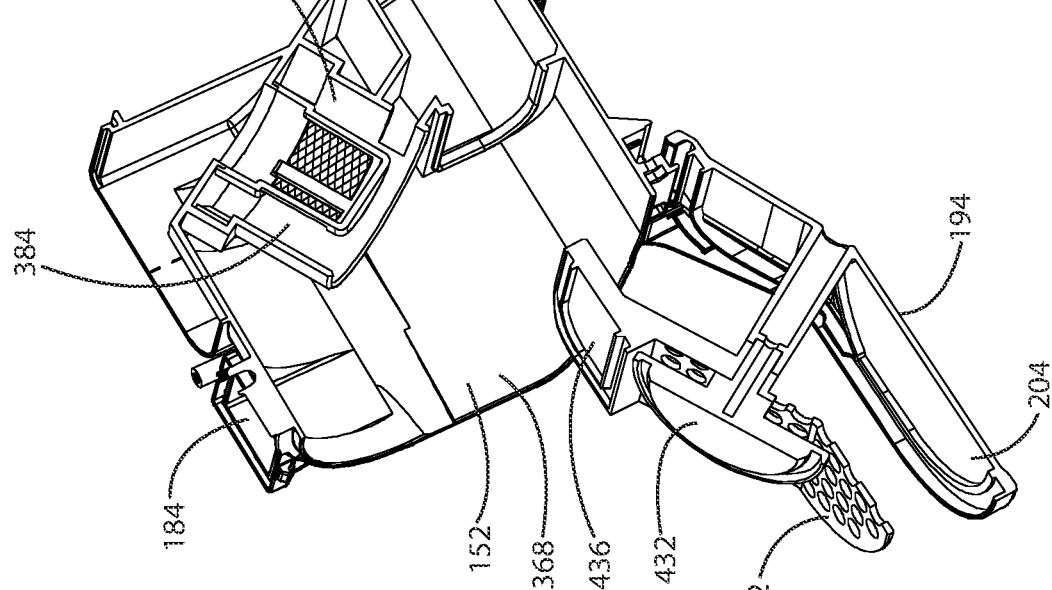

Referring to FIGS. 46 and 48-49, air treatment member 116 may include a front door 194 that is movably mounted between a closed position (FIG. 46) and an open position (FIG. 47). Front door 194 may be rotatably movable as shown, movable in translation or removable for example. As shown, when front door 194 is opened, walls of both cleaning stages 368, 372 may be concurrently opened. This can allow both cleaning stages 368, 372 to be simultaneously opened for emptying by a single act of opening front door 194.

For example, the front wall 194 may have attached thereto the porous substrate (treatment chamber rear wall 212 having outlet 188) and the front wall 432 of the cyclone chamber. As exemplified, the porous substrate (treatment chamber rear wall 212) may be spaced rearwardly from the front wall 194 by a first support member (e.g., a column) and the front wall 432 of the cyclone chamber may be spaced rearwardly from the porous substrate by a second support member (e.g., a column). Opening front door 194 may open at least a portion of treatment chamber front wall 204, and at least a portion of cyclone chamber front wall 432. As shown, front door 194 may include some or all of front wall 204. Further, front door 194 may be a front wall of the surface cleaning apparatus. In the illustrated example, treatment chamber air inlet 184 remains in position when front door 194 is opened.

If the cyclone has an external dirt chamber 412, then in some embodiments, opening front door 194 may concurrently open cyclone chamber 384 and dirt chamber 412. This can allow both of cyclone chamber 384 and dirt chamber 412 to be emptied when front door 194 is open.

As exemplified, the treatment chamber rear wall 212 may move concurrently with front door 194. Alternately, or in addition, rear wall 212 may be connected to or form some or all of a wall of cyclone chamber 384 and a wall of dirt chamber 412. In the illustrated example, treatment chamber rear wall 212 is connected to an end wall 432 of cyclone chamber 384, and treatment chamber rear wall 212 forms an end wall 436 of dirt chamber 412. When front door 194 is opened, treatment chamber rear wall 212, cyclone chamber wall 432, and dirt chamber wall 436 may move as well, whereby treatment chamber 152, cyclone chamber 384, and dirt chamber 412 may be opened concurrently. This design may also permit chambers 152, 384, and 412 to be emptied concurrently when front door 194 is opened.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hand vacuum cleaner having a front end, a rear end and a longitudinal axis extending from the front end to the rear end, the hand vacuum cleaner comprising:
   (a) an air flow passage extending from a dirty air inlet to a clean air outlet;
   (b) an air treatment chamber comprising an air treatment chamber air outlet, a stationary portion and a moveable portion, the moveable portion can move with respect to the stationary portion between an open position and a closed position, the air treatment chamber air outlet comprises a rigid porous member that is moveably mounted to the stationary portion wherein, in operation to clean a surface, particles entrained in air that enters the air treatment chamber are separated from the air due to a flow rate of air decreasing as it enters the air treatment chamber whereby the particles separated from the air remain in the air treatment chamber and air free of the separated particles exits the air treatment chamber air outlet;
   (c) a porous filter media removably positionable in the rigid porous member;
   (d) a suction motor positioned in the air flow passage,
   wherein, when the air treatment chamber is opened, the rigid porous member is moveable from a first operating position to a filter removal position while the rigid porous member is attached to the stationary portion and, when the rigid porous member is in the filter removal position, the porous filter media is removable, and
   when the hand vacuum cleaner is in use to clean a floor, the hand vacuum cleaner has an upper end and a lower end, and the moveable portion rotates downwardly from the closed position to the open position, and
   wherein, when the moveable portion is in the closed position, each of the stationary portion and the moveable portion have a mating edge that mate with each other and that extend from a front end of the air treatment chamber to a rear end of the air treatment chamber.

2. The hand vacuum cleaner of claim 1 wherein the rigid porous member moves in a first direction between the first operating position and the filter removal positions and the porous filter media is removable in a second direction that is different to the first direction.

3. The hand vacuum cleaner of claim 1 wherein the rigid porous member is rotationally mounted and the porous filter media is slideably removable from the rigid porous member.

4. The hand vacuum cleaner of claim 3 wherein the rigid porous member is rotationally mounted to an interior wall of the air treatment chamber.

5. The hand vacuum cleaner of claim 1 wherein the moveable portion is rotationally mounted.

6. The hand vacuum cleaner of claim 1 wherein the rigid porous member is rotationally mounted.

7. The hand vacuum cleaner of claim 6 wherein the rigid porous member rotates downwardly from the first operating position to the filter removal position.

8. The hand vacuum cleaner of claim 7 wherein the porous filter media is slideable removable from the rigid porous member.

9. The hand vacuum cleaner of claim 1 wherein the rigid porous member has a sidewall that is planar.

10. The hand vacuum cleaner of claim 9 wherein the porous filter media has a sidewall that is planar.

11. The hand vacuum cleaner of claim 1 wherein the rigid porous member has a plurality of sidewalls and, in a plane that is transverse of the longitudinal axis, the plurality of sidewalls define a parallelogram.

12. The hand vacuum cleaner of claim 11 wherein the porous filter media has a plurality of sidewalls and, in another plane that is transverse of the longitudinal axis, the plurality of sidewalls of the porous filter media define a parallelogram.

13. The hand vacuum cleaner of claim 1 wherein the rigid porous member is rotationally mounted, the moveable portion is rotationally mounted and each of the rigid porous member and the moveable portion rotate in a common direction.

14. The hand vacuum cleaner of claim 13 wherein, when the hand vacuum cleaner is in use to clean the floor, a rotational axis of the moveable portion is located at the lower end of the hand vacuum cleaner.

\*    \*    \*    \*    \*